United States Patent [19]

Carbonato et al.

[11] 4,275,674
[45] Jun. 30, 1981

[54] MICROPROCESSOR CONTROLLED ELECTRONIC SEWING MACHINE

[75] Inventors: Gianfranco Carbonato, Turin; Camillo Bussolati, Milan, both of Italy

[73] Assignee: Necchi S.p.A., Pavia, Italy

[21] Appl. No.: 41,293

[22] Filed: May 22, 1979

[30] Foreign Application Priority Data

Feb. 21, 1979 [IT] Italy .............................. 42904 A/79

[51] Int. Cl.³ ............................................. D05B 3/02
[52] U.S. Cl. ............................................. 112/158 E
[58] Field of Search .......... 112/158 E, 121.11, 121.12, 112/275, 277; 318/602, 567, 568, 569, 345 E

[56] References Cited

U.S. PATENT DOCUMENTS

| | | | |
|---|---|---|---|
| 3,795,851 | 3/1974 | Gage et al. ........................... | 318/602 |
| 3,958,109 | 5/1976 | Doherty et al. .................. | 318/569 X |
| 4,051,794 | 10/1977 | Herzer et al. .................... | 112/121.12 |
| 4,086,862 | 5/1978 | Makabe et al. ................... | 112/158 E |
| 4,090,116 | 5/1978 | Lippitt ............................. | 318/345 E |
| 4,100,865 | 7/1978 | Landau, Jr. et al. ............. | 112/121.11 |
| 4,116,144 | 9/1978 | Tanimoto et al. ............... | 112/158 E |
| 4,122,786 | 10/1978 | Tanimoto et al. ............... | 112/158 E |
| 4,142,473 | 3/1979 | Itoh ................................ | 112/158 E |
| 4,159,685 | 7/1979 | Wurst et al. ................. | 112/158 E X |

FOREIGN PATENT DOCUMENTS 2813220 10/1978 Fed. Rep. of Germany ....... 112/158 E

*Primary Examiner*—Peter P. Nerbun
*Attorney, Agent, or Firm*—Hubbell, Cohen, Stiefel & Gross

[57] ABSTRACT

The present invention is an improved electronic type sewing machine in which a microcomputer integrated circuit arrangement, such as a master/slave microprocessor configuration, is employed to effectuate stitch position coordinate servo control for both bight and feed through digitally closing the position servo control loop. The sewing machine includes actuator means for adjusting the transverse position of the needle bar means and the positional displacement of the feed means in response to control signals provided thereto and static memory means, such as a read-only-memory, for retrievably storing a plurality of different predetermined stitch patterns each having associated retrievably stored bight and feed data corresponding to predetermined positional coordinates of the needle bar and feed means for defining associated stitch position coordinates for the stitches comprising the stitch patterns. The microcomputer arrangement is connected to the actuator which it controls as well as to the static memory containing the requisite data. A transducer arrangement is connected between the actuator controlled and the digital input of the microcomputer for providing a digital input signal to the microcomputer representative of the actual position of the actuator. Where the master/slave microprocessor configuration is employed, the slave microprocessor is employed to close the position servo control loop and the master microprocessor is employed to process the stitch position coordinate data and provide the desired digital position input to the slave microprocessor for digital position error comparison with the actual digital position input.

34 Claims, 52 Drawing Figures

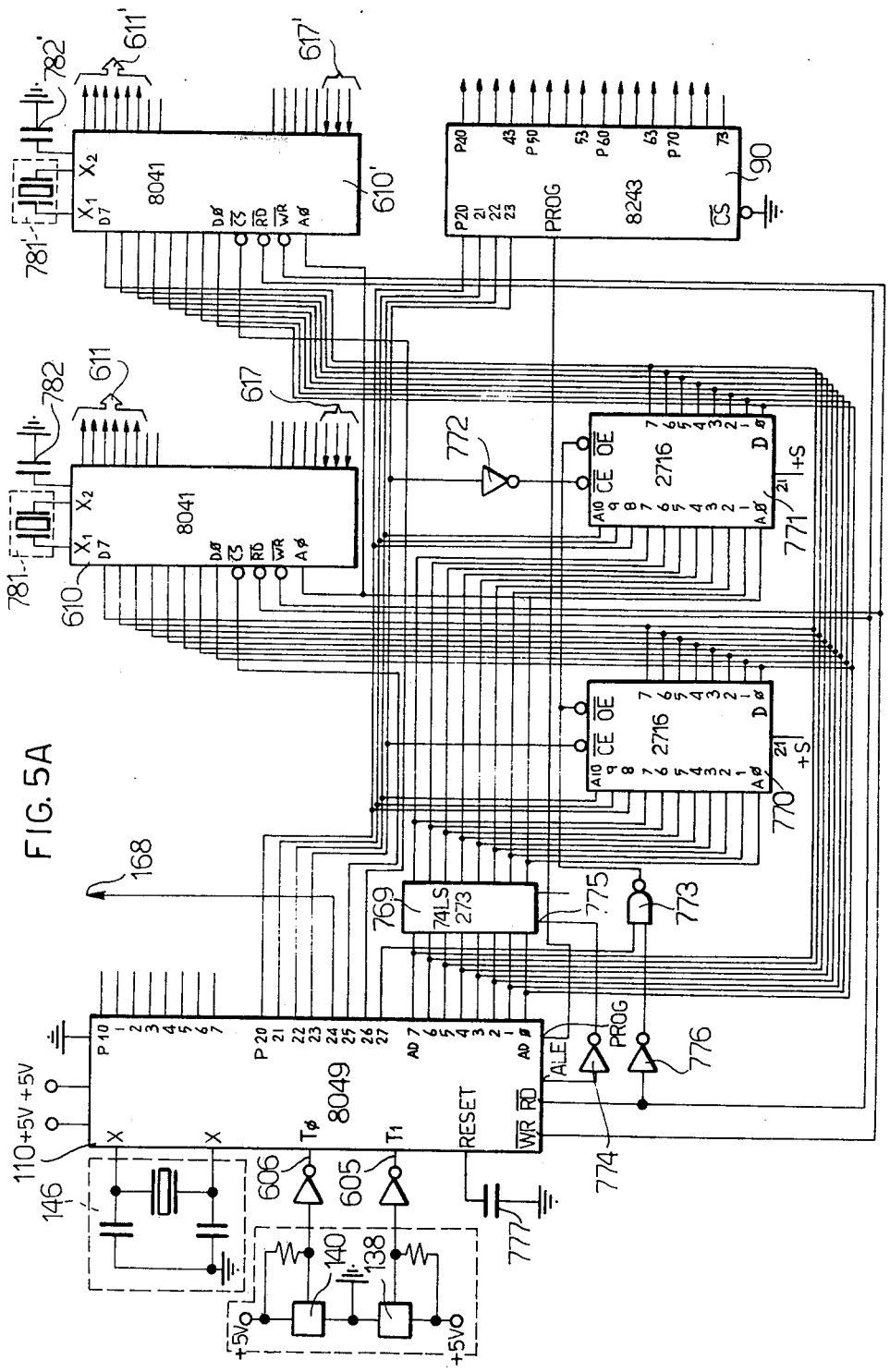

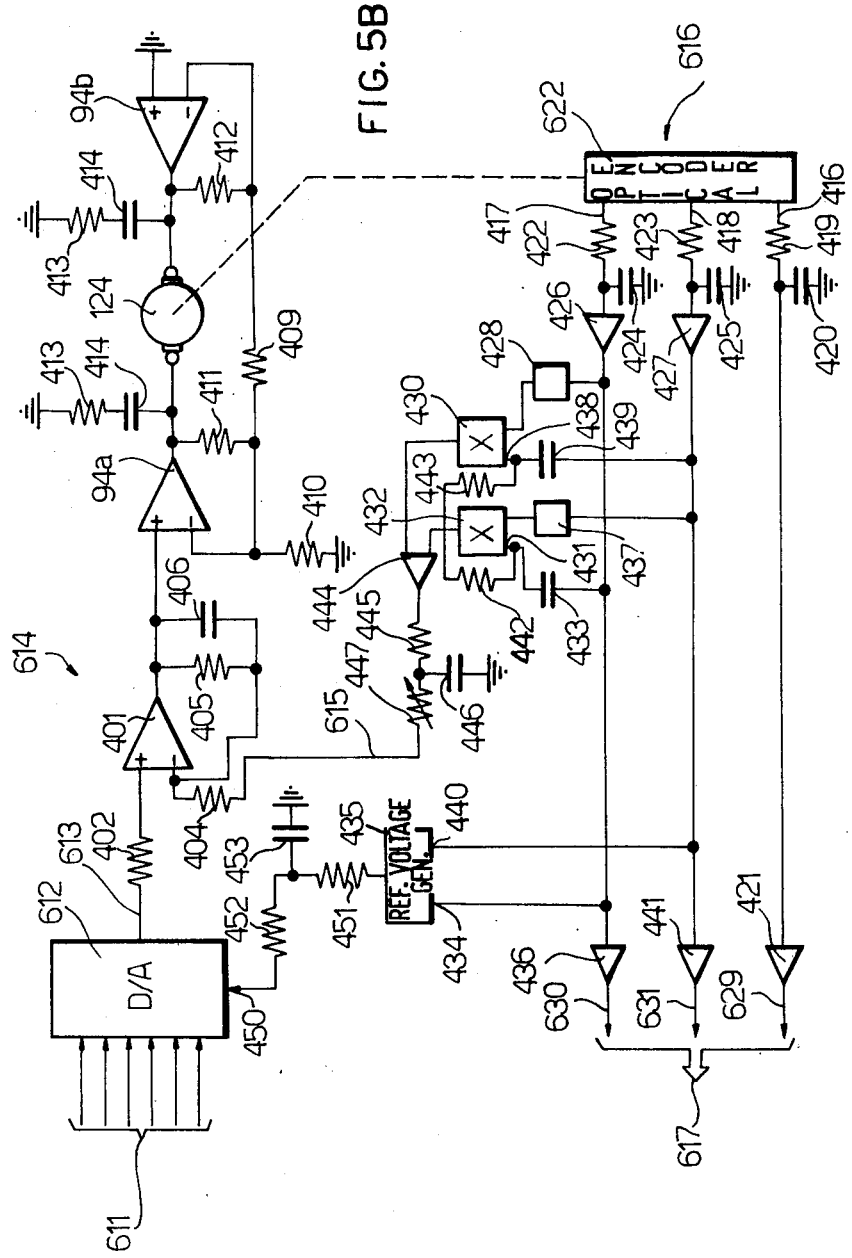

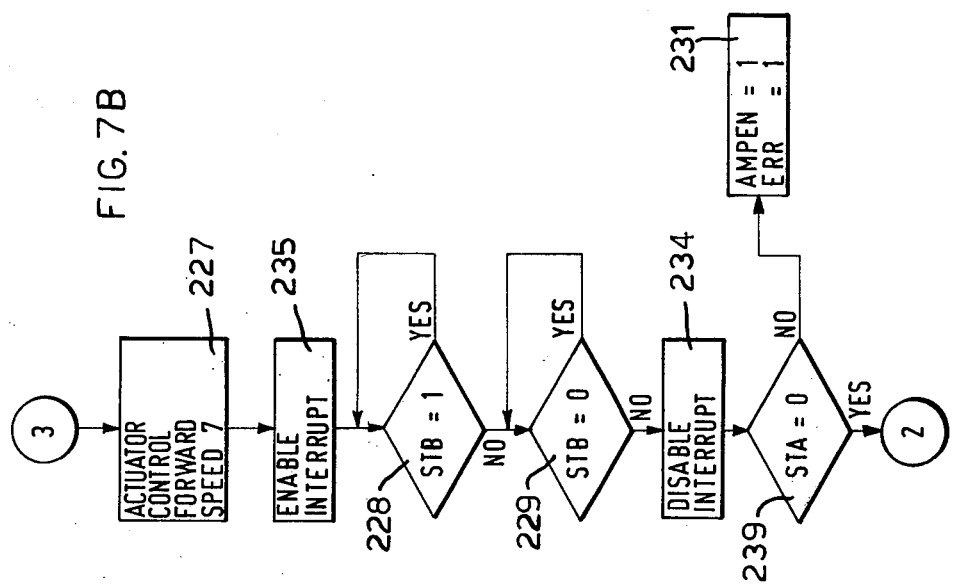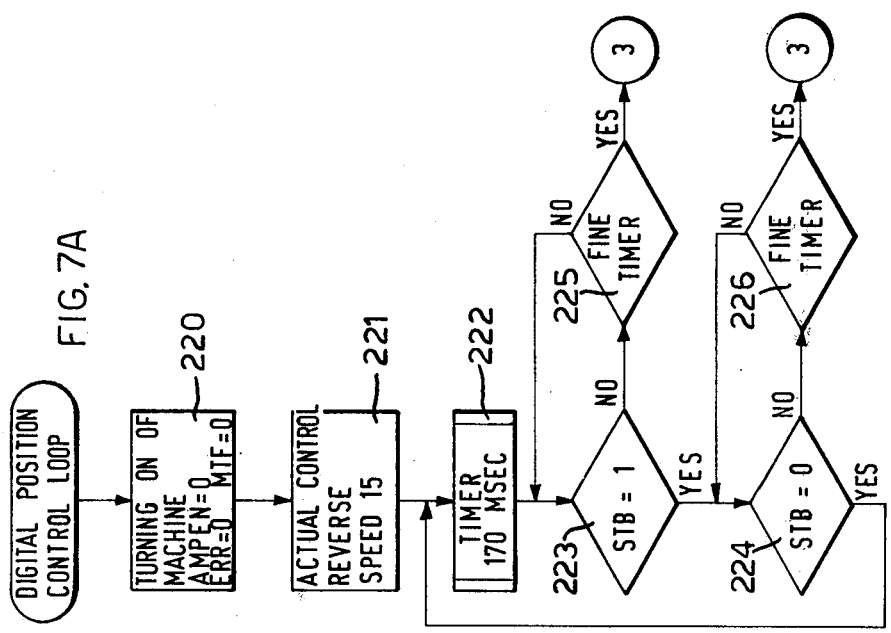

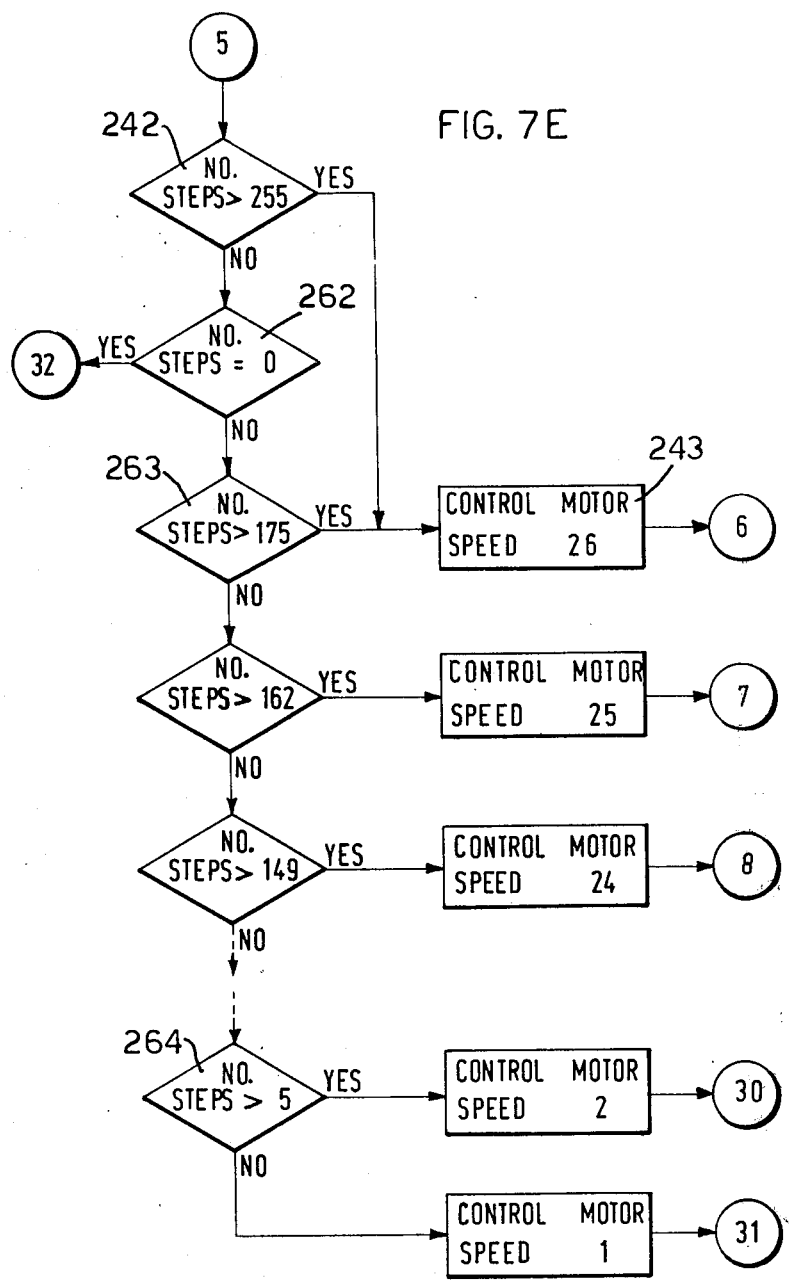

FIG. 7F
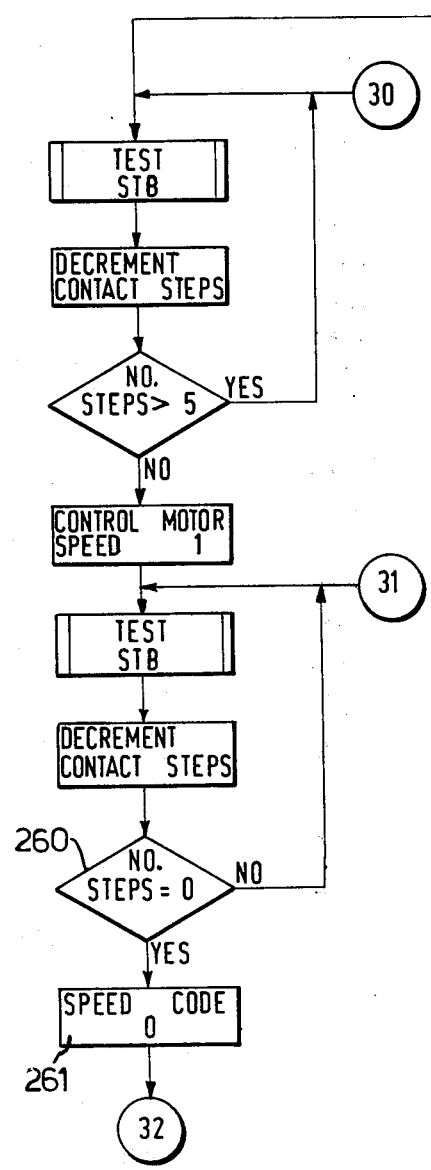
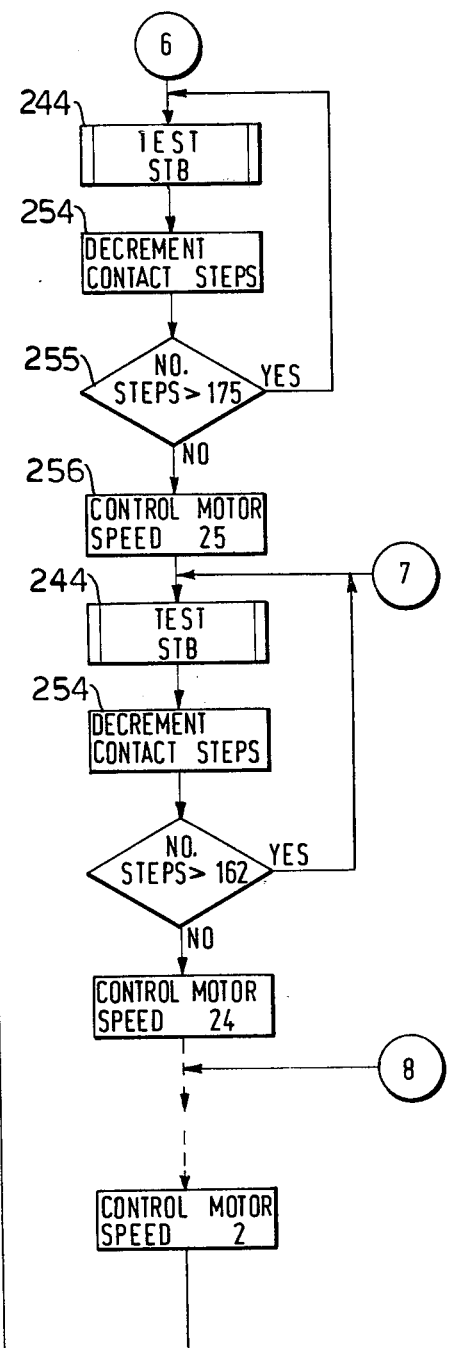

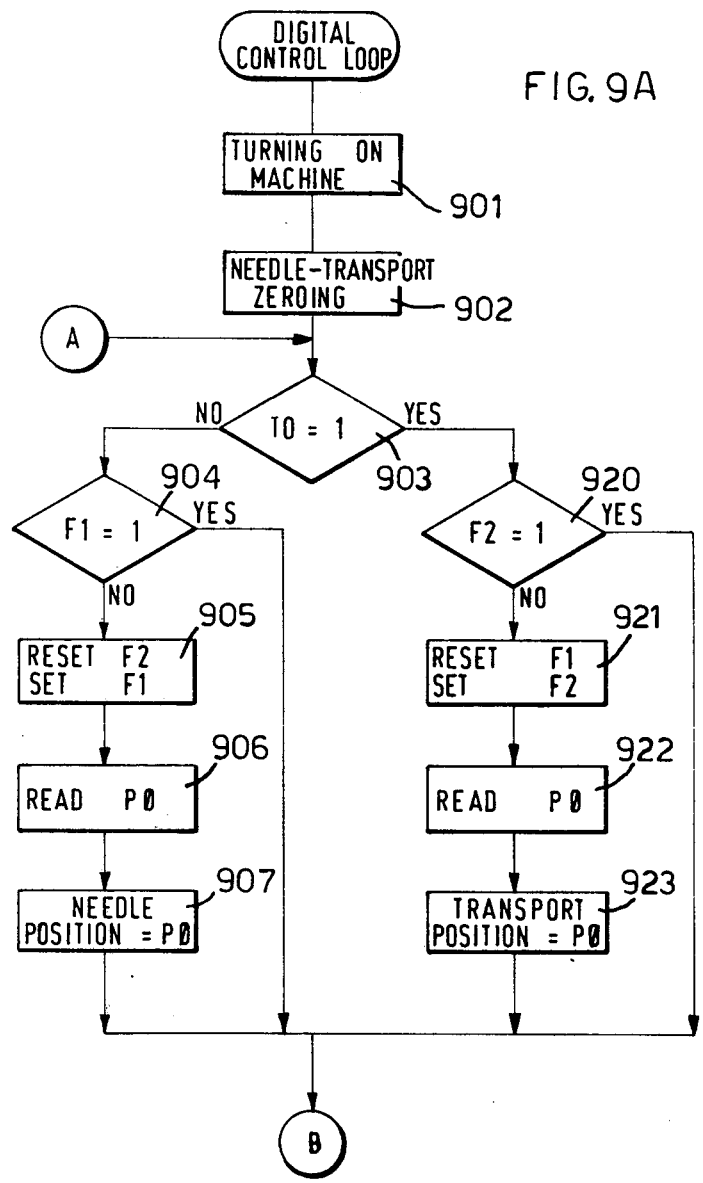

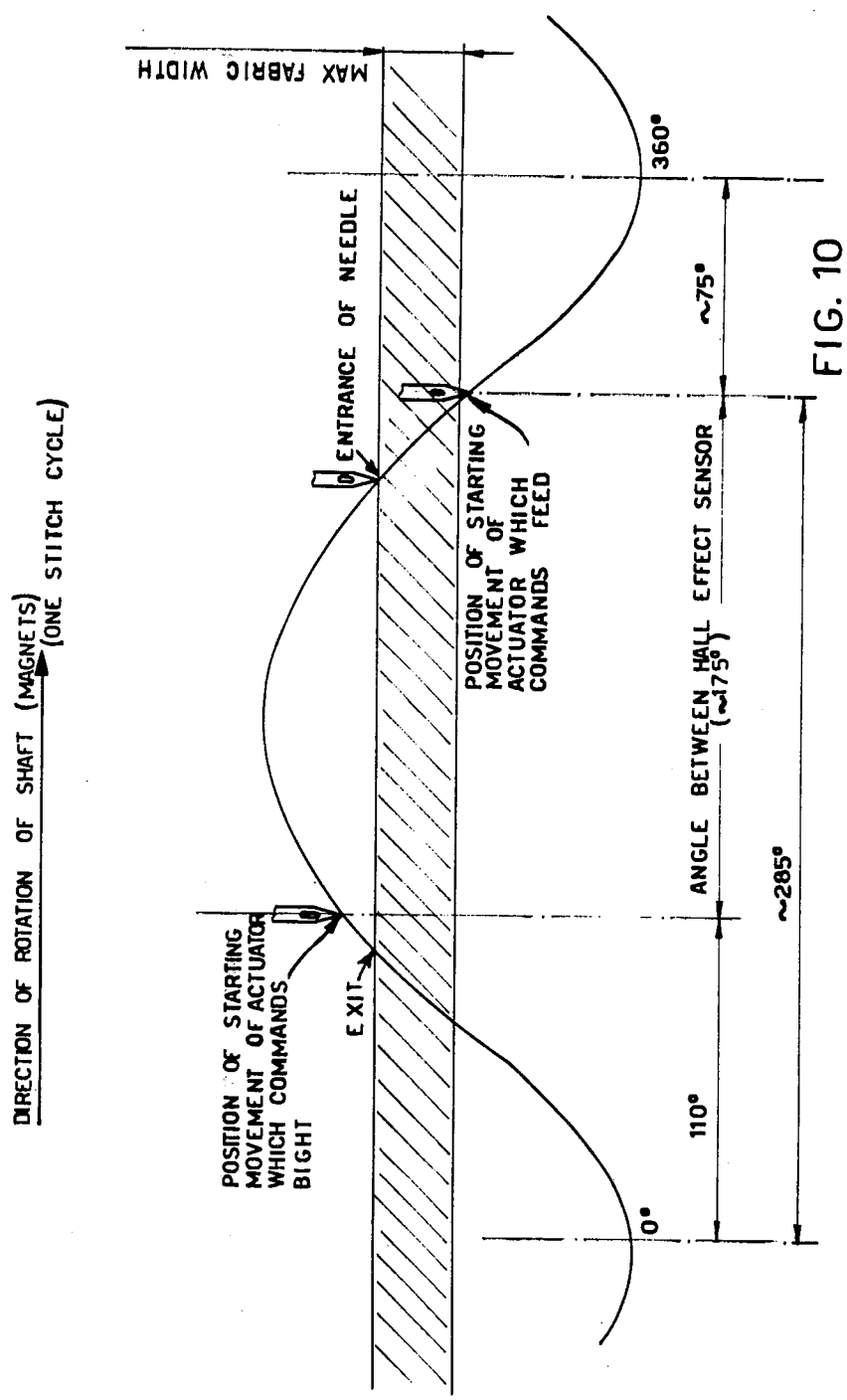

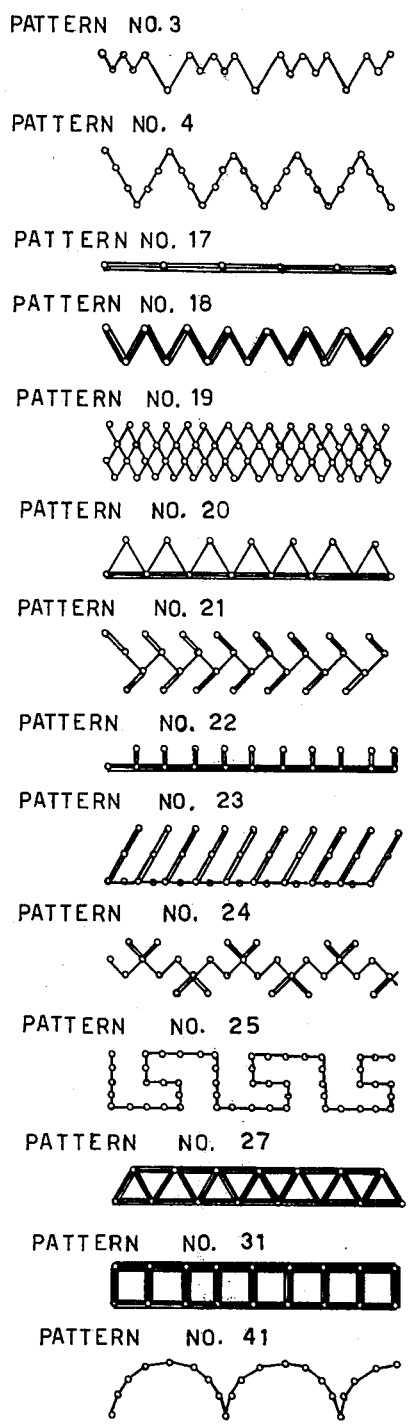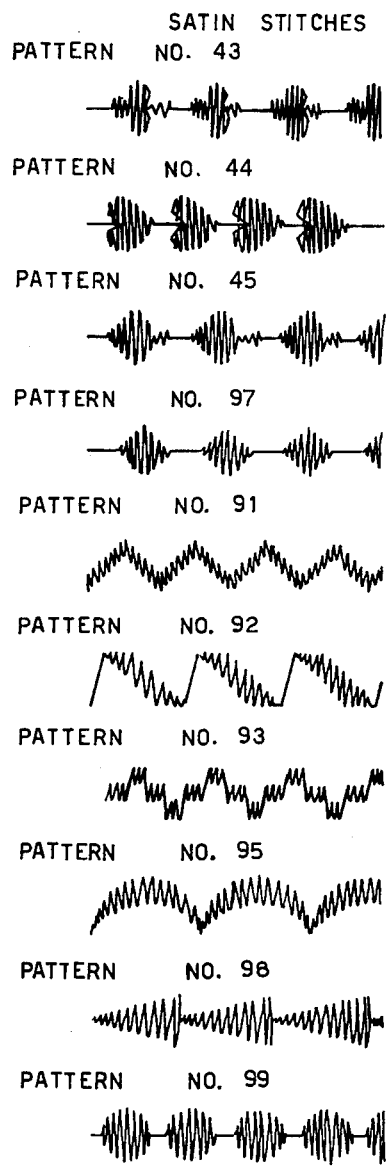
FIG. 47

INTERPOLATION OF ARROW PATTERN NO. 98

PATTERN: CLUBS

PROGRAMMED DATA
- STITCH NO. PER CYCLE: 51
- WIDTH: 8
- FEED: VARIABLE
- MAX. NEEDLE BIGHT:
- MAX. FEED VAR.:

| STITCH | BIGHT | FEED | STITCH | BIGHT | FEED |
|---|---|---|---|---|---|
| 0 | 0 |  | 25 | -29 | +3 |
| 1 | 0 | +10 | 26 | +29 | 0 |
| 2 | -0 | +10 | 27 | +6 | +4 |
| 3 | -7 | +1 | 28 | +26 | -1 |
| 4 | +7 | 0 | 29 | +16 | +3 |
| 5 | -11 | +2 | 30 | 0 | +2 |
| 6 | +11 | 0 | 31 | -0 | +4 |
| 7 | -14 | 0 | 32 | -6 | +4 |
| 8 | +14 | 0 | 33 | -26 | -1 |
| 9 | -15 | +3 | 34 | -16 | +3 |
| 10 | +15 | 0 | 35 | 0 | +2 |
| 11 | -14 | +3 | 36 | +3 | +4 |
| 12 | +14 | 0 | 37 | -3 | +4 |
| 13 | -13 | +3 | 38 | -3 | 0 |
| 14 | +13 | 0 | 39 | +4 | +2 |
| 15 | -20 | +2 | 40 | -4 | 0 |
| 16 | +20 | 0 | 41 | -5 | +2 |
| 17 | -27 | +2 | 42 | +5 | 0 |
| 18 | +27 | 0 | 43 | -5 | +2 |
| 19 | -30 | +3 | 44 | +5 | 0 |
| 20 | +30 | 0 | 45 | -6 | +3 |
| 21 | -31 | 0 | 46 | +6 | 0 |
| 22 | +31 | +3 | 47 | -7 | +3 |
| 23 | -30 | 0 | 48 | +7 | 0 |
| 24 | +30 | +3 | 49 | -0 | +2 |
|  |  |  | 50 | 0 |  |
|  |  |  | 51=0 |  |  |

FABRIC ADVANCING WITH FORWARD FEED ←

| EYELET | | |
|---|---|---|
| THREE-CYCLES PROGRAM:<br>A= STITCHES 0-1-2-1-2 ETC.<br>B= STITCHES 3-4-5....32-33-32-33<br>C= STITCHES 34-35....41-42<br>CHANGE OF CYCLE THROUGH A<br>SIGNAL FROM FABRIC<br><br>PATTERN WIDTH = 5.94<br>MAX. NEEDLE BIGHT = 4.39<br>MAX. FEED VAR. = 4.26 | | |
| STITCH | BIGHT | FEED |
| 0 | 0 | 0 |
| 1 | −17 | +2 |
| 2 | −2 | +2 |
| 3 | −19 | +2 |
| 4 | −2 | +2 |
| 5 | −22 | +2 |
| 6 | −6 | +2 |
| 7 | −23 | +2 |
| 8 | −8 | +2 |
| 9 | −22 | +2 |
| 10 | −7 | +1 |
| 11 | −21 | −3 |
| 12 | −6 | +2 |
| 13 | −16 | +7 |
| 14 | −4 | +6 |
| 15 | −8 | +10 |
| 16 | −2 | +10 |
| 17 | 0 | −11 |
| 18 | +2 | +11 |
| 19 | +8 | −10 |
| 20 | +4 | +10 |
| 21 | +16 | −6 |
| STITCH | BIGHT | FEED |
| 22 | +6 | −7 |
| 23 | +21 | +2 |
| 24 | +7 | −3 |
| 25 | +22 | −1 |
| 26 | +8 | −2 |
| 27 | +23 | −2 |
| 28 | +6 | −2 |
| 29 | +22 | −2 |
| 30 | +2 | −2 |
| 31 | +19 | −2 |
| 32 | +2 | −2 |
| 33 | +17 | −2 |
| 34 | −17 | −2 |
| 35 | +17 | −2 |
| 36 | −17 | −2 |
| 37 | +17 | −2 |
| 38 | −17 | −2 |
| 39 | +17 | −2 |
| 40 | −17 | 0 |
| 41 | +17 | +2 |
| 42 | 0 | +2 |

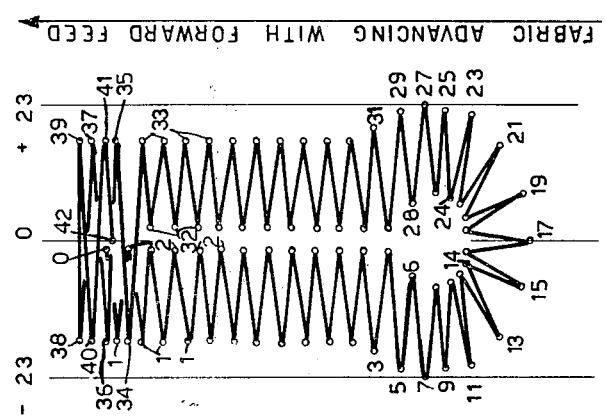

FIG. 51

FABRIC ADVANCING WITH FORWARD FEED

FIG. 52A

| PATTERN: | A | | |
|---|---|---|---|
| PROGRAMMED DATA | | | |
| STITCH NO PER CYCLE | 35 | | |
| WIDTH | 8 | | |
| FEED | VARIABLE | | |
| MAX. NEEDLE BIGHT | | | |
| MAX. FEED VAR. | | | |

| STITCH | BIGHT | | FEED | |
|---|---|---|---|---|
| 0 | − | 31 | − | 1 |
| 1 | − | 31 | − | 1 |
| 2 | − | 31 | − | 1 |
| 3 | − | 31 | − | 1 |
| 4 | − | 31 | − | 1 |
| 5 | + | 10 | − | 10 |
| 6 | + | 10 | + | 7 |
| 7 | + | 31 | + | 6 |
| 8 | − | 10 | − | 5 |
| 9 | − | 10 | − | 7 |
| 10 | − | 31 | − | 10 |
| 11 | − | 10 | + | 10 |
| 12 | − | 10 | + | 16 |
| 13 | − | 11 | − | 16 |
| 14 | − | 11 | + | 16 |
| 15 | − | 31 | − | 1 |
| 16 | − | 10 | − | 1 |
| 17 | − | 10 | − | 3 |
| 18 | + | 31 | + | 2 |
| 19 | + | 31 | + | 3 |
| 20 | + | 10 | − | 1 |
| 21 | − | 10 | − | 1 |
| 22 | − | 31 | − | 2 |
| 23 | − | 31 | + | 1 |
| 24 | − | 10 | + | 1 |

| STITCH | BIGHT | | FEED | |
|---|---|---|---|---|
| 25 | + | 10 | − | 1 |
| 26 | + | 31 | − | 3 |
| 27 | + | 31 | + | 2 |
| 28 | + | 10 | + | 3 |
| 29 | − | 10 | + | 1 |
| 30 | − | 31 | − | 1 |
| 31 | − | 31 | − | 2 |
| 32 | − | 31 | + | 2 |
| 33 | − | 31 | − | 2 |
| 34 | − | 31 | + | 2 |
| 35 | − | 31 | − | 18 |

| PATTERN: | B | | |
|---|---|---|---|
| PROGRAMMED DATA | | | |
| STITCH NO. PER CYCLE | | 44 | |
| WIDTH | | 8 | |
| FEED | | VARIABLE | |
| MAX. NEEDLE BIGHT | | | |
| MAX. FEED VAR. | | | |

| STITCH | BIGHT | | FEED | |
|---|---|---|---|---|
| 0 | − | 31 | + | 2 |
| 1 | − | 31 | + | 2 |
| 2 | − | 31 | − | 2 |
| 3 | − | 31 | + | 2 |
| 4 | − | 31 | + | 6 |
| 5 | + | 10 | + | 3 |
| 6 | + | 10 | + | 2 |
| 7 | + | 31 | + | 2 |
| 8 | + | 31 | + | 2 |
| 9 | + | 10 | − | 3 |
| 10 | − | 10 | − | 6 |
| 11 | − | 31 | + | 2 |
| 12 | − | 31 | + | 6 |
| 13 | − | 10 | + | 3 |
| 14 | + | 10 | + | 2 |
| 15 | + | 31 | + | 8 |
| 16 | + | 31 | + | 8 |
| 17 | + | 31 | − | 6 |
| 18 | + | 21 | − | 1 |
| 19 | + | 10 | − | 8 |
| 20 | | 0 | + | 14 |
| 21 | | 0 | + | 2 |
| 22 | + | 15 | − | 1 |
| 23 | + | 30 | + | 13 |
| 24 | + | 30 | | |

| STITCH | BIGHT | | FEED | |
|---|---|---|---|---|
| 25 | + | 20 | + | 6 |
| 26 | + | 11 | − | 1 |
| 27 | + | 1 | − | 8 |
| 28 | + | 1 | − | 13 |
| 29 | − | 15 | − | 3 |
| 30 | − | 30 | − | 5 |
| 31 | − | 30 | + | 13 |
| 32 | − | 20 | + | 10 |
| 33 | − | 11 | + | 3 |
| 34 | | 0 | − | 5 |
| 35 | | 0 | + | 1 |
| 36 | − | 10 | + | 5 |
| 37 | − | 21 | − | 3 |
| 38 | − | 31 | − | 10 |
| 39 | − | 31 | − | 14 |
| 40 | − | 31 | + | 14 |
| 41 | − | 31 | − | 4 |
| 42 | − | 31 | + | 4 |
| 43 | − | 31 | + | 13 |
| 44 | − | 31 | + | 12 |

| PATTERN: | C | |
|---|---|---|
| PROGRAMMED DATA | | |
| STITCH NO. PER CYCLE | 42 | |
| WIDTH | 8 | |
| FEED | VARIABLE | |
| MAX. NEEDLE BIGHT | | |
| MAX. FEED VAR. | | |

| STITCH | BIGHT | | FEED | |
|---|---|---|---|---|
| 0 | − | 31 | + | 7 |
| 1 | − | 31 | − | 4 |
| 2 | − | 21 | + | 4 |
| 3 | − | 31 | − | 4 |
| 4 | − | 21 | + | 4 |
| 5 | − | 31 | − | 4 |
| 6 | − | 21 | + | 3 |
| 7 | − | 10 | + | 3 |
| 8 | + | 10 | + | 2 |
| 9 | + | 21 | + | 7 |
| 10 | + | 31 | + | 13 |
| 11 | + | 21 | − | 6 |
| 12 | + | 10 | − | 1 |
| 13 | + | 20 | − | 0 |
| 14 | + | 30 | − | 6 |
| 15 | + | 30 | − | 11 |
| 16 | + | 21 | − | 6 |
| 17 | − | 10 | − | 2 |
| 18 | − | 10 | − | 3 |
| 19 | − | 21 | − | 3 |
| 20 | − | 30 | − | 1 |
| 21 | − | 21 | + | 3 |
| 22 | − | 10 | − | 3 |
| 23 | + | 10 | + | 3 |

| STITCH | BIGHT | | FEED | |
|---|---|---|---|---|
| 25 | + | 21 | + | 2 |
| 26 | + | 30 | + | 4 |
| 27 | + | 21 | − | 2 |
| 28 | + | 10 | − | 2 |
| 29 | − | 10 | − | 3 |
| 30 | − | 21 | − | 3 |
| 31 | − | 30 | − | 1 |
| 32 | − | 30 | + | 11 |
| 33 | − | 20 | + | 10 |
| 34 | − | 10 | − | 4 |
| 35 | − | 21 | − | 3 |
| 36 | − | 31 | − | 10 |
| 37 | − | 31 | − | 13 |
| 38 | − | 31 | + | 13 |
| 39 | − | 31 | − | 4 |
| 40 | − | 31 | + | 4 |
| 41 | − | 31 | + | 13 |
| 42 | − | 31 | + | 12 |

MICROPROCESSOR CONTROLLED ELECTRONIC SEWING MACHINE

CROSS-REFERENCE TO RELATED APPLICATIONS

This application is related to commonly owned copending U.S. patent application Ser. No. 973,386, filed Dec. 26, 1978, entitled "Improved Household Type Sewing Machine Having Microprocessor Control", and naming Nereo Bianchi and Gianfranco Garbonato as the joint inventors thereof, and is an improvement thereon.

BACKGROUND OF THE INVENTION

1. Field of the Invention

The present invention relates to an electronic sewing machine and more particularly to a machine having an improved electronic control for the stitch forming members, namely for the transverse oscillations of the needle bar and for the longitudinal displacement of the member feeding the fabric on which the said stitch is produced.

2. Description of the Prior Art

In the present art electronic sewing machines are known which provide the drive and control of the transverse oscillations of the needle bar and the longitudinal displacement of the cloth conveyor member via corresponding actuators which are moved in accordance with given moments of synchronism and given positioning times. The household sewing machines of this type which are known to applicants generally memorize information relative to the positions of the needle bar and the feed member in accordance with a digital code in a read-only memory or in another static memory, such as disclosed in U.S. Pat. No. 3,984,745. Such memory is merely a data bank which is explored sequentially in conventional manner during the performance of a predetermined sewing program, starting with the first stitch of a selected pattern, up to the last stitch of said pattern, and thus repetitively. Sewing machines of this type, however, have the drawback of not permitting a processing of the data memorized for such patterns and therefore they do not possess operational flexibility in the use of such data, so that it is not possible to change the execution of the memorized patterns in order to vary any of their characteristic parameters such as width, density of stitch, alternative combinations, etc.

Several of the problems which have existed in the prior art due to various limitations resulting from the design of such electronic sewing machines have been overcome by the system shown and described in commonly owned U.S. patent application Ser. No. 973,386, filed on Dec. 26, 1978, and entitled "Improved Household Type Sewing Machine Having Microprocessor Control". The contents of this commonly owned application, in which it is possible to vary substantially, as the operator desires, the actual execution of the various patterns memorized are specifically incorporated by reference herein in their entirety. Thus, the problems existent in the prior art known to applicants up to the filing of that application are discussed therein; such as with respect to U.S. Pat. Nos. 4,108,093; 4,086,862 and 4,116,144 and need not be reiterated herein.

However, although the electronic sewing machine described in U.S. patent application Ser. No. 973,386 is a satisfactory solution which overcomes many problems previously existent in the prior art, it is essentially an analog solution having certain possible drawbacks with respect to stability, reliability, testability and maintainability. These disadvantages are overcome by the improved digital type solution of the present invention which provides a faster response at the same power levels with the same actuator than is possible with the analog solution of U.S. patent application Ser. No. 973,386. Suffice it to say in describing the system of U.S. patent application Ser. No. 973,386, that the DC actuators of the stitch forming members, namely the needle bar and the feed member, are controlled through an analog type servo loop and the digital position commands provided from the microcomputer or microprocessor for arriving at the desired position of the actuators. In accomplishing this, the digital command signals to the actuators are converted into corresponding analog signals by a suitable digital-to-analog converter placed downstream of the microcomputer. The position control in the aforementioned analog type servo loop is therefore accomplished by operating on such analog signals since the analog position transducer, which is generally a potentiometer, generates a voltage proportional to the actual position of the stitch forming controlled member which is fed back and compared, in analog fashion, with the control voltage signal to determine the position error, if any. The resultant voltage, which is proportional to the position error, through a suitable power amplifier, controls the movement of the corresponding actuator, for bight or feed, in such sense and direction so as to reduce the position error to zero. In this position control servo loop an internal speed servo loop is inserted for intrinsic dynamic reasons (the positioning times required being on the order of 15 to 20 milliseconds and, therefore, being comparable to the time constants of the actuators). The speed signal which corresponds to the actual speed of movement of the actuators is not, however, generated by a separate transducer for obvious reasons of cost, but is rather obtained as a variation in the time of the positioning signal. Therefore, in order to obtain this speed signal, a voltage proportional to the derivative of the position and therefore to the speed is generated. The previously mentioned position error rather than being sent directly to the power drive of the actuators is therefore compared with this speed signal and the resultant comparison signal, in its turn, drives the power amplifiers of the actuators. Accordingly, this analog embodiment of the control system described in U.S. patent application Ser. No. 973,386 comprises two analog servo loops, one within the other, with one relating to the position and the other to the speed of the actuators. These two analog servo loops make it possible to solve the problem of the positioning of the electronic sewing machine feed or bight actuators in the desired dynamic terms. This analog solution, which is relatively satisfactory in view of what has been stated above, does not, however, represent an optimum solution such as, for example, providing a slower response at the same power levels with the same actuator than is obtained by the improved system of the present invention. Thus, despite digital servo control of positioning of machine tools being well known, such as disclosed in U.S. Pat. Nos. 3,504,362; 3,483,362; 3,795,851; 3,546,599; 4,090,116; 2,885,613; 2,932,471; 3,063,311; 3,644,897; 3,958,109; 3,752,098; 3,189,805; 3,225,279; 3,643,076; 3,758,757; 3,226,617; 3,065,394; 3,939,390 and 3,872,808, there are no prior art systems known to applicants which have the overall capabilities of the present invention for providing a flexible and efficient electronic sewing machine.

SUMMARY OF THE INVENTION

The present invention is an improved electronic type sewing machine in which a microcomputer integrated circuit arrangement, such as a master/slave microprocessor configuration, is employed to effectuate stitch position coordinate servo control for both bight and feed through digitally closing the position servo control loop. The sewing machine includes a bed, a standard rising from the bed, a horizontal arm overhanging the bed, the arm ending with a head, a needle bar means disposed in the head for enabling transverse oscillation thereof relative to the direction of fabric feed in the sewing machine, feed means for adjusting the length and direction of the fabric feed, actuator means for adjusting the transverse position of the needle bar means and the positional displacement of the feed means in response to control signals provided thereto and static memory means, such as a read-only-memory, for retrievably storing a plurality of different predetermined stitch patterns each having associated retrievably stored bight and feed data corresponding to predetermined positional coordinates of the needle bar and feed means for defining associated stitch position coordinates for the stitches comprising the stitch patterns. As previously mentioned, the improved sewing machine includes the microcomputer arrangement which is operatively connected to the static memory. There may be separate microprocessors for bight and feed control or there may be a common microprocessor for both bight and feed. In either instance separate actuators, such as analog reversible DC motors, are provided for the bight and feed. The microcomputer arrangement is connected to the actuator which it controls as well as to the static memory containing the requisite data. A transducer arrangement is connected between the actuator controlled and the digital input of the microcomputer for providing a digital input signal to the microcomputer representative of the actual position of the actuator. This may be accomplished by a digital transducer, such as an optical encoder, or an analog transducer, such as a potentiometer, and an analog-to-digital converter. In either event the microcomputer closes the position servo control loop and digitally compares the actual position of the actuator with the desired position of the actuator and enables correction for any position error present. In addition, in both instances, either where there is a pure digital position servo control loop or a hybrid analog/digital position servo control loop, there is a separate analog speed servo loop which, together with the position servo control loop, effectuates position control of the corresponding bight and feed actuators. Where the master/slave microprocessor configuration is employed, the slave microprocessor is employed to close the position servo control loop and the master microprocessor is employed to process the stitch position coordinate data and provide the desired digital position input to the slave microprocessor for digital position error comparison with the actual digital position input.

BRIEF DESCRIPTION OF DRAWINGS

For a better understanding of the present invention there will now be described, by way of illustration and not of limitation, a few embodiments thereof with reference to the accompanying drawings, in which:

FIGS. 5A, 5B and 5C taken together represent a schematic diagram, partially in block, of a presently preferred embodiment of the block diagram of FIG. 4;

FIGS. 7A, 7B, 7C, 7D, 7E, 7F and 7G represent logic operation diagrams relating to the slave microprocessor employed with the preferred position servo control loop of the circuit arrangement of FIG. 5A;

FIGS. 9A and 9B represent logic operation diagrams relating to the slave microprocessor included in the position control servo loop of the circuit arrangement of FIGS. 8A and 8B;

FIG. 10 is a graphic illustration, partially diagrammatic, of the synchronization in the preferred control system of the improved electronic sewing machine of the present invention;

FIG. 47 is a graphic illustration of a plurality of different stitch patterns which may be stored in the stitch pattern memory of the present invention and provided by the sewing machine of the present invention, with exemplary pattern code numbers being shown adjacent to each of the patterns, and with the last illustration being of an exemplary non-stored stitch pattern arrangement created from the above stored stitch patterns in accordance with the present invention;

FIG. 51 is a graphic illustration similar to FIGS. 49 and 50 illustrating the stored stitch pattern data corresponding to a buttonhole stitch pattern.

DETAILED DESCRIPTION OF PREFERRED EMBODIMENTS

Figure 1:
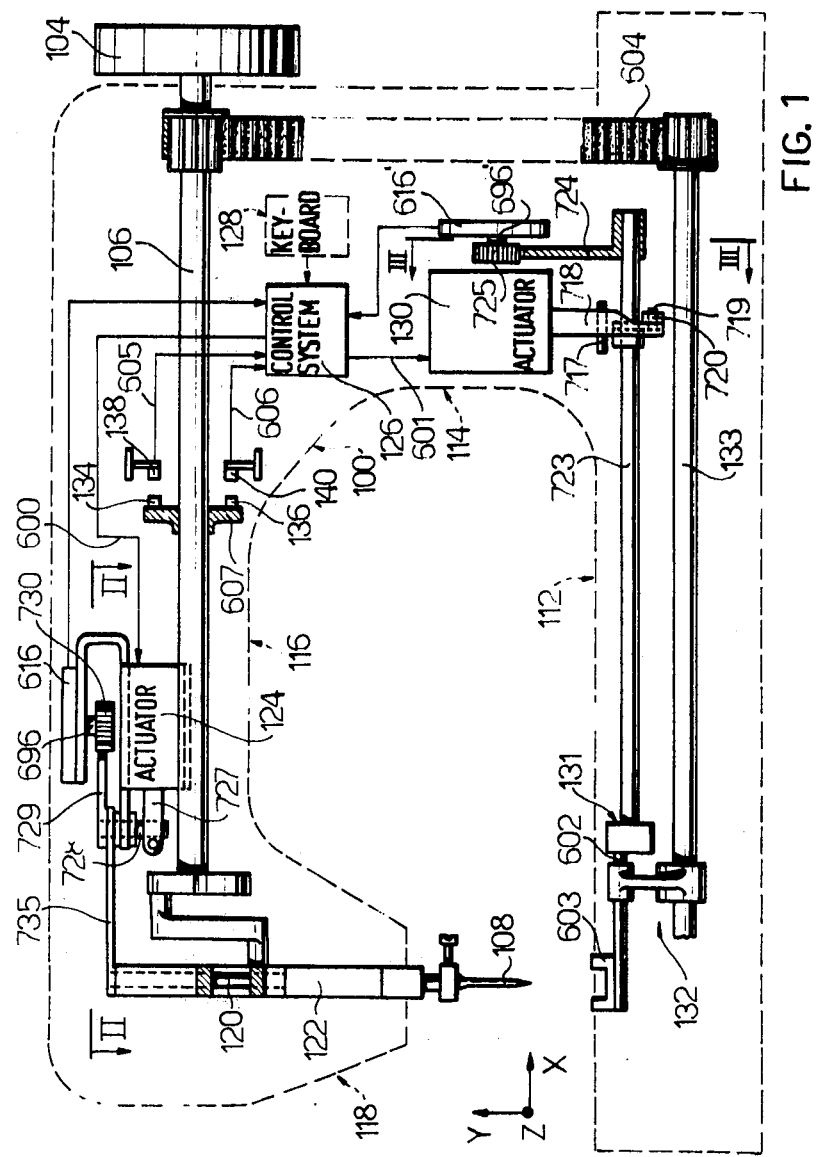
FIG. 1 is a diagrammatic side view of one embodiment of the improved electronic sewing machine of the present invention, illustrating a presently preferred arrangement of certain component elements.
Figure 6:
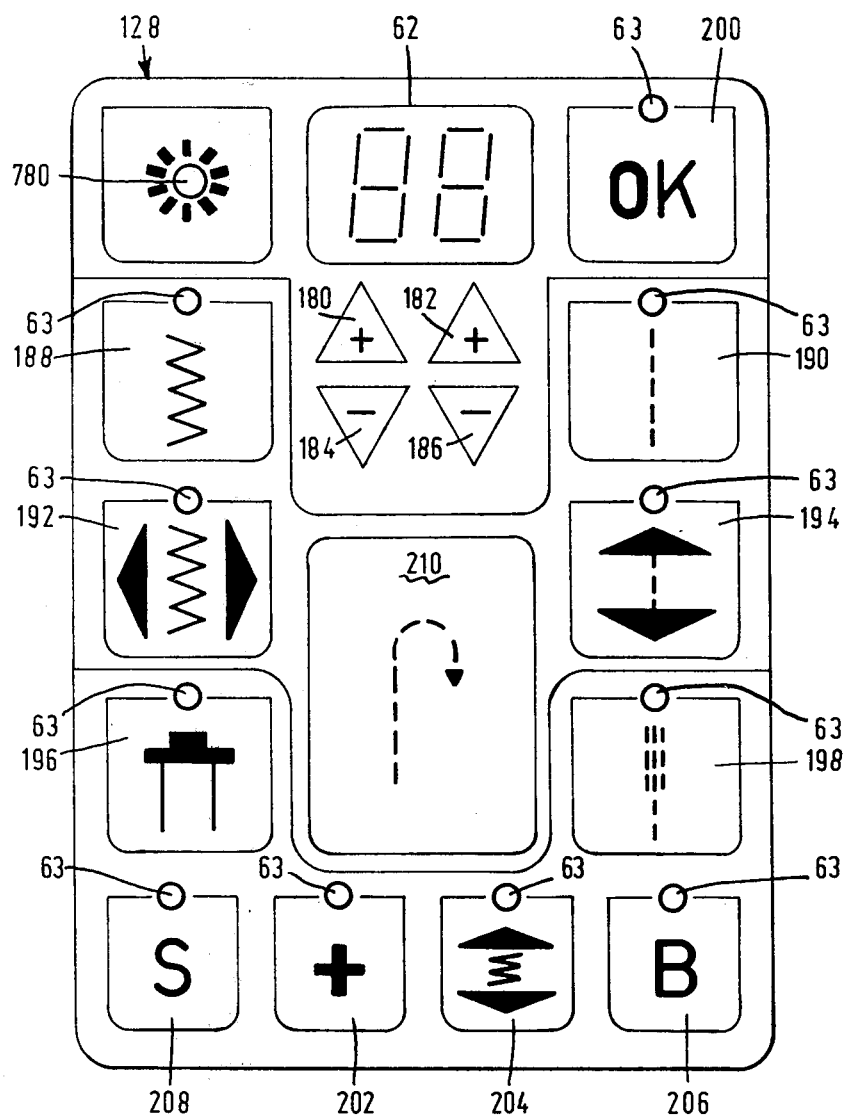
FIG. 6 is a diagrammatic illustration of a preferred embodiment of a keyboard used in the improved electronic sewing machine of the present invention.

Referring now to the drawings in detail, and initially to FIG. 1, there is diagrammatically shown therein a presently preferred embodiment of the electronic sewing machine of the present invention, indicated generally by the reference numeral 100. The sewing machine 100 preferably comprises a structure preferably formed of a conventional bed 112, a conventional standard 114 rising from the bed 112 and a conventional horizontal arm 116 overhanging or extending over the bed 112 and terminating in a conventional head 118, comprising a conventional type of needle bar 120, borne by a mount 122. This mount 122 is mounted at the end of the arm 116 and in the head 118 so as to effect transverse displacements (along the X axis illustrated in FIG. 1) in response to controls received from an electromechanical actuator 124, developed in a conventional manner, for instance via a rotary actuator, in particular a reversible DC motor, or through a linear actuator, such as described in copending U.S. patent application Ser. No. 973,386, filed Dec. 26, 1978. As will be described in greater detail hereinafter, the electromechanical actuator 124 is electrically connected, via path 600, to the preferred electronic control system 126 of the present invention, in order to be driven by control signals which, via a kinematic chain which will be described in greater detail with reference to FIG. 2, control the transverse displacements of the needle bar 120. Preferably a keyboard 128, which will be described in greater detail below with reference to FIG. 6, is operatively connected to the electronic control system 126, and can be operated by the operator in order to select a given pattern or create a variation thereof. This keyboard 128 is preferably located on the standard 114 of the sewing machine 100 for the convenience of the operator although, if desired, the keyboard 128 could be disposed separately from the structure of the sewing machine 100 and merely connected electronically via cable to the electronic control system 126. The electronic control system 126, as will be described in greater detail below, is also operatively connected, via path 601, to another electromechanical actuator 130 which again may be of the linear or rotary type, for instance a reversible DC motor. This second actuator 130 is preferably connected, via another kinematic chain which will be described in greater detail with reference to FIG. 3, to an element 131 of substantially conventional type which is connected to one part 602 of a conventional transport or stitch regulating member 132 in order to control the regulation of the length of the movement (along the Z axis illustrated in FIG. 1) of a conventional feed dog 603. The sewing machine 100 also preferably comprises a conventional flywheel 104 which is arranged at one end of a main shaft 106 which turns with the flywheel 104 when the latter is actuated by the conventional main motor (not shown) of the sewing machine 100. The shaft 106 and the main motor control the reciprocating movement (along the Y axis illustrated in FIG. 1) of a needle 108 for the conventional sewing of the fabric, which is displaced via the feed dog 603 driven by the transport member 132 which, in addition to the aforementioned reciprocating movement along the Z axis illustrated in FIG. 1, is provided in a conventional manner with a reciprocating movement along the Y axis illustrated in FIG. 1. This transport member 132 is in fact conventionally driven by a shaft 133 which receives the motion from the shaft 106 via a belt 604 as shown in FIG. 1.

As was described with respect to the system in copending U.S. patent application Ser. No. 973,386, filed Dec. 26, 1978, a device indicated by reference numerals 134, 136, 138 and 140, which generates synchronization signals and which will be described in greater detail hereinafter, is connected to shaft 106 and supplies synchronization signals via paths 605 and 606 to the electronic control system 126 which are indicative of the position of initial movement of the actuator 124 which regulates the transverse width of the stitch and the position of initial movement of the actuator 130 which regulates the advance of the fabric. These synchronization signals via paths 605 and 606 are preferably generated by a system comprising a pair of movable magnets (134 and 136) and a pair of Hall effect sensors (138 and 140) which remain stationary. The two movable magnets 134 and 136 are preferably fastened to a disk 607 of non-ferromagnetic material which rotates in synchronism with the main shaft 106 of the sewing machine 100.

As shown and preferred in FIG. 10, the preferred angle arrangement between the stationary Hall effect sensors 138 and 140 is approximately 175° and the preferred angular positions during the rotation of the main shaft 106 in which the two synchronism signals provided via paths 605 and 606 are generated are graphically illustrated in FIG. 10, in which the first position is the position of the initial movement of the actuator 124 which regulates the transverse width or bight and the second position is the position of the initial movement of the actuator 130 which regulates the transport or feed. Preferably this second position has a lag of approximately 175° with respect to the aforementioned first position during the rotation of the main shaft 106. Thus, FIG. 10 represents a graph of the actual value of displacement of the needle bar 120 as a function of the angular position of the flywheel 104 which corresponds to the rotation of the main shaft 106 or of the magnets 134 and 136 which rotate in synchronism with the latter. Since the graph of FIG. 10 is sufficiently clear, it will not be described in greater detail. Suffice it to say that the regulation control for the needle bar 120 and for the feed member 132, respectively, is supplied to the sewing machine 100 in proper relationship with the actual moments of synchronism with respect to the cycle of oscillation of the needle bar 108. Accordingly, the control for the transverse movement for the needle bar 120 is preferably imparted to the mount 122 when the needle 108 is raised from the fabric and the control for the longitudinal movement of the feed dog 603 is preferably imparted to the element 131 when the feed dog 603 is reentered.

Figure 4:
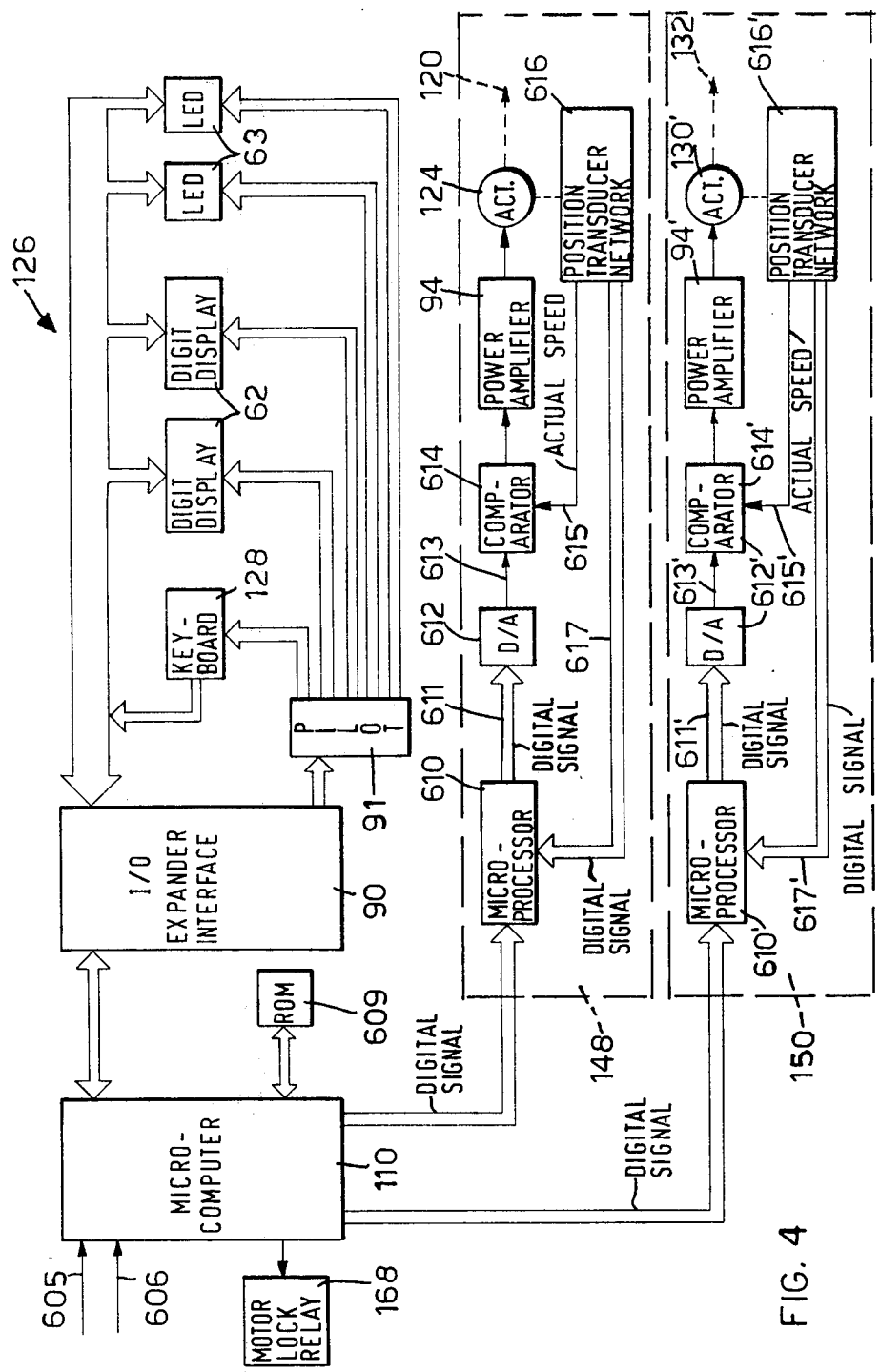
FIG. 4 is a block diagram of one preferred embodiment of the improved electronic sewing machine master/slave microprocessor control system in accordance with the present invention.

Referring now to FIG. 4, the control system 126 is shown in greater detail, although still in terms of a functional diagram. This control system 126 preferably comprises a microcomputer 110, which is preferably an integrated circuit which contains the microprocessor, the associated read-only control program and the associated input and output registers in a single chip such as, for example, a microcomputer of the INTEL 8049 type, having 2K of ROM (read-only-memory) of the control program and conventionally comprising the execution control program. The various portions of the chip of the microcomputer 110 are preferably interconnected to one another in the integrated circuit in conventional manner in order to transfer the data and the addresses in appropriate fashion, such as in the manner previously described in commonly owned copending U.S. patent application Ser. No. 973,386, the contents of which are specifically incorporated by reference herein in their entirety. Suffice it to say that the chip of the microcomputer 110 preferably comprises a microprocessor comprising a central processing unit to control the various functions of the microcomputer 110, such as selections or operations on the memorized data of the patterns as described in the aforementioned copending U.S. patent application. The central processing unit of the microcomputer 110 effects the various functional operations in accordance with the instructions contained in the program control memory which is connected to the microprocessor by different ways for the transfer of the data and of the addresses which connect together the central processing unit (or arithmetic logic unit), the input/output registers, and the various operative registers associated with the microcomputer 110. These operative registers which are contained in the microprocessor are preferably used to memorize, for a predetermined time, intermediate results of the logical arithmetic operations carried out by the central processing unit, as well as to memorize the state of the system, as was previously described in U.S. patent application Ser. No. 973,386. The microprocessor also preferably comprises a random access memory (RAM) in order to temporarily memorize the data necessary to permit a logical processing of the data, such as pattern data, by the central processing unit or by the arithmetic logic unit of the microprocessor, such as interpolation of the data for providing a constant stitch density as the length of the pattern is varied as described in U.S. patent application Ser. No. 973,386. The input and output registers of the microprocessor permit an exchange of information between the chips of the microcomputer 110 and the electromechanical actuators 124 and 130 and the keyboard 128.

As shown and preferred in FIG. 5A, a conventional clock signal generator 146 supplies clocking signals to the central processing unit of the microprocessor. This clock generator 146 is illustratively shown as being outside of the chip of the microcomputer 110 although, if desired, it could also be formed as a portion thereof. As will be described in greater detail hereinafter, different operative data of control signals corresponding to the operating instructions are memorized in the control program of the read-only-memory which, together with the enabling of the microprocessor to operate functionally on this data, permit the microcomputer 110 to convert sewing patterns or data memorized in a read-only-memory 609 into a succession of positions of the needle bar 120 and of the stitch regulating member 132 in order to provide a desired type of pattern on the fabric which is being sewn, comprising the creation of patterns not memorized per se in the memory 609 such as, for example, a combined arrangement of patterns, or one in which a constant stitch density is maintained while the length of the pattern is varied. As fully discussed in copending U.S. patent application Ser. No. 973,386, this possibility of the microprocessor to operate functionally on this memorized pattern data contained in the read-only-memory 609 permits a considerable flexibility in the modification of the succession of positions of the needle bar 120 and of the stitch regulating member 132, making it possible both to produce the patterns memorized and to be able to obtain an alteration thereof so as to provide patterns different from those actually memorized, as a function of selections effected by the operator on the keyboard 128. These selections, as will be described in greater detail hereinafter, generate different input control signals for the microprocessor which, in response to said signals, operates on the memorized selected data of the patterns to provide the desired pattern embodiment through output signals suitable for the corresponding electromechanical actuators 124 and 130 which determine the desired pattern on the fabric which is being sewn.

As further shown and preferred in FIG. 4, the microcomputer 110 controls separate position control circuits 148 (for bight) and 150 (for feed) for the needle bar 120 and the stitch regulating member 132, respectively. Preferably, each of these position control circuits 148 and 150 is functionally identical. The output signals of the microcomputer 110 which contain information corresponding to the desired position for the needle bar 120 and for the stitch regulating member 132 are preferably digital output signals and the position control circuits 148 and 150 are preferably closed servo loops which effect the comparison and processing of these digital signals.

In particular, such digital output signals of the master microcomputer 110 arrive, for instance, for the position control circuit 148, at a slave microprocessor 610, such as one of the INTEL 8041 type which, as will be described in greater detail hereinafter, preferably supplies a speed control digital signal 611 to a conventional digital-to-analog converter circuit 612 which, in turn, generates a signal via path 613 which is proportional to the speed required. This signal provided via path 613 is provided to a conventional comparator 614 which effects the comparison between the speed desired and the actual speed which is preferably provided via path 615 as the output of a position transducer 616. The output of the comparator 614, which is the difference between these two velocity signals, is in turn provided to control a conventional power amplifier 94 which directly drives the corresponding actuator 124, such as a reversible DC motor, for control of its positioning. As shown and preferred in FIG. 4, the position transducer circuit 616 is preferably associated with actuator 124 so as to provide an analog velocity signal via path 615 which represents the actual speed, and a digital position signal via path 617 which corresponds to the actual position and which is provided as an input to slave microprocessor 610, which in turn digitally compares this signal with the desired position signal coming from the microcomputer 110 and then generates the speed control digital servo control output signal via path 611 which is proportional to the desired velocity value and which is of a value for cancelling out the difference between the desired and actual position signals so as to obtain the desired positioning of the actuator 124. Since the preferred comparison in slave microprocessor 610 is a digital one, this cannot be continuous but must be subjected to a sampling frequency determined by the frequency of the clock signals of the microprocessor 610. The above mentioned digital type position servo control loop permits, inter alia, the carrying out of certain additive functions which are distinctly different when contrasted with the analog solution described in copending U.S. patent application Ser. No. 973,386. For example, as will be described in greater detail hereinafter, during the acceleration phase for the actuator 124 corresponding to a new command and, therefore, the reaching of a new position, the microprocessor 610 instead of considering the position error as an analog magnitude tries to optimalize the dynamic performance of the actuator 124, driving it, therefore, in accordance with a law of maximum acceleration and, hence, of maximum current. Moreover, on the basis of the position reached, instant by instant, the system of the present invention can determine the optimal instant for the commencement of the deceleration phase for the actuator 124 and, accordingly, control the desired speed of the actuator 124 in accordance with a braking law of optimal type with respect to the minimum positioning times.

Figure 4A:
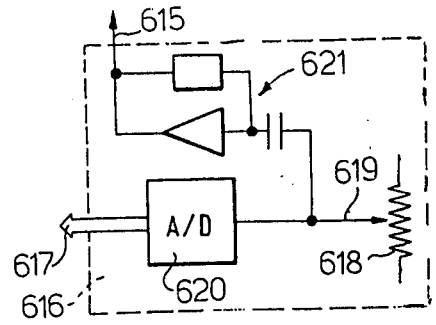
FIGS. 4A and 4B are two block diagrams, partially in schematic, of two different preferred embodiments of the transducer portion of the system of FIG. 4.

The aforementioned transducer employed in network 616 may be an analog type or a digital type, although an analog transducer is presently most preferred for household type sewing machine applications. In the case of such an analog transducer, such as illustrated in FIG. 4A, the transducer preferably comprises a potentiometer 618, connected in a conventional manner. The slider 619 of this potentiometer 618 generates an analog signal proportional to the actual position of the actuator 124. This analog signal provided via slider 619 is in turn provided to a conventional analog-to-digital converter 620 which in turn provides the digital signal via path 617 corresponding to the actual position of actuator 124. The actual velocity or speed signal provided via path 615 is, however, generated directly from the position signal via slider 619 via a conventional differentiator circuit 621. It should be noted that even when operating with an analog position transducer, the closing of the position servo control loop always preferably takes place with digital signals provided to microprocessor 610. Thus, preferably there is an analog servo control speed loop, and a position servo control loop which is, at the very least, closed digitally.

Figure 4B:
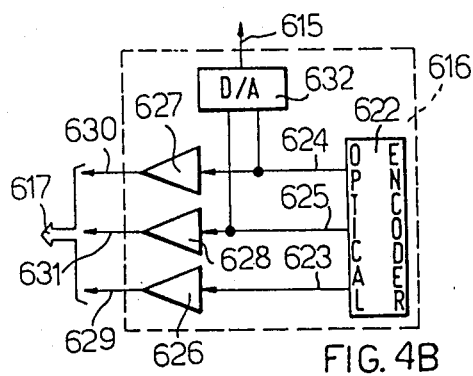

When a digital position transducer is employed, such as illustrated in FIG. 4B, this transducer preferably comprises an incremental optical encoder 622 which is bidirectional and provided with absolute zero impulse. This optical encoder 622 preferably generates, as output signals, a zero reference signal 623 of pulse form and two wave forms 624 and 625 preferably differing in phase by an electrical angle of 90°, such as illustrated in FIG. 4E by way of example, and having a frequency proportional to the speed of movement of the actuator 124. These signals 623, 624 and 625 which are conveniently squared in circuits 626, 627 and 628 to generate digital signals of levels 0 and 1, namely 629, 630 and 631, respectively, supply the aggregate signal via path 617 which is sent to the slave microprocessor 610 as actual position incremental digital information. A position software counter within the microprocessor 610 therefore makes it possible to determine, moment by moment, the actual position of the actuator 124, as is also true in the example illustrated in FIG. 4A. This digital transducer 622 preferably generates, via a digital-to-analog converter 632, an analog signal which is proportional to the frequency of the wave forms 624 and 625 at the output of the optical encoder 622 and with proper sign, and which represents via path 615 the actual velocity or speed of the actuator 124.

Figure 4C:
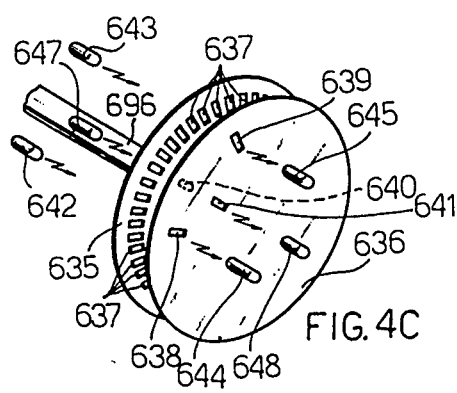
FIG. 4C is a fragmentary diagrammatic view, in perspective, of the optical encoder portion of the transducer portion shown in FIG. 4B.

A preferred embodiment of optical encoder 622 is shown in FIG. 4C in which encoder 622 preferably comprises a disk 635 connected with a shaft 696 to the actuator 124 via a suitable multiplication system, as will be explained in greater detail hereinafter, and a fixed mask 636. On the disk 635 there are preferably aligned along the circumference, 200 slots 637 of constant pitch (FIG. 4D, the development in plan view of a section of a peripheral portion of the disk 635 with the slots 637). On the mask 636, corresponding to this circumference, there are preferably two windows 638 and 639 spaced suitably apart and of a pitch of preferably ¼, there being meant by the term pitch the distance between the left or right hand edges of two adjacent dark zones, or two transparent zones (FIG. 4D, the development in plan view of a section of this circumferential portion of the mask 636 with the two windows 638 and 639). On a second circumference which is inside the first, both on the disk 635 and on the mask 636 there is preferably provided a corresponding window 640 and 641, respectively. Two light-emitting diodes (LED) 642 and 643 and two phototransistors 644 and 645 are preferably positioned in correspondence with the windows 638 and 639 of the circumference of larger diameter and permit the generation, when the disk 635 rotates, of the two wave forms 624 and 625 (shown in FIG. 4E) of constant amplitude and a frequency which is a function of the speed of rotation.

Figure 4F:
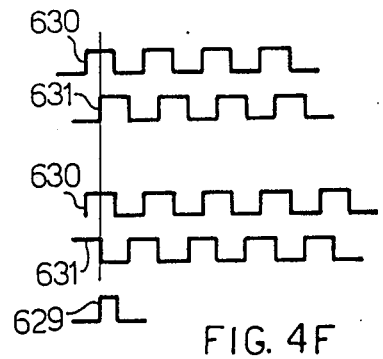
FIGS. 4E and 4F are graphic illustrations of exemplary wave forms present with the transducer of FIG. 4B.
Figure 4E:
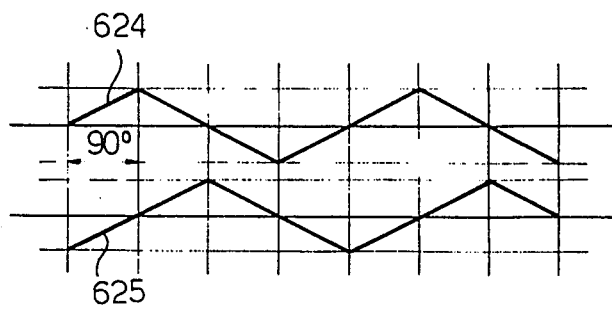
Figure 4D:
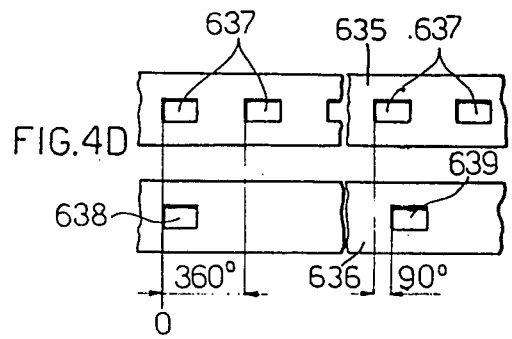
FIG. 4D is a fragmentary diagrammatic view of a part of the encoder of FIG. 4C.

Due to the phase shift between the two windows 638 and 639 of the stationary mask 636, the two wave forms 624 and 625, and thus the two signals 630 and 631, are out of phase in the period by 90° with the signal 631 leading or lagging with respect to the signal 630, depending on the direction of rotation of the shaft 696 connected to the actuator (FIG. 4F). The same combination of a light-emitting diode 647 and a phototransistor 648 operating with the windows 640 and 641 provided on the disk 635 and on the mask 636 corresponding to the circumference of smaller diameter generates the squared signal 629 (FIG. 4F) upon each rotation of the disk 635, designating the zero reference position.

As already stated, the preferred digital transducer 622 being of incremental type, upon the turning on of the machine there can be preferably automatically carried out through the slave microprocessor 610 a search sequence for the position of absolute zero of the transducer 622 to which the reference zero corresponds.

The position control circuit 150 for the feed for controlling actuator 130 (FIG. 4) is preferably functionally identical to the position control circuit 148 for the bight for controlling actuator 124 which was previously described. Consequently, the corresponding blocks and signals are indicated by the same reference numerals with a prime mark.

Figure 2:
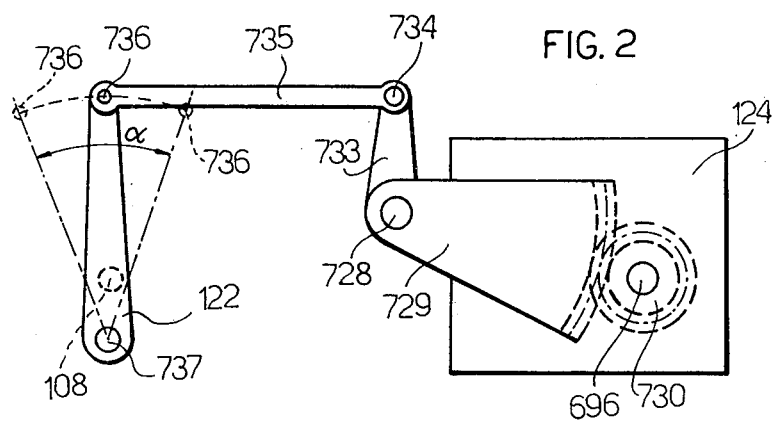

In one preferred embodiment, the kinematic connection between the actuator 124, the needle bar 120 and the position transducer 616 is illustrated diagrammatically in FIGS. 1 and 2.

As shown and preferred in FIG. 2, the actuator 124 is preferably of an oscillating type and preferably comprises a coil arranged on a core having an extension 727 which is connected to a pin 728. This pin 728 is therefore driven in rotation by the coil and in in turn oscillates a circular section 729 which is connected to a gear 730 which is fastened on the shaft 696 of the optical encoder 622 when such an encoder 622 is employed. To the pin 728 there is also fastened a crank 733 pivoted by a pin 734 to a connecting rod 735, in its turn pivoted by a pin 736 to the mount 122 of the needle bar 120. This mount 122 oscillates around a pin 737 fastened to the frame of the sewing machine 100. The needle bar 120 can thus carry out oscillations around pin 737 when the mount 122 of the needle bar 120 is urged into oscillation by the excursion of the coil of the actuator 124 which controls bight. These oscillations are what corresponds to the transverse displacements of the needle 108 on the fabric being sewn.

Figure 3:
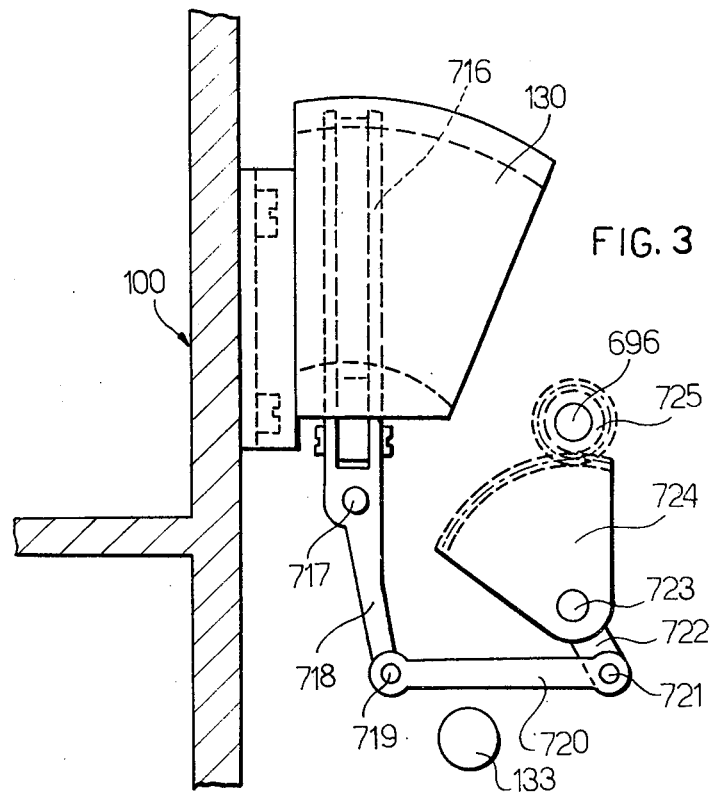
FIGS. 2 and 3 are fragmentary diagrammatic sectional views, taken along planes II—II and III—III, respectively, of the embodiment of FIG. 1.

With respect to the other actuator 130 which controls feed, a preferred embodiment of the kinematic connection between the actuator 130, the stitch regulator 132 and the position transducer 616′ is illustrated diagrammatically in FIGS. 1 and 3.

As shown and preferred in FIG. 3, the actuator 130 is preferably of an oscillating type and preferably comprises a movable coil 716 wound on a core and swingable around a pin 717 and, by its extension 718, connected by a pin 719 to a connecting rod 720 which in its turn is connected via a pin 721 to a crank 722. To the other end of the crank 722 there is preferably fastened a stitch regulating shaft 723 which bears, fastened to one end, the element 131 of the stitch regulator 132 while to the opposite end of the shaft 723 there is preferably fastened a toothed sector 724 coupled to a gear 725 fastened to the shaft 696′ of the rotating disk 635′ of the optical encoder 622′ of the position transducer 616′, when such an encoder 622′ is employed.

An oscillation of the coil 716 of the actuator 130 therefore causes a rotation of the shaft 723 and therefore a variation in the inclination of the element 131 which regulates the displacement of the feed dog 603 along the Z axis (illustrated in FIG. 1) and a corresponding rotation of the shaft 696′.

Referring to FIG. 2, the angle of rotation $\alpha$ of the mount 122 of the needle bar 120 is, for functional requirements, preferably contained with about 23°. To this oscillation there preferably corresponds a transverse displacement of the needle 108 of 8 mm. Preferably this field of excursion of 8 mm should be inspectable by the needle 108 in 63 intermediate positions: a central position, 31 positions to the left of this central position, and 31 positions to the right of this central position. This definition is more than sufficient to produce patterns of the most varied composition, such as described in the aforementioned copending U.S. patent application Ser. No. 973,386. Since to each penetration of the needle 108 into the fabric there preferably corresponds a command obtained from an information of the program control memory of the microcomputer 110, this digital information is preferably supplied by a word of 6 bits.

Therefore, the disk 635 of the optical encoder 622, in view of what has been stated above, should preferably effect a maximum rotation so that there are inspected by the rays of the photoelectric system 63 windows 637 to each of which there corresponds one of the aforementioned preferred 63 penetrations of the needle 108.

The size of this angle is immediately determined upon knowing the value of the preferred pitch between the windows 637 themselves. By establishing the ratio between this angle and the angle which the mount 122 of the needle bar 120 must form to establish the preferred 8 mm zig-zag, the transmission ratio between the pinion 730 mounted on the shaft 696 of the disks 635 and the toothed crown 729 connected to the actuator 124 may be obtained.

Thus, the rotation of the disk 635 should preferably take place for an extent of about 112° and the preferred transmission ratio is thus $112/23 \cong 5$.

The above remarks apply in principle also to the kinematic coupling with respect to the transducer 130 of FIG. 3 and need not be repeated.

In accordance with the present invention, separate digital type position servo control loops are preferably provided for the needle bar 120 and the stitch regulator 132, while there are also provided separate analog type speed servo control loops which control the dynamic response of the position control system itself.

Referring once again to FIG. 4, the microcomputer 110 therefore preferably operates in combination with the circuits of the keyboard 128 via an input and output line increment block 90; the aforementioned static memory 609 of the patterns, which is a read-only-memory, to provide the pattern data to the microcomputer 110; the aforementioned synchronism signals 605 and 606; and with a locking circuit 168 for the main motor of the sewing machine 100. This circuit 168, previously described in the aforementioned U.S. patent application Ser. No. 973,386, is preferably made in such a manner as to send a control signal to the winding of the relay of the conventional speed control circuit of the motor (not shown), employed in a conventional sewing machine, so as to close this relay and lock the motor.

Figure 5C:
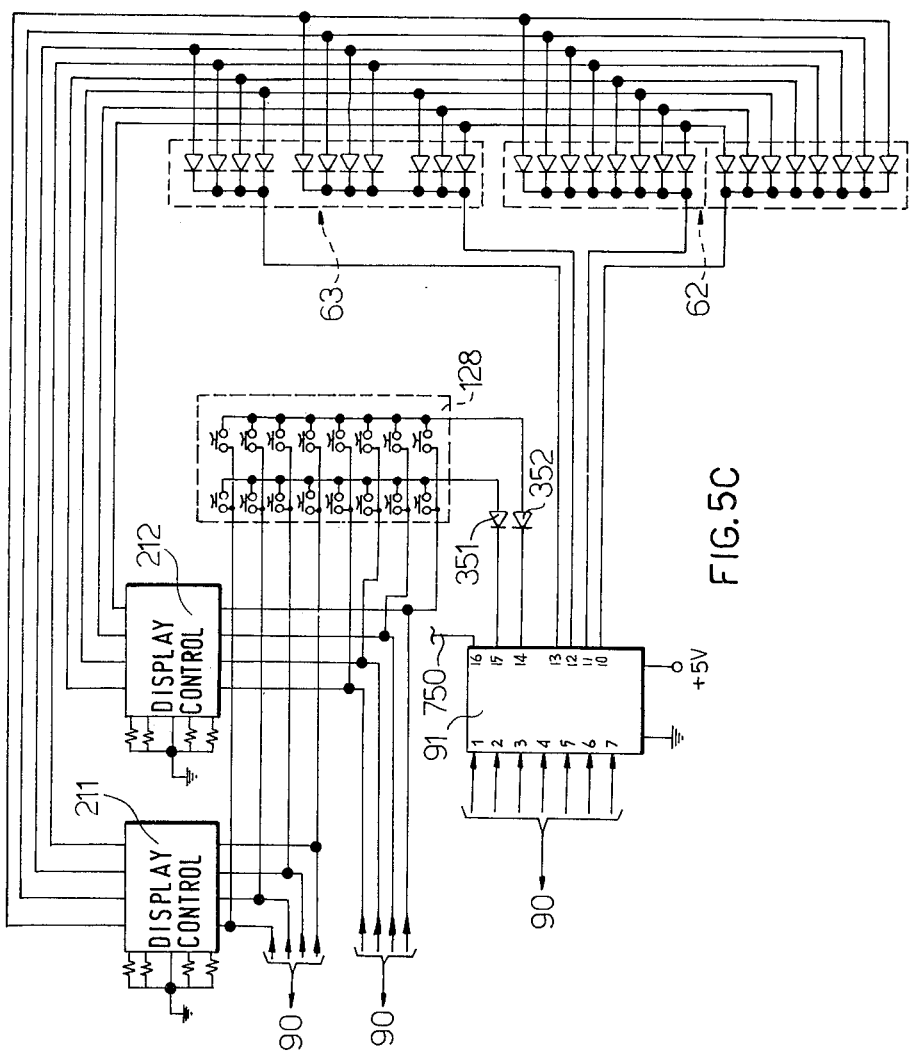

Referring again to FIG. 4, the interface 90 has the function of increasing the number of the inputs and outputs available with respect to the microcomputer 110. Preferably eight of these input signals are provided to convey the control information input signals from the keyboard 128 to the microcomputer 110 and from there to a numerical display 62 which preferably comprises two digit displays, as will be described in greater detail with reference to FIG. 6, and to groups 63 of light-emitting diodes which are associated with the various selection keys of the keyboard 128. Therefore, the keys of the keyboard 128, the luminous segment for the display 62 and the groups 63 of the light-emitting diodes are preferably subdivided logically into groups of eight for which there are, as illustrated in FIG. 5C, six groups in all comprising two groups of keys, two groups of digit display segments, and two groups of light-emitting diodes associated with the selection keys. Since all the data in exchange with these groups are preferably transmitted over these eight rows, the microcomputer 110 should recognize from which groups of keys the signals have been originated and furthermore to which groups the control signals from the microcomputer 110 are directed. This function is preferably realized through a conventional pilot block 91 for example, the type known as L 203, which, in combination with the aforementioned interface 90, supplies at the output sequential signals relating at different times to one group per time, conveying the data to the microcomputer 110 from each group of keys and data display for each group of light-emitting diodes.

Although not illustrated, the sewing machine 100 is preferably actuated conventionally by a conventional control pedal which activates the main motor to cause the rotation in conventional fashion of the shaft 106 of the sewing machine itself. Because of locking circuit 168, this operation cannot take place until a suitable pattern selection has been selected on the keyboard 128 and recognized by the microcomputer 110.

As previously mentioned with reference to FIG. 10, the control system 126 preferably synchronizes its own operations as a function of the synchronism signals 605 and 606 received, which signals indicate the moment when the command for the stitch regulator 132 and the needle bar 120 must be effected. When these synchronization signals are present, the microcomputer 110 preferably seeks information concerning the movement of the stitch regulator 132 and the needle bar 120 for the next stitch. When this data has been found, the microcomputer 110 operates on this data in the manner indicated by the input control signals provided by the keyboard 128 so as to preferably multiply these signals by an amplification coefficient of 1 if the pattern memorized in the memory 609 is to be thus reproduced and by any other factor if the data of the pattern is to be modified. The digital output control signals from the microcomputer 110, as already stated, are therefore sent to the circuits 148 and 150 in order to control the transverse movements of the needle 108 and the advance of the claw 603, respectively, since the digital output signals supplied by the microcomputer 110 correspond to the position coordinates of the various stitches which define the operative positions of the actuator 124 and of the actuator 130 for approximately positioning the needle bar 120 and the stitch regulator 132, respectively, so as to bring them into the positions desired for these stitches.

Referring now to FIG. 6, the structure and the function of the keyboard 128 illustrated will be described in detail. This keyboard 128 comprises the aformentioned two digit display 62 in which each of the digits preferably comprises a conventional segment display. This display 68 displays the two numbers in code corresponding to the pattern selected, as well as other numerical information, for instance length and width of pattern, as will be described hereinafter. The keyboard 128 preferably comprises a plurality of keys, for instance 16, indicated by the numbers 180, 182, 184, 186, 188, 190, 192, 194, 196, 198, 200, 202, 204, 216, 208 and 210, so as to provide different input control signals to the microcomputer 110. As illustrated, keys 188–208, inclusive, all have associated with them light-emitting diodes 63 arranged adjacent them to provide a signal which indicates which key has been selected. On the other hand, key 210 and keys 180, 182, 184 and 186, which are preferably associated with the increment and decrement of the indication of the display 62, with keys 182 and 186 being associated with the less significant digit and with the keys 180 and 184 being associated with the more significant digit of the display 62, do not have associated light-emitting diodes 63.

As already stated, the sewing machine 100 preferably cannot operate until a suitable function has been selected by means of the keyboard 128. Since the straight stitch and the conventional zig-zag stitch are normally the most frequent stitches selected in a household type sewing machine, two special keys are preferably provided for these stitches. Thus, the key 188 is provided for the selection of the conventional zig-zag stitch and the key 190 is provided for the selection of the conventional straight stitch. Corresponding bulbs 63 of light-emitting diodes preferably light up as soon as the corresponding key 188 or 190 has been depressed. The microcomputer 110 then unlocks the main motor and, after the control pedal (not shown) has been actuated by the operator, the sewing machine 100 will sew in accordance with the pattern selected.

The aforementioned keys 180, 182, 184 and 186 permit the selection of all the other patterns memorized (with the exception of the straight stitch and zig-zag stitch patterns) contained in the pattern memory 609. As already mentioned, a two digit code number is preferably assigned to each of the memorized patterns and this two digit number is preferably introduced via the keyboard 128 by means of the keys 180, 182, 184 and 186, with keys 180 and 182 increasing the digits from 0 to 9 with keys 184 and 186 decreasing the digits from 9 to 0. When these keys 180–186 are depressed, the display 62 will immediately light up the corresponding digits. By keeping the keys 180 or 182 depressed, the corresponding digits will be incremented continuously. On the other hand, by keeping the corresponding keys 184 or 186 depressed, the digit associated with the display 62 will decrease continuously. When the desired digit is reached, the key is released and the display 62 stops. When the numerical combination in the display 62 corresponding to the desired pattern has been obtained, this information must be confirmed to the microcomputer 110. This confirmation is accomplished by depressing the key 200 (OK) which generates a confirmation signal which is transmitted to the microcomputer 110. The light-emitting diode 63 arranged above the key 200 lights up, indicating to the operator that the machine 100 is ready to produce the pattern selected. If in any way the operator selects a code number which does not correspond to a pattern memorized in the memory 609 and then depresses the key 200, the display 62 will generate an error signal, for instance the letter E, indicating to the operator that the pattern selected does not exist in the memory. The same error signal appears if the operator has not properly selected the alternate or composite pattern function indicated by the key 202, as will be described.

By the other keys indicated it is therefore possible to obtain the production of the patterns at the desired moment in the different combinations or variations thereof. For example, by means of the key 210 the direction of the stitches or of the feed is reversed. Via the key 198, associated with the key 190, there is obtained an initial tacking phase associated with the production of straight stitches. By means of the key 208 there is selected a single execution of a particular pattern. By the key 194 the length of the stitch of a selected pattern is increased or decreased. By the key 192 the width of the stitch can be varied. By the key 206, there can be provided an electric balance control of the stitches to compensate for possible variations in the feeding of the fabric. By the key 204 the density of the stitch for a given pattern can be controlled. By the key 202 two types of patterns can be produced alternately. By the key 196 a double needle can be used, with an automatic reduction of the width of the stitch if necessary. In the keyboard there is also present a bulb 780 which is connected with the main power switch of the machine 100.

The operation of all of these keys is not described in greater detail here since it has already been described in the aforementioned copending U.S. patent application Ser. No. 973,386, the contents of which have been specifically incorporated by reference herein in their entirety. Suffice it to say that the sewing machine 100 of the present invention cannot operate until the appropriate functions have been selected by the keyboard 128. Since the straight stitch and the conventional zig-zag stitch are normally frequently used stitch patterns, special keys are provided for these stitches as opposed to requiring the selection of these stitch patterns in the preferred manner for selection of any of the other stored stitch patterns. Thus, key 188 is provided for selection of the conventional straight stitch. Corresponding light-emitting diode signal lamp 63 preferably turns on as soon as the corresponding key 188 or 190 is depressed. The selection must thereafter be confirmed by depressing the key 200 marked OK which confirms to the electronic control system 126 that this is the stitch pattern arrangement desired by the operator. The microprocessor chip 110 will then unlock the main drive motor and, thereafter, once the foot pedal control (not shown) is activated by the operator, the sewing machine 100 will sew in accordance with the selected stitch pattern. The previously mentioned keys 180, 182, 184, 186 enable selection of all the other stored stitch patterns apart from the zig-zag and straight stitch patterns, contained in the stitch pattern memory 90. As was previously mentioned, a two digit code number is assigned to each of these stored stitch patterns, such as illustrated in FIG. 47, and this two digit code number is introduced via the keyboard 128 by means of keys 180, 182, 184 and 186, with keys 180 and 182 incrementing the display from 0 through 9, , and with keys 184, 186 decrementing the display from 9 through 0.

As was previously mentioned, if it is desired to invert the stitch direction, or reverse feed, the operator then depresses the reverse feed key 210. The microprocessor chip 110 will then provide output control signals reversing the direction of feed and enabling the stitch pattern selected to be sewn in the reverse direction. The corresponding light emitting diode 63 associated with key 210 will then be turned on or lit to indicate to the operator that the reverse feed function has been selected. If the operator wishes to resume sewing in the forward direction, the reverse feed key 210 is depressed again and the microprocessor chip 110 will then provide output control signals causing the feed to revert to the forward feed direction and the associated light emitting diode 63 will go off. Thus, the output control signals from the microprocessor chip 110 which are provided in response to selection of the reverse feed function, reverses the polarity of the drive governing the feed, making possible a repetition, with reverse feed, of all of the selected patterns.

As was previously mentioned, key 190 preferably selects the straight stitch pattern. However, if key 190 is selected together with key 198, which corresponds to the tacking key, the sewing machine 100 will preferably automatically perform initial tacking and thereafter will continue to sew onward with the straight stitch pattern. When keys 190 and 198 are selected, the corresponding light emitting diode 63 will be turned on; however, when the initial tacking function has been completed, the light emitting diode 63 located adjacent key 198 will turn off indicating to the operator that the initial tacking has been completed. This initial tacking is a reinforcing operation which is carried out in a straight stitch to reinforce the sewing at the start of the stitch and prevent the unraveling of the thread. Preferably the output control signals provided by microprocessor chip 110 under these circumstances cause three straight stitches to be provided forward and three straight stitches to be provided backward to accomplish this initial tacking before the normal straight stitching pattern is commenced. Thus the microprocessor chip 110 of the present invention enables the automatic linking of different stitch patterns, such as the above example of the tacking stitch pattern and, thereafter, the straight stitch pattern, which may be automatically sequentially performed without interruption.

Selection of a single stitch of a selected stitch pattern may also be accomplished in accordance with the present invention through the use of key 208 on keyboard 128. Selection of this key 208 indicates to the microprocessor chip 110, by providing a corresponding input control signal, that the operator only desires that a single cycle of the selected pattern be performed and that the machine 100 is therefore to stop when this single pattern cycle has been performed. Thus, in response to the input control signal provided by activation of key 208, the microprocessor chip 110 provides the previously mentioned main motor lock signal to the motor speed control relay 168 of a conventional motor speed control circuit 172 by biasing a transistor into the conducting state to thereafter close the motor speed control relay 168 and lock the main drive motor off until this signal is terminated. This feature is particularly useful when sewing monograms in conjunction with selection of an alphabetic letter stitch pattern or as a method of enabling the operator to preview stitch pattern arrangements prior to actual use. As with the other function control keys, when the single pattern cycle key 208 has been selected the associated light-emitting diode 63 turns on to indicate that this function has been selected.

Preferably, every stored stitch pattern has a predetermined stitch length and width which is stored in the stitch pattern memory 90. These stored associated stitch pattern lengths and widths can be controllably varied by the operator in the system of the present invention. Thus, if the operator desires to increase or decrease the associated stitch length of a previously selected pattern, the operator then selects key 194. This will provide an appropriate input control signal to the microprocessor ship 110 which will thereafter cause the stored stitch length of the previously selected stitch pattern to appear on the common display screen 62, preferably expressed in millimeters and tenth's of a millimeter, although the system can be readily arranged to express the stitch length in any desired unit of measure. The light-emitting diode 63 located adjacent key 194 will then be lit or turned on to indicate to the operator that the digits displayed on the display screen 62 at that time correspond to the stored stitch length of the previously selected stitch pattern and not to the stitch pattern code number. The circuit is now enabled to permit the stitch pattern length to be varied by using the same incrementing and decrementing keys 180-182 and 184-186, respectively, which are used to change the display 62 in connection with selection of the stitch pattern code number and when the final desired stitch length appears in the display 62, the keys 180-186 are then released. If the operator now wishes to confirm the pattern code number of the stitch pattern whose length has just been varied, the operator need only press key 194 again and this will provide an input control signal to microprocessor chip 110 which will cause the stitch pattern code number to appear in display 62 in place of the previously displayed stitch length.

Similarly, the operator may increase or decrease the associated stored stitch width, that is the zig-zag width of the stitch. Thus, after the operator has selected the desired stitch pattern whose width is to be varied, the operator depresses key 192 which corresponds to the stitch width function. This provides an input control signal to the microprocessor chip 110 which will cause the stored stitch pattern width to then appear on the common display 62 in place of the selected stitch pattern code number in the same manner as was previously desired with respect to the stitch length. Again, the circuit is now enabled to permit this width to then be increased or decreased through the use of the incrementing and decrementing keys 180-182, 184-186, respectively, in the manner previously described with respect to the stitch length and the pattern code number. At this time, the light emitting diode 63 associated with key 192 will preferably be blinking to indicate to the operator that the width of the stitch pattern is being changed. Again, if the operator wishes to recheck which stitch pattern had been previously selected and whose width is being changed, the operator need only depress key 192 again and this will provide an input control signal to microprocessor chip 110 which will cause the corresponding stitch pattern code number to appear in display 62 in place of the stitch pattern width.

The sewing machine 100 of the present invention also preferably provides for electronic balance control since balancing stitches may sometimes be useful to compensate for possible variations in fabric feeding. To accomplish such balancing, the operator first selects the corresponding stitch pattern code number and then depresses key 206 which corresponds to this balance function. This will provide an input control signal to the microprocessor chip 110 which will then cause the display 62 to display the number 0 indicating to the operator that the feeding values are perfectly adjusted or balanced in the machine memory. However, this adjustment is preferably on an assumption of normal sewing using standard fabrics and threads. Since the circuit is now enabled to permit the use of keys 180-186 to change this balance, if the operator wishes to change this balance, the incrementing and decrementing keys 180-182, 184-186 are then employed to increase or decrease this value. Preferably, however, the circuit is arranged to enable the balance to be varied only up to a maximum or down to a minimum of preferably plus or minus 0.9 millimeters, although other arrangements may be provided if desired. Preferably, the light emitting diode 63 located above ley 206 will begin blinking as soon as one of the incrementing or decrementing keys 180-186 is depressed to indicate to the operator that the balance value has been modified. If the operator wishes to again display the pattern code number of the selected stitch pattern, the operator need only depress key 206 again and this will provide an input control signal to microprocessor chip 110 which will cause this pattern code number to be displayed on display 62 in place of the balance data.

Figure 48:
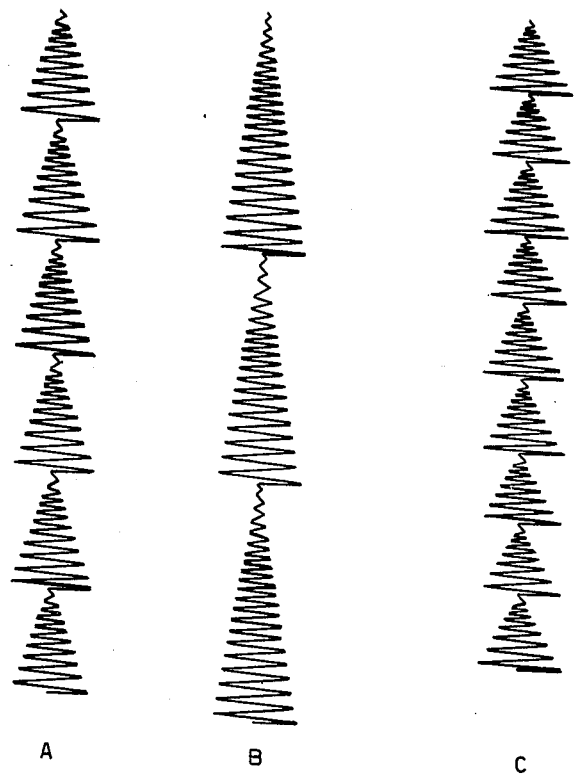
FIGS. 48A–C are a graphic illustration of the interpolation function of the system of the present invention for an arrow satin stitch pattern (pattern number 98 of FIG. 47), illustrating the maintenance of a constant stitch density and shape for the pattern as the length is varied.

As also shown and preferred in FIG. 6, and as illustrated in FIG. 48, in the presently preferred embodiment of the present invention, any satin pattern may have its length increased while the density of the stitch pattern remains unchanged as does the shape of the pattern. In order to accomplish this, the microprocessor chip 110 preferably interpolates the selected stitch pattern data to provide additional stitch position coordinates between the previously stored stitch position coordinates so as to thereby maintain the constant stitch density. In order to provide the appropriate input control signals to enable the microprocessor chip 110 to perform this function, the keyboard 128 is operated in the following manner. The desired stitch pattern code number is provided to the microprocessor chip 110 by the keyboard 128 in the manner previously described, such as the pattern code number corresponding to the arrow pattern (pattern number 98 in FIG. 47) illustrated in FIGS. 47-49. The density control key, key 204, is then depressed and the display 62 will then, under control of the microprocessor chip 110, display the stored stitch length of the selected stitch pattern. In addition, the light emitting diode 63 located adjacent key 204 will start blinking to indicate to the operator that the information displayed on display 62 now shows the length of a pattern and not its corresponding pattern code number. The operator would then depress the incrementing or decrementing keys 180-182, 184-186, respectively, to increase or decrease the length of the satin stitch pattern selected in the manner previously described. It should be noted that preferably a selected satin stitch pattern may be increased up to a length of preferably 99 millimeters, although this may be changed without departing from the present invention. If key 204 is again depressed this will provide an input control signal to microprocessor chip 110 which will cause the pattern code number corresponding to the selected satin stitch pattern code to again appear on the common display 62. Besides stretching or increasing the length of the selected satin stitch pattern, if the operator wishes to increase the density of the stitches, this may be accomplished by first repeating the operation described above with respect to varying the stitch length and thereafter repeating the operation described above with respect to varying the length of a satin stitch pattern. Thus, the operator may vary this satin stitch pattern length between the standard length, which is defined as the stored number of stitches multiplied by the actual feed, and the maximum permissible value, such as the previously mentioned 99 millimeters. This variation in satin stitch pattern length is the result of the interpolation of new intermediate positions among the previously stored stitch position coordinates for a given satin stitch pattern. The presently preferred interpolation algorithm for accomplishing this is as follows:

On selecting a satin stitch pattern the following variable is considered:

$$c = \frac{\text{standard length}}{\text{requested length}}$$

The variable "x" is considered as being equal to 0 and the variable "y" is defined by the expression $y = y_n + K(y_{n+1} - y_n)$ where the parameter y is defined as the needle bar coordinate of the next pattern repeat to be interpolated, the parameter $y_n$ is defined as the needle bar coordinate of the stored pattern repeat already executed, and the parameter $y_{n+1}$ is defined as the needle bar coordinate of the following stored pattern repeat. The variable K is the stitch point which initially = 0, but is increased in value at each interpolation of the above quantity c. Whenever the quantity c exceeds 1, this indicates that the interpolation has gone beyond the next pattern repeat of the selected stitch pattern. Under such circumstances, the above expression is still applicable with the exception that K=K−1 and n=n−1 (the next pattern repeat becomes the past pattern repeat; the new next pattern repeat is the following stored pattern repeat). It should be noted that in reality there are preferably two interpolations because even stitches and odd stitches of the selected stitch pattern must be interpolated independently. In addition, it should also be noted that the numerical values actually used in an interpolation program are not the same as mentioned above for the actual calculation; the factor K preferably varying between 0 and 255 instead of between 0 and 1.

Figure 49:
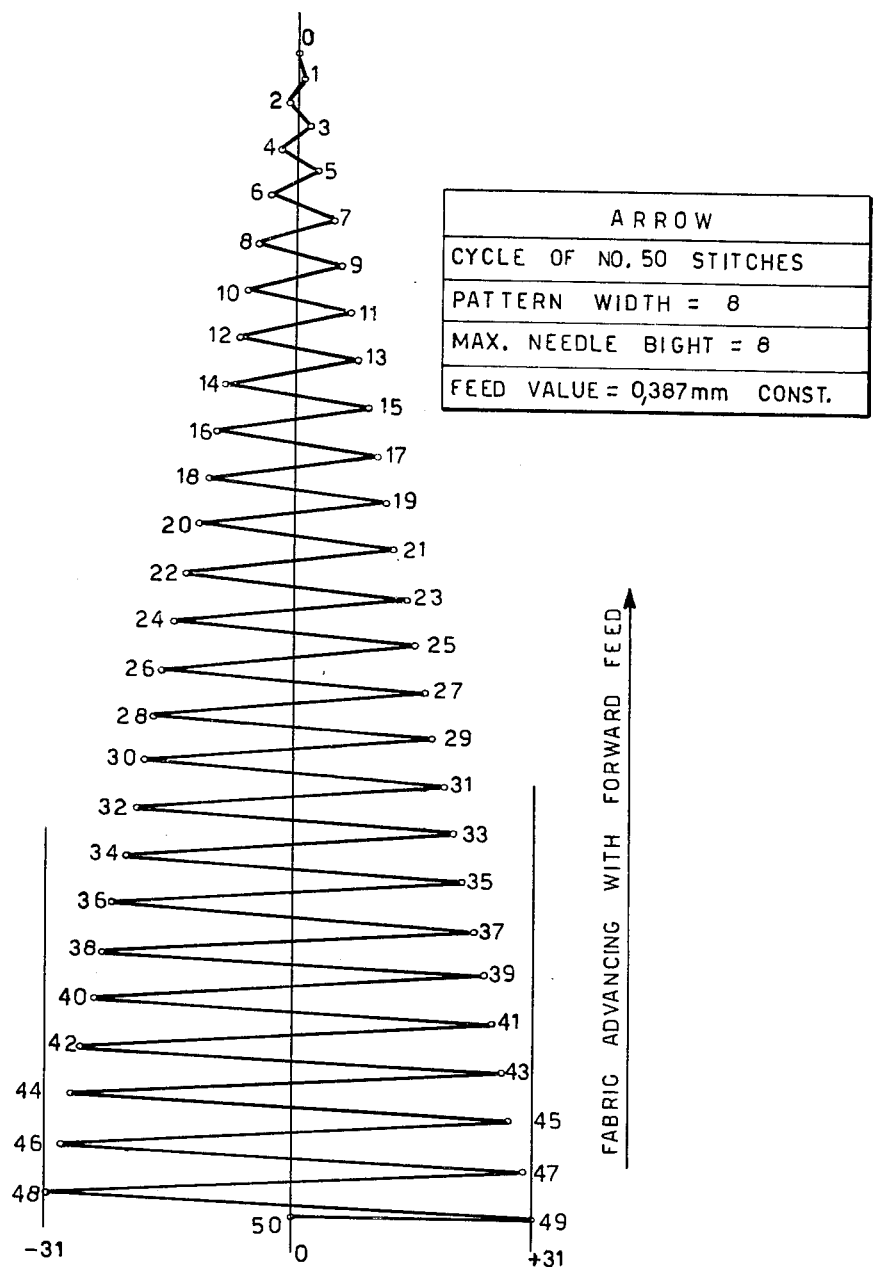
FIG. 49 is a graphic illustration of the arrow pattern of FIG. 48 showing the various stitch points comprising the stored stitch pattern data for this pattern.

In order to assist in understanding the function of maintaining a constant stitch density as the length of a satin stitch pattern is varied, the following example is given. Let us assume that the operator wishes to produce an arrow satin pattern (pattern number 98 in FIG. 47), such as indicated in FIG. 48. Now let us assume that the operator has available a thread of a diameter of 0.2 millimeters and a thickness of 0.3 millimeters. Assuming that the stored arrow pattern is formed of 50 stitches having a total associated desired length of 15 millimeters, and the operator wishes to change the stored value of the feed from 0.3 millimeters to 0.2 millimeters, it is apparent that the total length of the arrow, such as indicated in FIG. 49, if the number of stitches remained unchanged, would become 10 millimeters as compared with the associated length of 15 millimeters. This value could result in an appearance of the arrow which is not satisfactory or, in any event, which is different from the standard one. In order to bring the total length of the arrow to the desired 15 millimeters, it is therefore necessary to vary the number of stitches. Thus, if instead of 50 stitches, 75 were employed, still with a thread having a diameter of 0.2 millimeters, the total length of the pattern would remain 15 millimeters. Therefore, in the case of full stitches, this possiblility permits varying the length of the total pattern as desired as a function of the diameter of the thread. Upon the variation of the two significant parameters of a satin stitch pattern, namely the diameter of the thread (and, therefore, the step of the feed) and the number of stitches (and, therefore, the total length of the pattern), the first variation must always precede the second from an operating standpoint. The provision of the aforementioned interpolation capability of the preferred system of the present invention enables a potential reduction in the number of stored stitch patterns and, thus, in the size or storage capacity of the stitch pattern memory 90, while making it possible to produce different forms of stitch patterns from a single matrix. As was previously mentioned, the results of such an interpolation function are illustrated, by way of example, in FIG. 48 for the arrow stitch pattern (pattern number 98 of FIG. 47), with the stored stitch position coordinates or stitch points for the arrow pattern being illustrated in FIG. 49.

Figure 50:
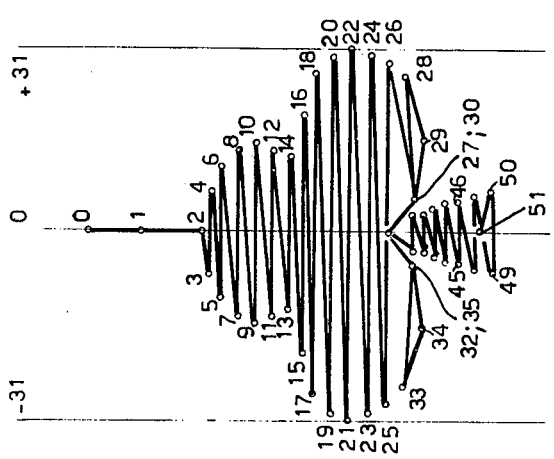
FIG. 50 is a graphic illustration similar to FIG. 49 illustrating the stored stitch pattern data corresponding to a club or clover pattern (pattern number 43 of FIG. 47)
Figure 52:
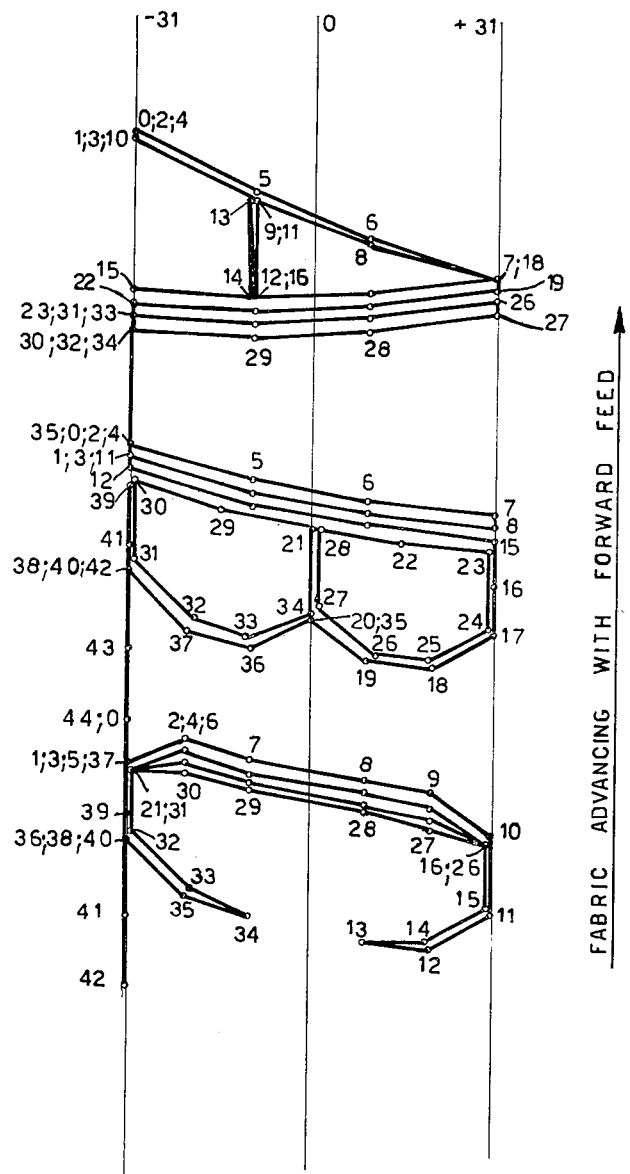
FIG. 52 is a graphic illustration similar to FIGS. 49–51 illustrating the stored stitch pattern data corresponding to various typical alphabetic letter patterns, such as the letters A, B, C, by way of example.

By way of example, other stored stitch pattern stitch position coordinates are illustrated in FIGS. 50–52. These stitch patterns are merely exemplary of the multitude of stitch patterns possible with the systen of the present invention including the alphabetic letters illustratively represented, by way of example, by the letters A, B, C in FIG. 52.

It should be noted that any time the current or power to the sewing machine system 100 is turned off, all changes or selections made by the operator are preferably automatically cancelled so that the system 100 will be in its initial state on power on. In this initial state, if the operator then selects a particular stitch pattern, the stitch pattern will be provided with its original stored stitch length and bight width values. In addition, if the operator desires to reset any individual stitch pattern to its original or stored values of stitch length and bight width without turning the unit off, the operator need only press key 200 which will provide an input control signal resetting the system and the modified stitch length, bight or zig-zag width, balance value, pattern length or stitch density will automatically be reset or restored to its original initial value.

As was previously mentioned, the system 100 of the present invention is also capable of automatically alternating selected stitch patterns to provide a composite stitch pattern arrangement consisting of alternate stitches from the selected patterns. Such an arrangement is illustrated by way of example in FIG. 47 at the bottom thereof. In order to provide the appropriate input control signals to the microprocessor chip 110 to obtain this alternate stitch pattern arrangement, such as the composite stitch pattern arrangement illustrated in FIG. 47 which alternates between the arrow pattern (pattern number 98) and the scallop pattern (pattern number 95), by way of example. However, in the system 100 of the present invention, the patterns which comprise the composite alternate stitch pattern arrangement must preferably all be of the same kind, that is they must all be satin stitch patterns or non-satin stitch patterns, with the exemplary arrangement illustrated in FIG. 47 being a composite stitch pattern arrangement of satin stitch patterns. In order to provide the appropriate input control signals to the microprocessor chip 110 to provide the composite stitch pattern arrangement, the operator first inserts the pattern code number of the first pattern which the operator wishes to employ in the composite stitch pattern arrangement in the manner previously described by utilizing the increment-decrement keys 180–186. The operator then depresses key 202 which is the key corresponding to the alternating or composite pattern function on the keyboard 128, thereby providing an input control signal corresponding thereto to microprocessor chip 110. At this time the light emitting diode 63 associated with key 202 will turn on to indicate to the operator that this function has been selected. The operator then again employs the increment-decrement keys 180–186 to select the next pattern code which the operator desires to employ in the composite stitch pattern arrangement. When this is completed, the operator depresses key 200 to provide an input control signal confirming to the microprocessor chip 110 that the desired composite stitch pattern arrangement has been selected. Although the above example only employs two different stitch patterns to provide a composite stitch pattern arrangement, it is of course within the skill of the art to employ more than two different stitch patterns in such a composite stitch pattern arrangement. Of course, if the operator only desires the machine 100 to perform a single repeat of the selected composite stitch pattern arrangement, then the operator also depresses key 208 as was previously described with reference to the single stitch function of machine 100. This is particularly useful when the operator desires to have the machine 100 stitch a monogram since the operator need only select a composite stitch pattern arrangement of alphabetic letter patterns comprising the desired monogram which will then be stitched with only one repeat of the letters.

In certain instances, the operator may desire to sew ornamental stitches using a double or twin needle. However, when such a twin needle is employed, the allowable width of the transverse oscillation of the needle 108, or corresponding needle bar 120, must be reduced so as to insure that the double needle remains within the defined area of the needle plate. Accordingly, when a double needle is inserted in place of needle 108, the operator then depresses key 196 on keyboard 128 to provide an input control signal to the microprocessor chip 110 indicating that a double needle has been inserted. This key 196 is depressed after the operator has selected the desired stitch pattern or patterns to be performed in the manner previously described. In response to this input control signal, the microprocessor chip 110 provides an output control signal to the needle bar actuator 124 to limit the width of the selected pattern to the preselected value, preferably 5 millimeters, so that the twin or double needle may be safely used. When key 196 is depressed, its associated light emitting diode 63 is lit to indicate to the operator that this function has been selected. It should be noted that in the presently preferred system 100 of the present invention, if the assigned width of the selected stitch pattern is less than the preselected 5 millimeter value required for the use of a double needle, then the microprocessor chip 110 does not provide any additional limiting output control signals to the actuator 124 since the stitch pattern width need not be changed. Thus, the width of the stitch pattern when the double needle function is selected is only varied in response to the activation of the double needle key 196 if the selected stitch pattern has a width greater than 5 millimeters, with the value in such an instance being reduced to 5 millimeters. The microprocessor chip 110 preferably accomplishes the required variation in width of the pattern in the same manner as previously described with respect to operator modification of the stitch pattern width in connection with key 192 on keyboard 128. Thus, as was described with respect to key 192, the stitch pattern memory 90 also contains data corresponding to the maximum coefficient of amplification for each stored stitch pattern, with this system 100 being capable of varying the stitch pattern width in an upward or downward direction since the system 100 of the present invention permits a maximum possible width of 8 millimeters when a single needle 108 is employed. For example, if the selected stitch pattern is the festoon pattern which has a corresponding stored pattern width of 5 millimeters, this stored stitch pattern width would not be changed when the double needle key 196 is activated. However, if a single needle is employed, and the operator wishes to vary the stored width of this pattern in conjunction with the operation of key 192, the microprocessor chip 110 may provide an output control signal having a maximum coefficient of amplification of 1.6 which is based on the ratio between the maximum permissible sewing width of 8 millimeters and the assigned stitch pattern width of 5 millimeters. There would, of course, for all practical purposes be no limitations in a downward direction. It should be noted that, preferably when the stitch pattern width is varied by the operator, the increment-decrement keys 180–186 instead of operating on the two digits independently as previously described with reference to variation in the pattern code number, preferably operate on the two digits jointly; that is, keys 180–184 preferably cause an advance or decrease in the pattern width number contained on the display 62 at a high speed to enable rapid change in the most significant digit while keys 182–186 preferably cause an increase or decrease in the least significant digit at a slower speed so as to permit a precise positioning of the least significant digit. During this stitch width variation function, the display 62 preferably operates for all intents and purposes as a two digit counter in which the most significant digit is obtained by carry-over from the least significant digit.

As illustratively shown in FIG. 51, one of the stored stitch pattern arrangements, by way of example, may be a button-hole arrangement if desired, such as the conventional buttonhole or the buttonhole arrangement of the type illustrated in FIG. 51 wherein radial stitches are distributed to provide an eyelet with two lateral zig-zag stitch cordings and final tacking to provide the complete buttonhole illustrated in FIG. 51.

At the time that the machine 100 is turned on, if the operator selects a particular pattern, this pattern will be provided with its original memorized values of stitch length and width of displacement. Furthermore, if the operator desires to return any pattern to its original or memorized values of stitch length and width of displacement without turning off the machine it is merely necessary to depress the key 200 which provides a zeroing control signal to the system and the changed lengths of stitch or width or zig-zag or balance value or length of pattern or density of stitch are automatically zeroed or returned to their initial value.

Referring now to FIGS. 5A, 5B and 5C, there is shown therein a detailed diagram of the sewing machine control system in accordance with the present invention corresponding to the block diagram of FIG. 4. Referring initially to FIG. 5A, as already stated, the microcomputer integrated circuit 110 which can preferably be of the INTEL 8049 type having 2K of ROM, comprises the microprocessor circuit together with the program control memory. This microcomputer 110 preferably has a group of eight address and data terminals AD 0–7 which are connected to eight data input terminals D 0–7 of the two respective microprocessors 610 and 610', for instance of INTEL type 8041, and are connected to eight output terminals D 0–7 of two components 770 and 771 marked 2716, constituting in the circuit the pattern memory ROM 609 and which can preferably be replaced by other similar ones having other types of memorized patterns, and to a register 769 of type 74LS 273 which in its turn is connected to eight address terminals A 0–7 of the two components 770 and 771. Such a microcomputer 110 preferably also has three terminals P 20–22 which are connected to three address terminals A 8–10 of the two components 770 and 771 and to three terminals P 20–22 of the interface 90, for instance of the type marked 8243; one terminal P23 connected to a terminal P23 of the interface 90 and, directly and via an inverter 72, to a $\overline{CE}$ terminal of the two respective components 770 and 771; one terminal P24 connected to the locking circuit 168 of the main motor; two terminals P25 and P26 connected to one terminal $\overline{CS}$ of the respective microprocessors 610 and 610'; one terminal P27 connected to the input of a NAND gate 773, whose output is connected to an input $\overline{OE}$ of the two components 770 and 771; one terminal PROGR connected to a terminal PROGR of the interface 90; one terminal ALE connected via an inverter 774 to an input 775 of the register 769; one terminal $\overline{RD}$ connected to the terminal $\overline{RD}$ of the two microprocessors 610 and 610' and via an inverter 776 to another input of the NAND gate 773; one terminal $\overline{WR}$ connected to a terminal $\overline{WR}$ of the two microprocessors 610 and 610'; and one terminal RESET connected to ground via a capacitor 777 which has the function of initiating the microcomputer 110 when turned on, locking, as already stated, the main motor via the circuit 168 until a suitable pattern, such as one memorized in the components 770 and 771, has been selected.

The AO terminals of the two components 770 and 771 are preferably also connected to AO terminals of the two microprocessors 610 and 610', and the $\overline{CS}$ terminal of the interface 90 is connected to ground. To such microprocessors 610 and 610' there are also preferably connected respective clock signal generators 781 and 781' and respective grounded capacitors 782 and 782' for zeroing.

Such microprocessors 610 and 610' therefore present a first group of terminals, from six of which are preferably obtained the digital signals 611 and 611', and a second group of terminals at three of which arrive the digital signals 617 and 617', respectively.

As previously mentioned, the output control signals of the microcomputer 110 for the position control circuits for the needle bar 120 and for the stitch regulator 132 arrive at the terminals D0–D7 of the microprocessors 610 and 610', respectively, while via the terminals $\overline{CS}$, $\overline{RD}$, $\overline{WR}$ and AO such microprocessors 610 and 610' exchange program control signals with the microcomputer 110 by which they are controlled.

Referring to FIG. 5B, there is shown therein, by way of example, a circuit diagram connected to the terminals of the typical slave microprocessor 610 for the processing of the signals 611 and 617; since the circuit diagram connected to the terminals of the microprocessor 610' for the processing of the signals 611' and 617' is identical, only the former will be described.

This signal 611 preferably comprises 5 bits relative to a desired velocity code and a final bit indicating the direction of movement. The signal 611 then arrives at digital-to-analog converter 612 which supplies the corresponding analog signal via path 613, which is compared via a conventional differential amplifier 401 forming a part of the comparator 614, with the actual velocity signal provided via path 615. In particular, the output of the digital-to-analog converter 612 is connected to the non-inverting input of the amplifier 401 via a resistor 402, while the signal provided via path 615 arrives at the inverting input of the amplifier 401 via a resistor 404. Between the output of the amplifier 401 and its inverting input there is then connected the shunt of a resistor 405 with a capacitor 406. The difference signal, the output of the amplifier 401, is preferably sent to the non-inverting input of a differential power amplifier 94a which, together with another differential power amplifier 94b, constitutes a conventional embodiment of the power amplifier 94, so as to be able to provide a bidirectional control for the actuator 124, which may be a conventional reversible DC motor, connected between the outputs of the two amplifiers 94a and 94b, to effect the position control on the needle bar 120.

In particular, the non-inverting input of the amplifier 94b is preferably connected to ground, while the inputs of the two amplifiers 94a and 94b are preferably connected together by a resistor 409 in series connection and the inverting input of the amplifier 94a is preferably connected to ground via a resistor 410. The inverting inputs of the amplifiers 94a and 94b are preferably connected to the respective outputs via respective resistors 411 and 412 and between the output of each amplifier 94a and 94b and ground there is preferably connected a conventional stabilizing network formed of the series connection of a resistor 413 with a capacitor 414. With this actuator 124 there is also preferably associated a conventional diode protection circuit (not shown). The position transducer 616 is preferably of the type shown in FIG. 4B and comprises the optical encoder 622 which is coupled to the actuator 124 in the manner already described and which has three output connections 416, 417 and 418 for the three signals 623, 624 and 625, respectively.

The connection 416 is preferably connected to a resistor 419 and at the other end the latter is preferably connected to ground via a capacitor 420 and to the input of a comparator with hysteresis 421 at the output of which the signal 629 is present. The connections 417 and 418 are also preferably connected to a corresponding resistor 422 and 423 and at the other end the latter are preferably connected to ground via a corresponding capacitor 424 and 425 and to the input of a corresponding amplifier 426 and 427. The output of the amplifier 426 is preferably connected to the input of a capacitor without hysteresis 428, whose output is connected to an input of a multiplier 430; to an input 431 of a multiplier 432 via a capacitor 433; to an input 434 of a reference voltage generator 435; and to the input of a comparator with hysteresis 436, at the output of which the signal 630 is present. The output of amplifier 427 is connected to the input of a comparator without hysteresis 437, whose output is connected to another input of the multiplier 432; to an input 438 of the multiplier 430 via a capacitor 439; to an input 440 of the reference voltage generator 435; and to the input of a comparator with hysteresis 441, at the output of which the signal 631 is present.

Between the inputs 431 and 438 of the two multipliers 430 and 432 there is preferably connected the series connection of two resistors 442 and 443. The outputs of the two multipliers 430 and 432 are connected to the inputs of a multiplier 444 whose output is connected via the resistor 445 to ground by a capacitor 446 and to the resistor 404 via a variable resistor 447. Via the two RC groups formed of the capacitors 433 and 439 and the two resistors 442 and 443 and with the introduced circuit advantages of the components described associated with them there is, therefore, preferably obtained the aforementioned signal provided via path 615 whose value (with sign) is proportional to the derivative of the signals 624 and 625 on the connections 417 and 418, namely to the speed of the actuator 124.

The output of the generator 435 on which there is, therefore, present a voltage proportional to the amplitude of the two signals 624 and 625 is, therefore, sent as a reference voltage to an input 450 of the converter 612 via a series connection of two resistors 451 and 452 between which there is connected a grounded capacitor 453 in order to make the signal provided via path 613 independent of variations of amplitude of the signals 624 and 625 due to, for instance, variations in temperature.

Referring now to FIG. 5C, there is shown therein a detailed diagram of the control circuit connected to the keyboard 128. This control circuit preferably comprises two pilot blocks 211 and 212 for segment displays of the Texas Instruments 75491 type to control the display 62 and thus also to control the various light-emitting diodes 63. These pilot elements 211 and 212 are connected on the one side in conventional manner to the matrix of diodes comprising the display 62 and the light-emitting diodes 63 indicating the keys selected, and on the other side they are connected to terminals P40–43 and P50–53, respectively, of the interface 90. Such terminals P40–43 and P50–53 are preferably also connected to respective pairs of keys of the keyboard 128 which keys are connected, at the other end, along two rows to the anodes of diodes 351 and 352, respectively, whose cathodes are connected to terminals 15 and 14, respectively, of the pilot block 91, of the type known under the symbol L 203. The terminals 10–13 of this pilot block 91 are then preferably connected in conventional manner to the cathodes of the two groups of eight diodes of the display 62 and to the cathodes of a group of seven diodes 63 and of a group of four diodes 63 indicating the selection of the keys. The terminals P60–63 and P70–72 of the interface 90 are therefore connected to the terminals 1–7, respectively, of the pilot block 91, and a terminal 16 of this pilot block 91 is connected via a connection 750, to a microswitch arranged in the proximity of the feed dog 603, and actuated during the production of button holes and eyelets.

The LED two digit display 62 preferably generates a segment display of the code number of the pattern, of the width of the pattern, of the width of transport, of the total length of the pattern, and of the balance value, as already described, while the individual diodes 63 which are used as indicators of the key on the keyboard 128 which has been actuated, preferably light up to indicate that the indication on the display 62 corresponds to the selected function transmitted by keys, instead of a pattern code number, and remain lit to indicate that the function associated with the key activated corresponding to that light-emitting diode (LED) has been selected. The microcomputer 110 conventionally scans the matrix of LED diodes of the keyboard, via the pilot block 91, to control the operation of the various light-emitting diodes in response to the input control signals provided by the keyboard 128.

It should be noted that the actuator 130 associated with the stitch regulator 132 preferably regulates a cam in the element 131 which determines the degree of displacement of the stitch regulator 132 but does not effect the actual displacement, which is carried out by the main motor of the machine 100 via the shaft 133. This cam is preferably positioned when the fabric is not being fed. Furthermore, with respect to the synchronization of the operation of the microprocessor 110, when the first impulse is detected by the sensor 138, the microcomputer 110 controls the operation relative to the width of the pattern. As already discussed with reference to FIG. 10, this takes place preferably with the needle 108 lifted from the fabric. When the second impulse is detected by the sensor 140, the microcomputer 110 controls the stitch regulation operation. This preferably takes place with the needle 108 in the fabric. In this way, the microcomputer 110 operates in synchronism with the operation of the machine 100.

Before describing a preferred program control which is memorized in the program control memory of the microcomputer 110, a few general aspects of the development of the ROM pattern memory 609 will be analyzed.

Each stitch is preferably defined by two position coordinates of the stitch, one coordinate for the transport or feed and another coordinate for the width or bight. Preferably, each stitch position coordinate is formed of six bits of memory. Accordingly, there are 63 different possible values from −31 to +31 defining a network of needle positions. The unit of measurement of these stitch coordinates is determined by the pitch of the network which preferably, for example, for the feed or transport is 12 mm/62≅0.19 mm and for the bight or width is 8 mm/62≅0.13 mm. As already stated when describing the position control circuits 148 and 150, eight bits are preferably associated with each point position coordinate, of which six bits relate to true coordinates and the remaining two bits relate to information concerning these coordinates. This information may be represented, for example, as follows:

1-1 the coordinate relates to the transport; in the following BYTE there is contained the corresponding displacement of the needle bar.

0-1 the coordinate relates to the transport; the corresponding displacement for the needle bar is not expressly indicated since it is the same as the preceding pattern.

The clear advantage of the above method of coding resides in the saving of memory whenever the next stitch in a pattern retains the same transport (feed) or needle bar (bight) value. Furthermore, in such a system, every pattern memorized in the memory 609 requires only the following information:

BYTE 1: identification of the code number of the pattern;

BYTE 2: maximum transport of the pattern memorized;

BYTE 3: maximum needle displacement of the pattern memorized;

BYTE 4 and following bytes: coordinates of the positions of the stitches; and last BYTE: memorized end of the pattern program.

Variations in these instructions can be made, for particular patterns, as already fully described in copending U.S. patent application Ser. No. 973,386, which have been specifically incorporated herein by reference.

Referring now to FIGS. 11–46 which are self-explanatory, these diagrams are logic flow diagrams substantially identical to those illustrated and described in copending U.S. patent application Ser. No. 973,386 and comprise an exemplary control program relating to the operation of the master microcomputer 110 in response to control signals provided by the keyboard 128 so as to provide suitable control signals to the bight and feed actuators 124 and 130, respectively. As will be described in greater detail hereinafter, the primary difference between the system described in U.S. patent application Ser. No. 973,386 and the present invention resides in the respective servo control systems for controlling the accurate positioning of the actuators 124 and 130 in response to desired stitch position information provided from the master microcomputer 110. In this exemplary control program for master microcomputer 110 the following state words are used:

(1) STATE. It can take the following values:
00H SZ: keyboard out; display=E
01H S0: program to be entered after SZ
02H S1: key+pressed (only after S5)
04H S2: program to be entered after S1
20H S5: normal program has been entered
40H S6: zig-zag or straight sewing have been entered
80H S7: buttonhole or eyelet has been entered (2) FLAG. Each bit has the following meaning:
bit0: FINE released key
bit1: FREPT pressed key with request of periodical execution of the routine bit2: TCMD acting feed control
bit3: ACMD acting needle bar control
bit4: FPIU acting request of alternate pattern
bit5: not used
bit6: VERDE single pattern request
bit7: READY pressed key (3) FLAG2. Four less significant bits of the byte indicate the variable shown on the display (LED lighting). Other four bits indicate the modified sizes (LED fixed light).

The meaning of the bits is as follows:
bit0 and bit4: pattern width
bit1 and bit5: feed
bit2 and bit6: balance
bit3 and bit7: satin length (4) FLAG3. Each bit has the following meaning:
bit0: S0: signal from buttonhole/eyelet microswitch
bit1: S1: signal from microswitch (not used)
bit2: S2: signal from microswitch (not used)
bit3: not used
bit4: RPARI: alternate pattern: even=1; odd=0
bit5: acting satin stitch
bit6: EVEN: even stitch=1; odd stitch=0 (only for satin stitch)
bit7: SATREQ: interpolation requested for satin.

This exemplary control program for the master microcomputer 110 will not be described in any greater detail since it has already been described in the aforementioned U.S. patent application Ser. No. 973,386, the contents of which have been specifically incorporated by reference herein.

As was previously mentioned, an INTEL 8049 microprocessor chip may preferably be employed as the microprocessor chip 110 in the present invention, although other suitable microprocessor chips, or the equivalent thereof, may be employed. By way of example, the microprocessor chip 110 operation or the associated control program which is stored in control program ROM may preferably be conventionally written in the ASSEMBLER language normally employed for the INTEL 8049 microprocessor.

Similarly, the program listing of the stitch pattern program, such as for producing the various stitch patterns illustrated in FIG. 47, is stored in the pattern memory ROM 90, and is also written in the ASSEMBLER language normally employed with the INTEL 8049 microprocessor.

Similarly, the program listing corresponding to the alphabetic letter program for the 26 letters of the alphabet is stored in the pattern memory ROM 90, such as in a separate pattern memory ROM which may preferably be inserted in place of the pattern memory ROM which contains the stitch pattern information of FIG. 47, and is exemplified by the typical letters A, B, C, illustrated in FIG. 52 and, again, is written in the ASSEMBLER language used with the INTEL 8049 microprocessor.

Figure 18:
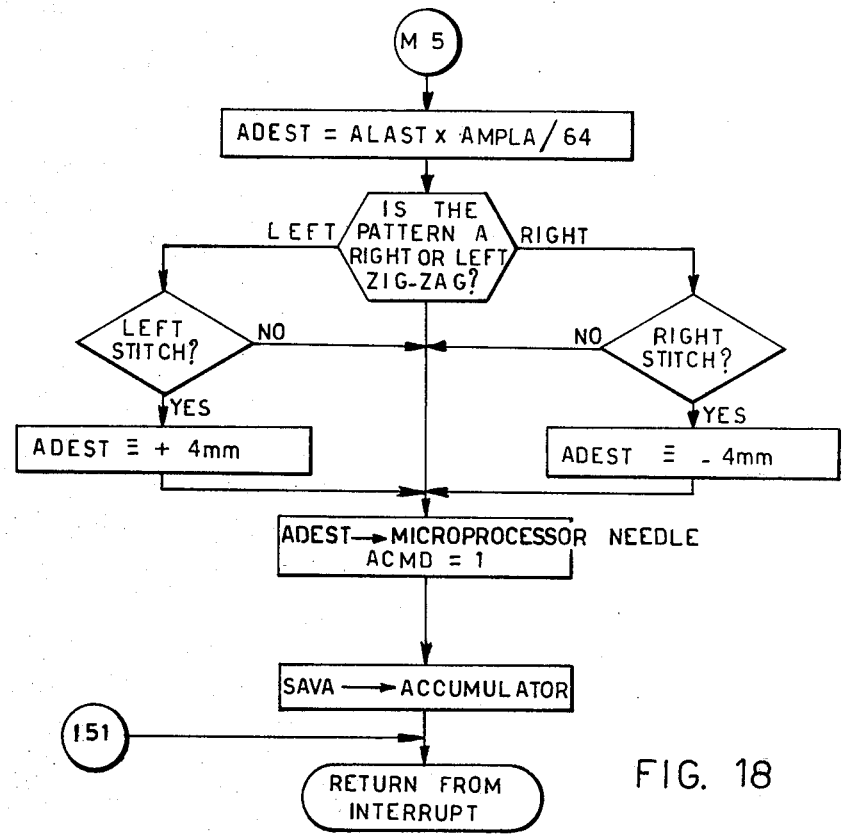
Figure 16:
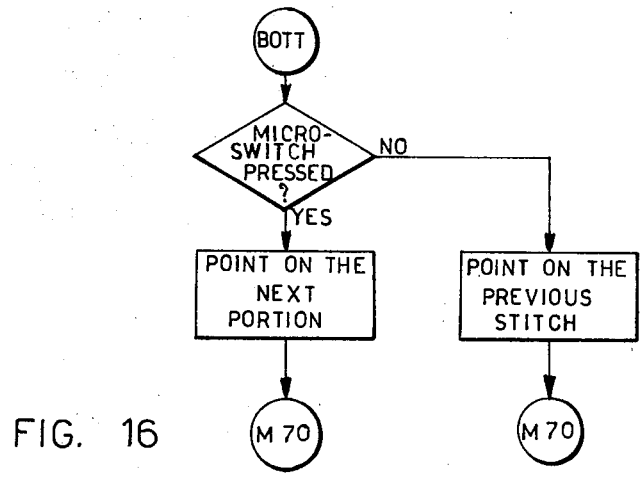
Figure 17:
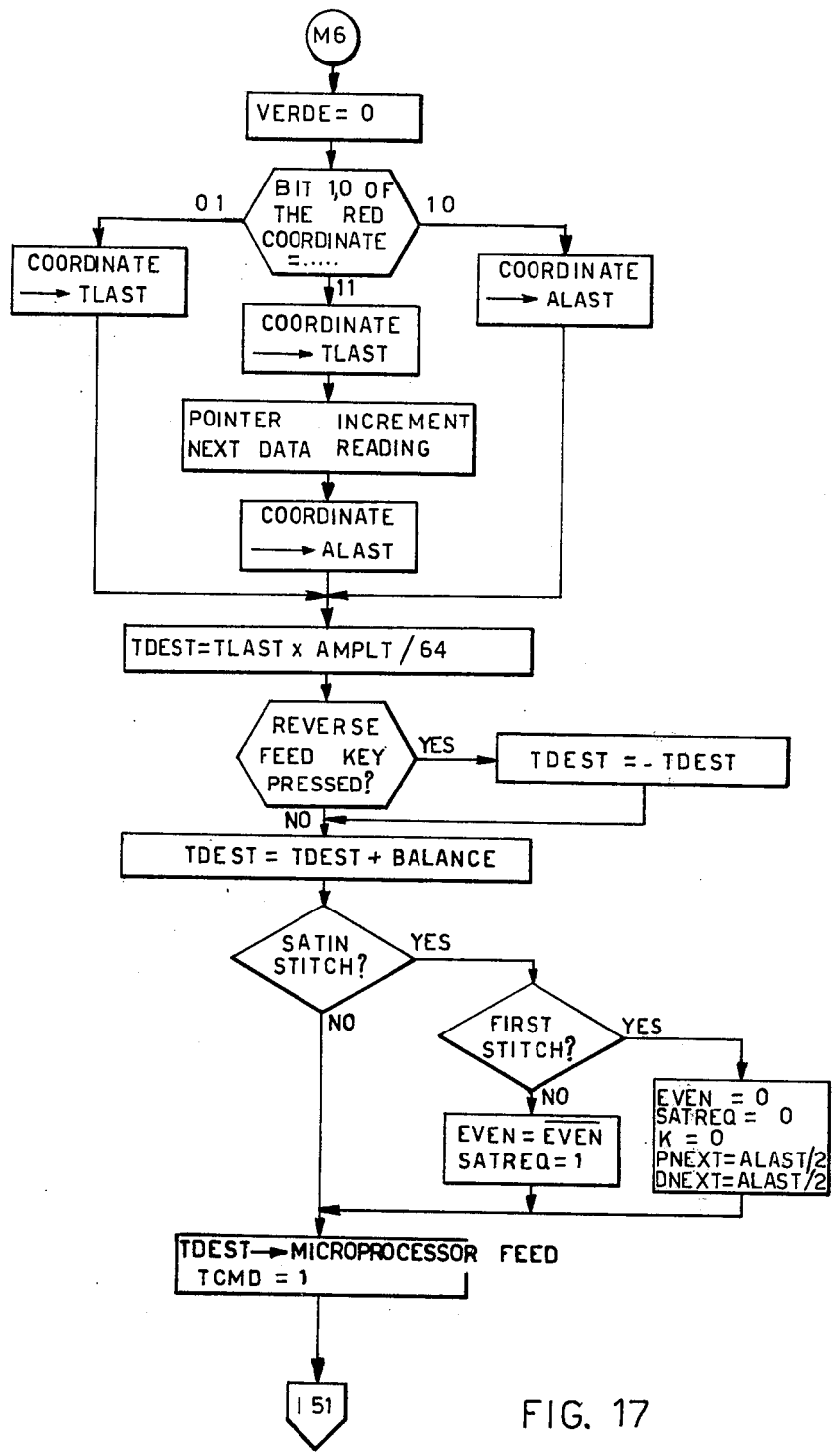
Figure 19:
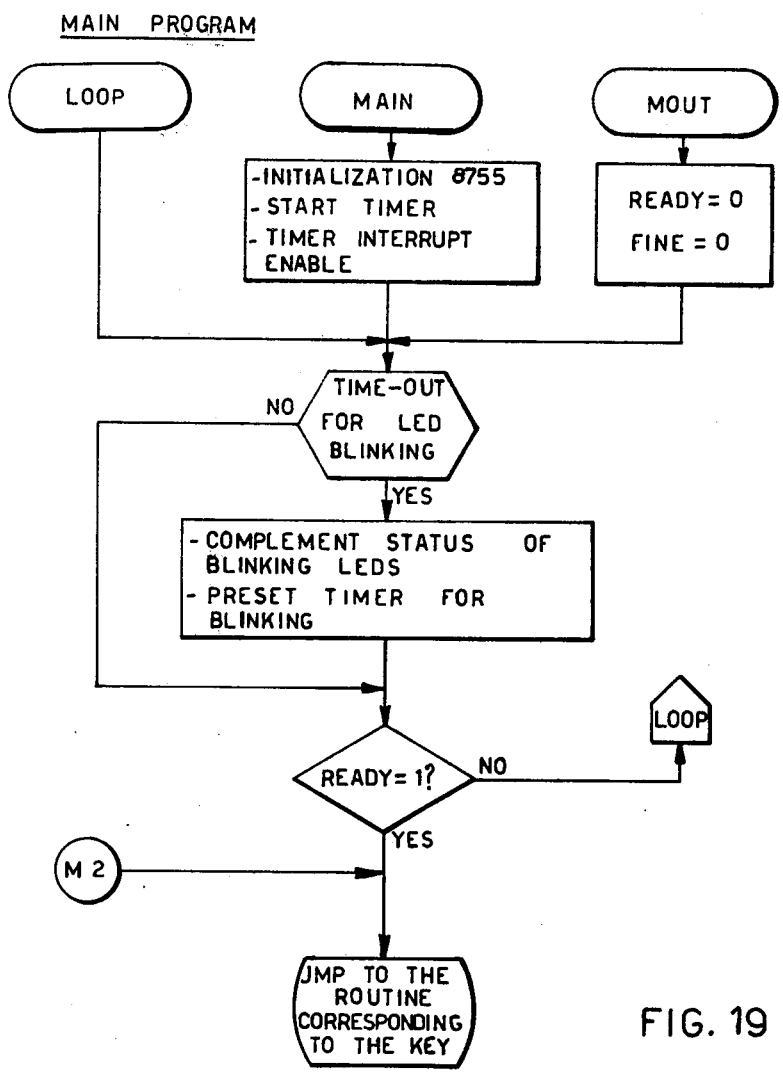
Figure 20:
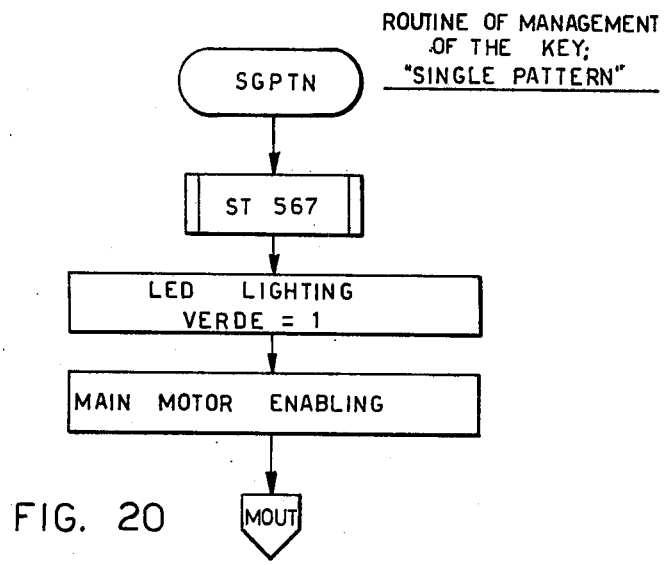
Figure 21:
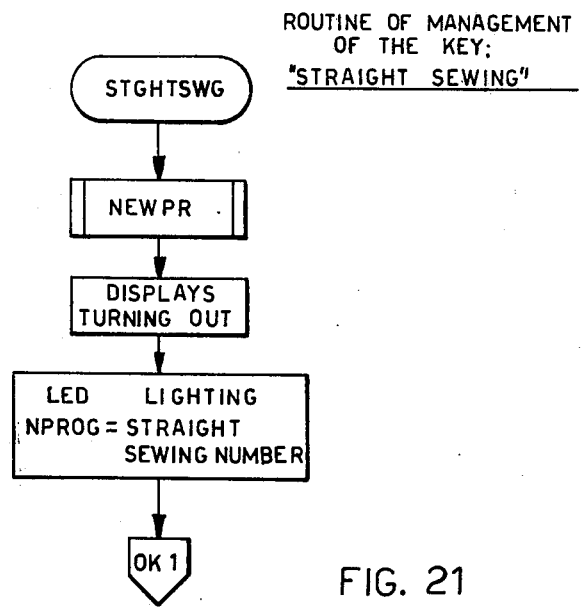
Figure 22:
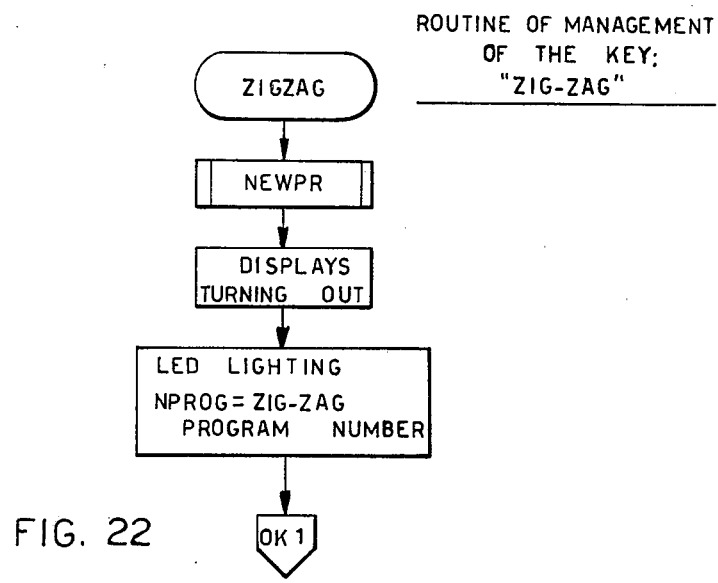
Figure 23:
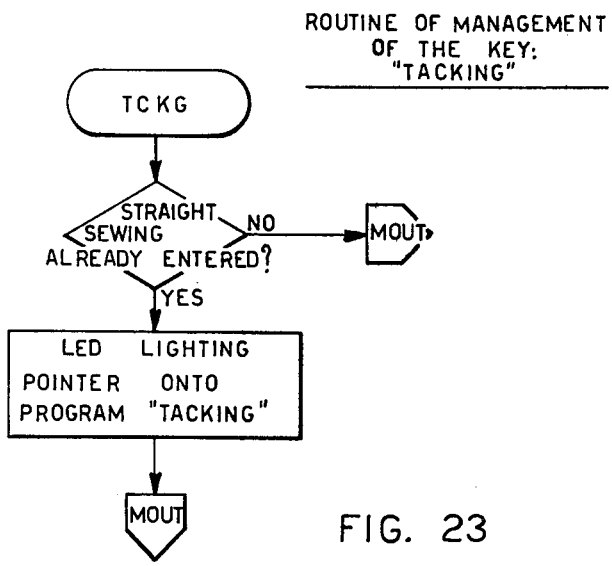
Figure 24:
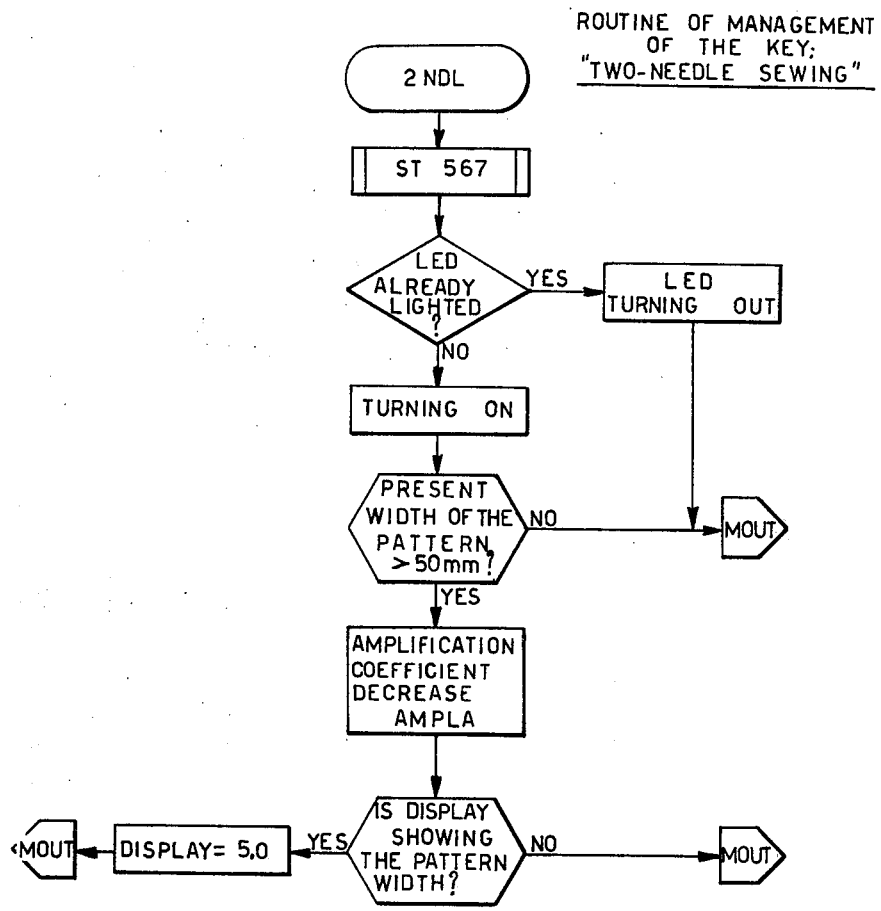
Figure 25:
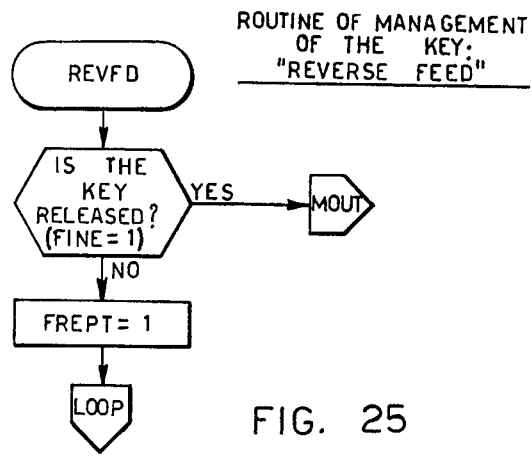
Figure 26:
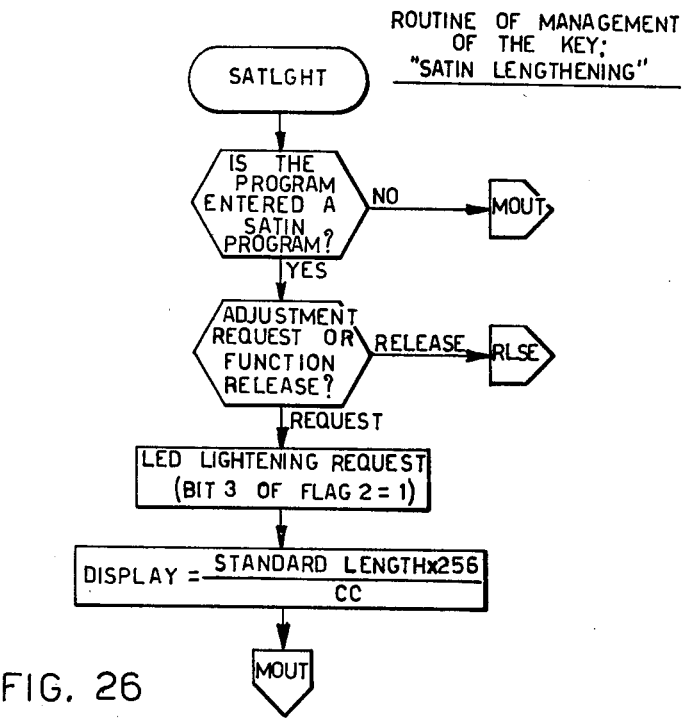
Figure 27:
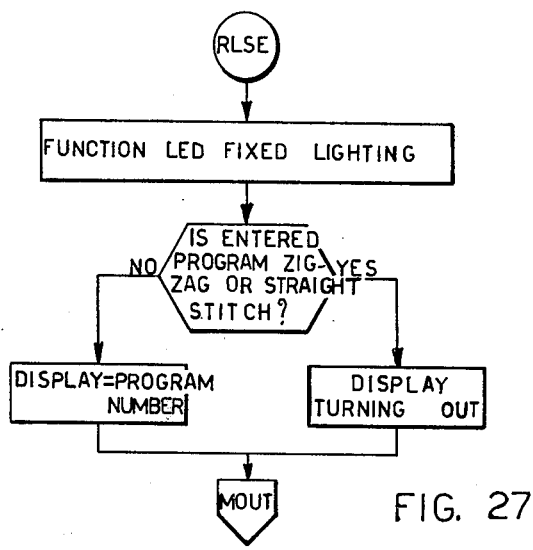
Figure 28:
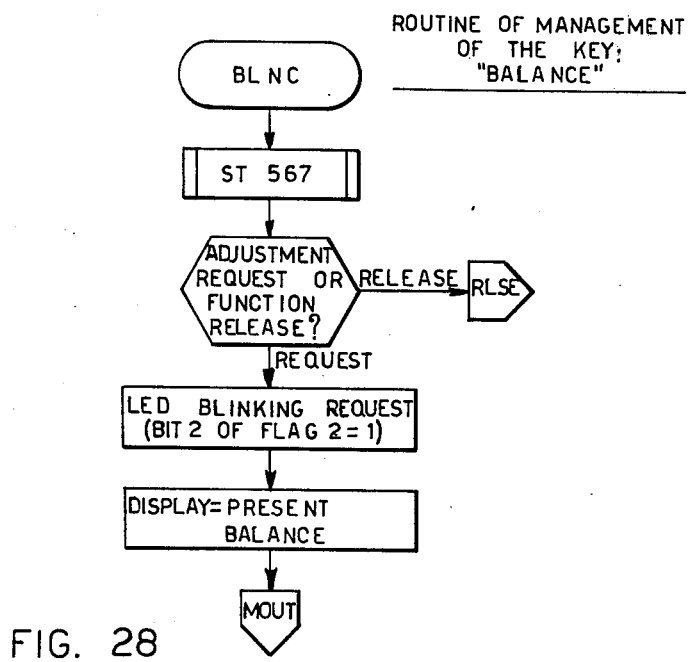
Figure 29:
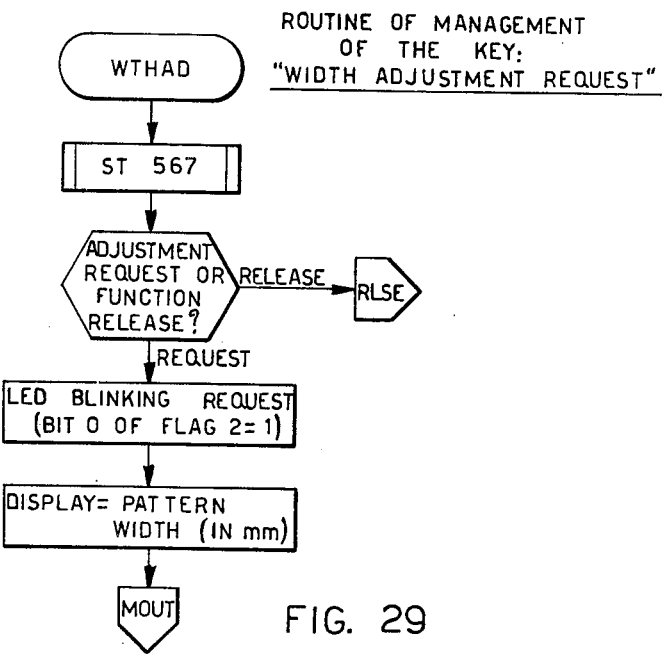
Figure 30:
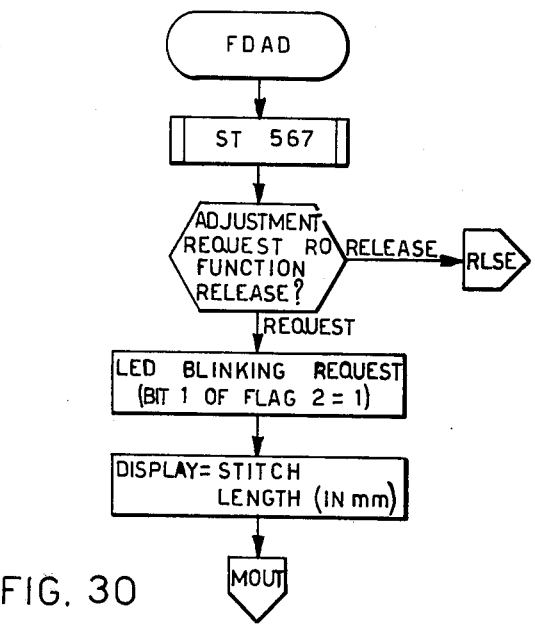
Figure 31:
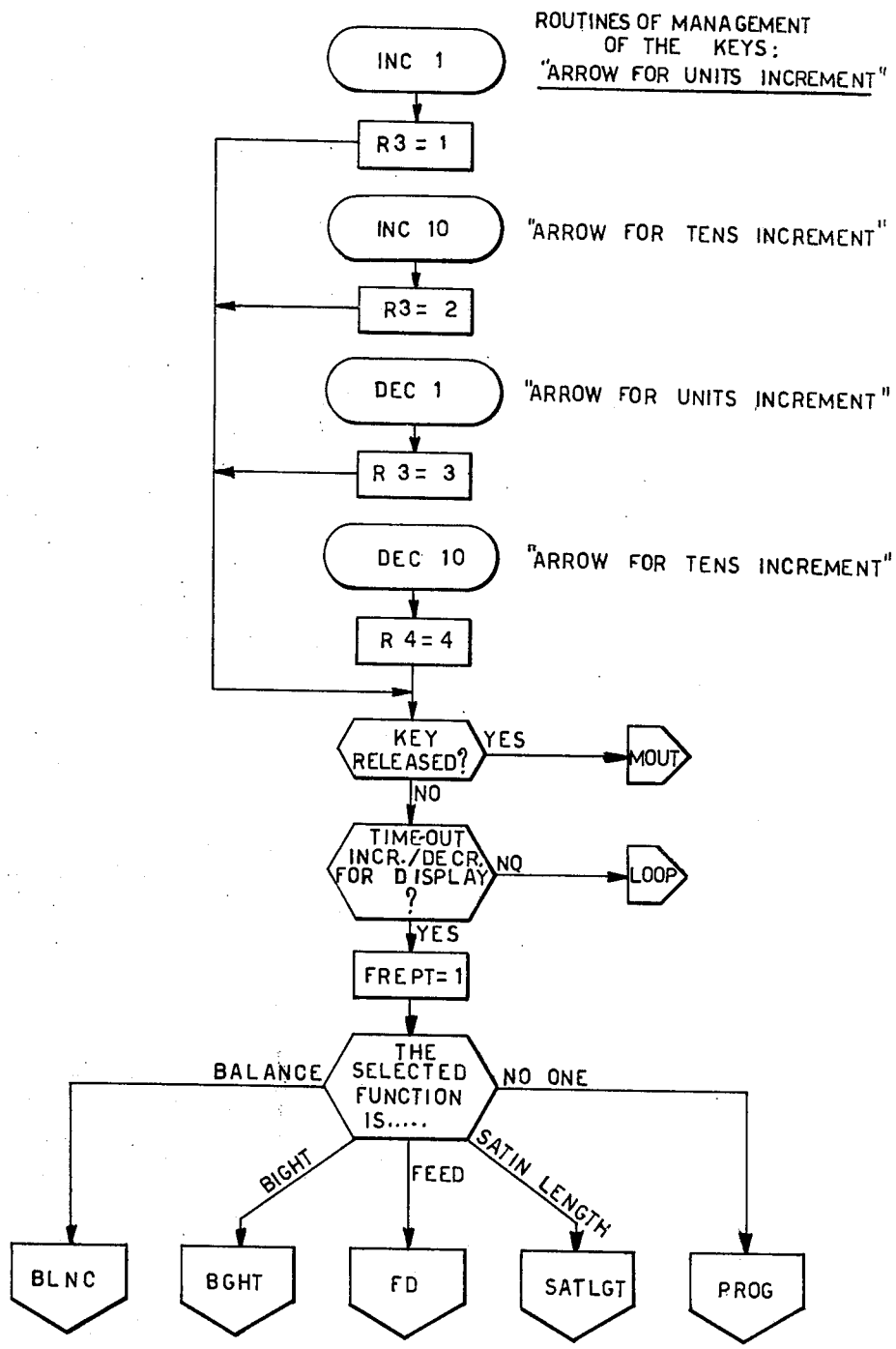
Figure 32:
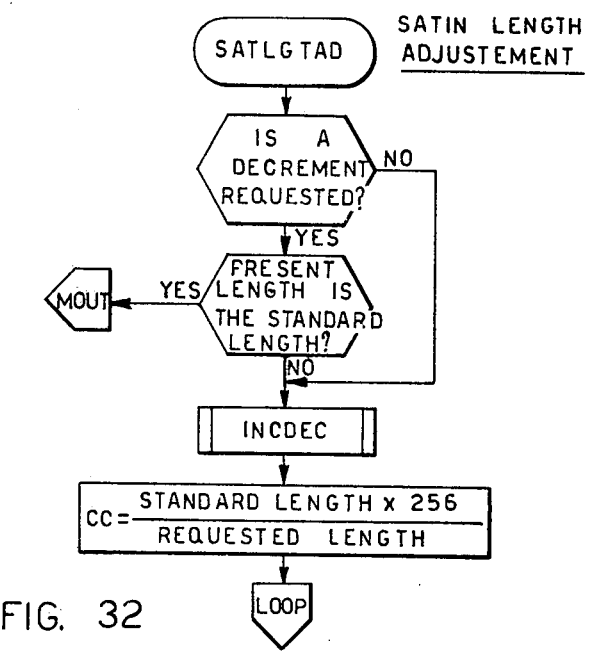
Figure 33:
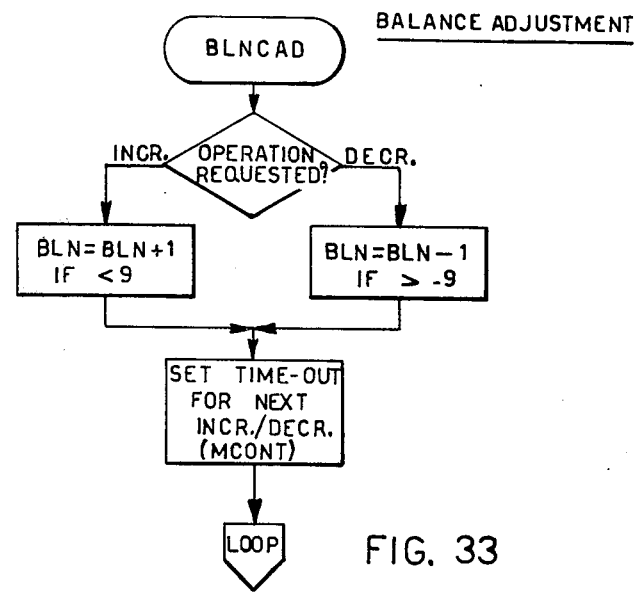
Figure 34:
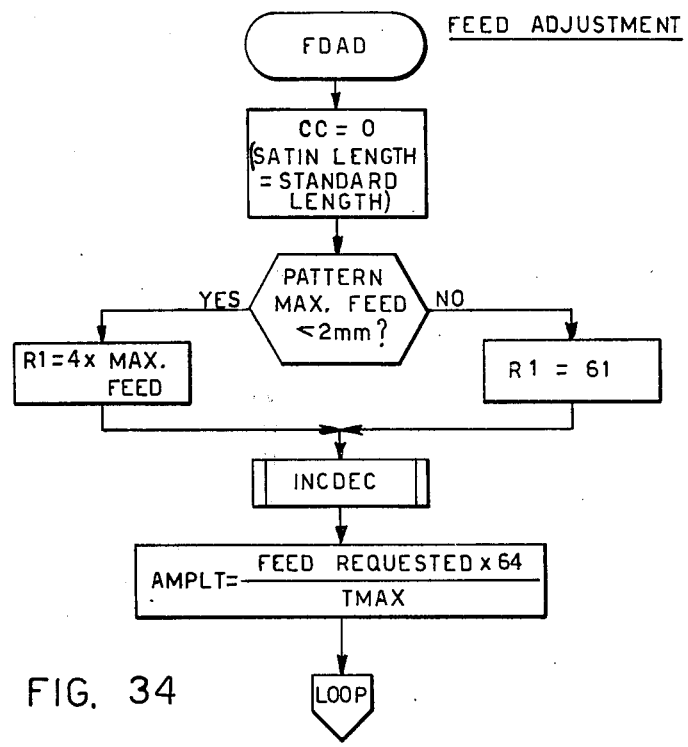
Figure 35:
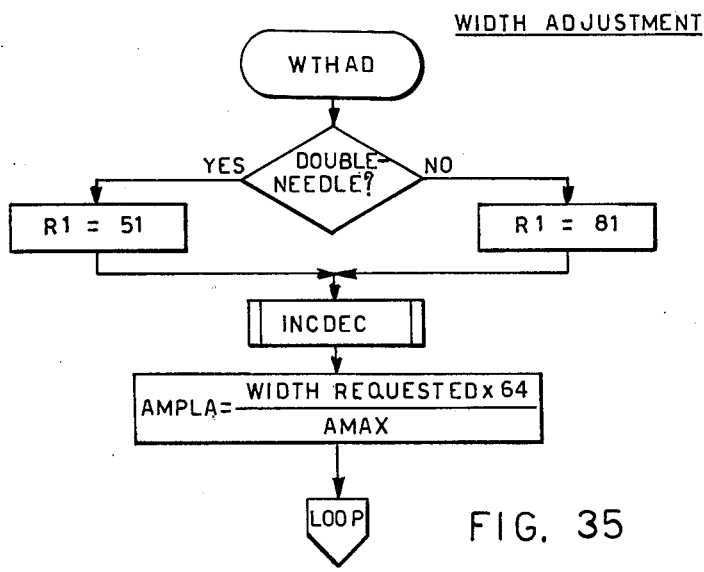
Figure 36:
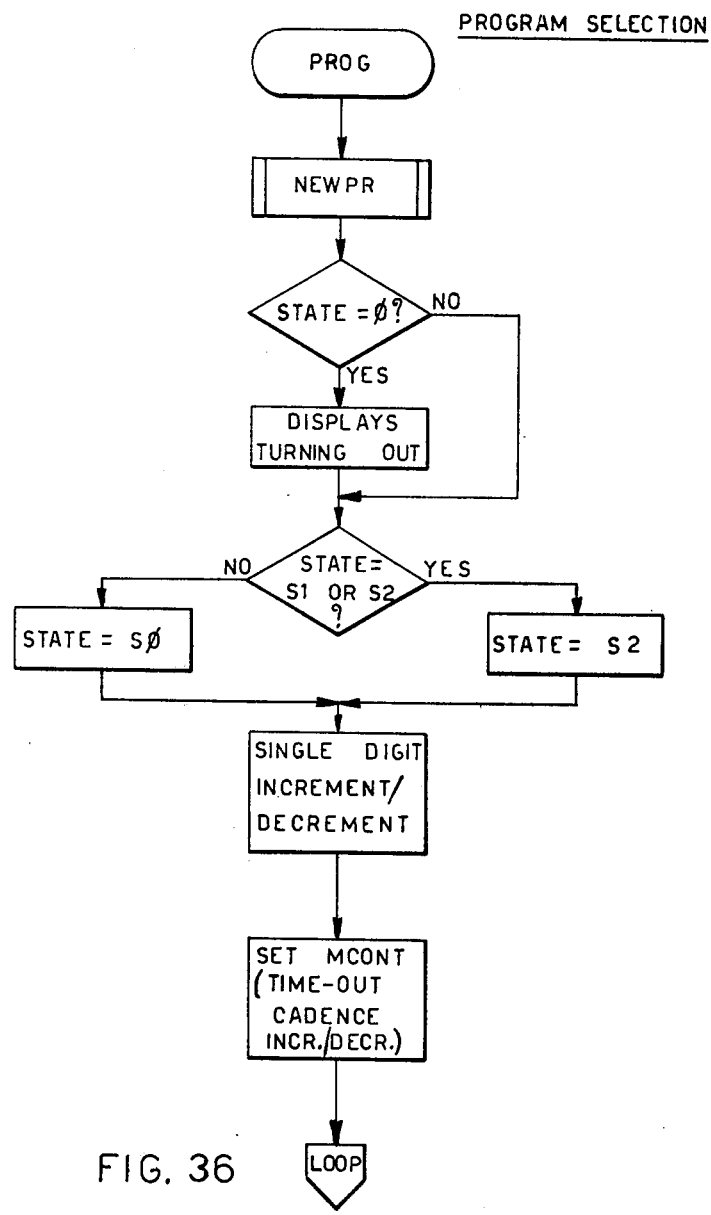
Figure 37:
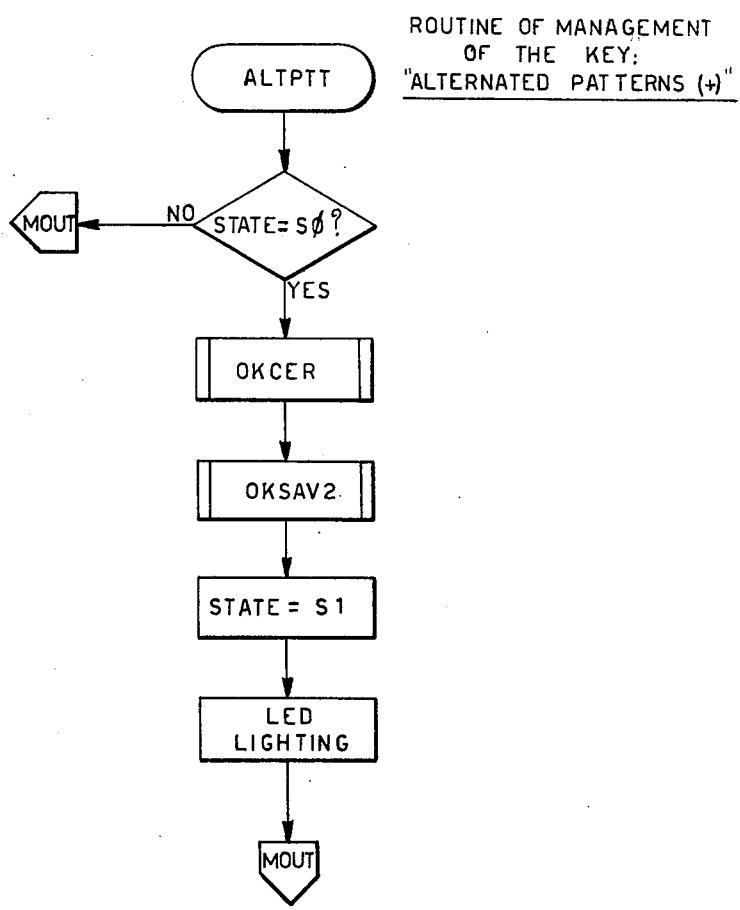
Figure 38:
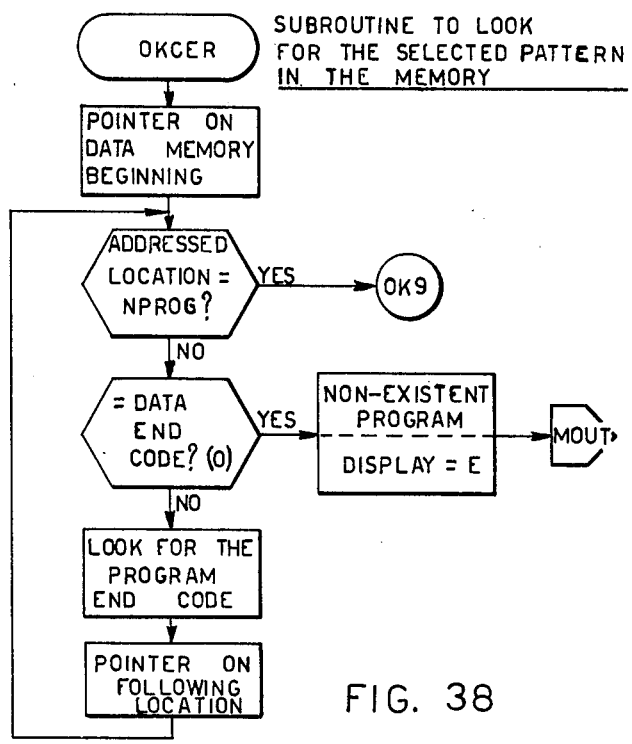
Figure 39:
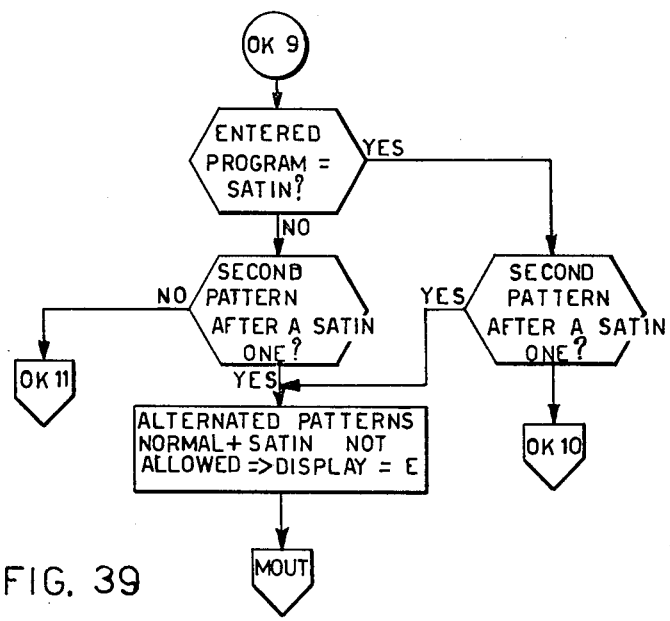
Figure 40:
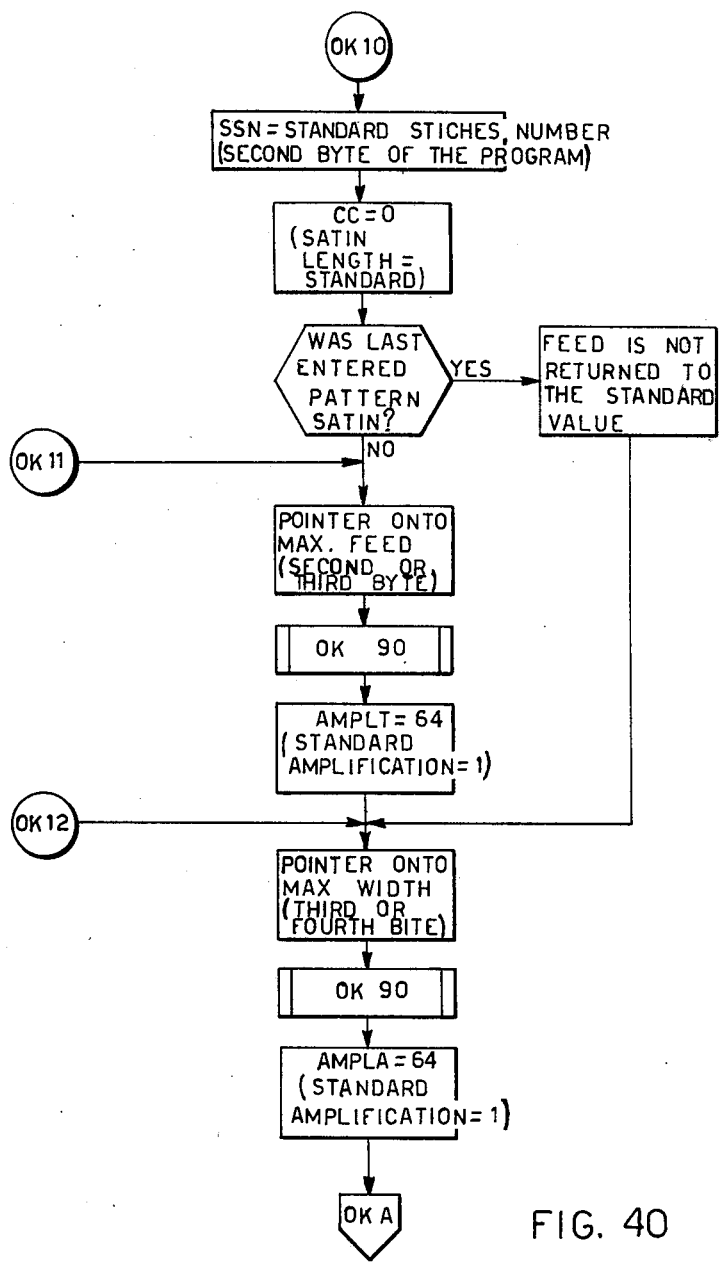
Figure 41:
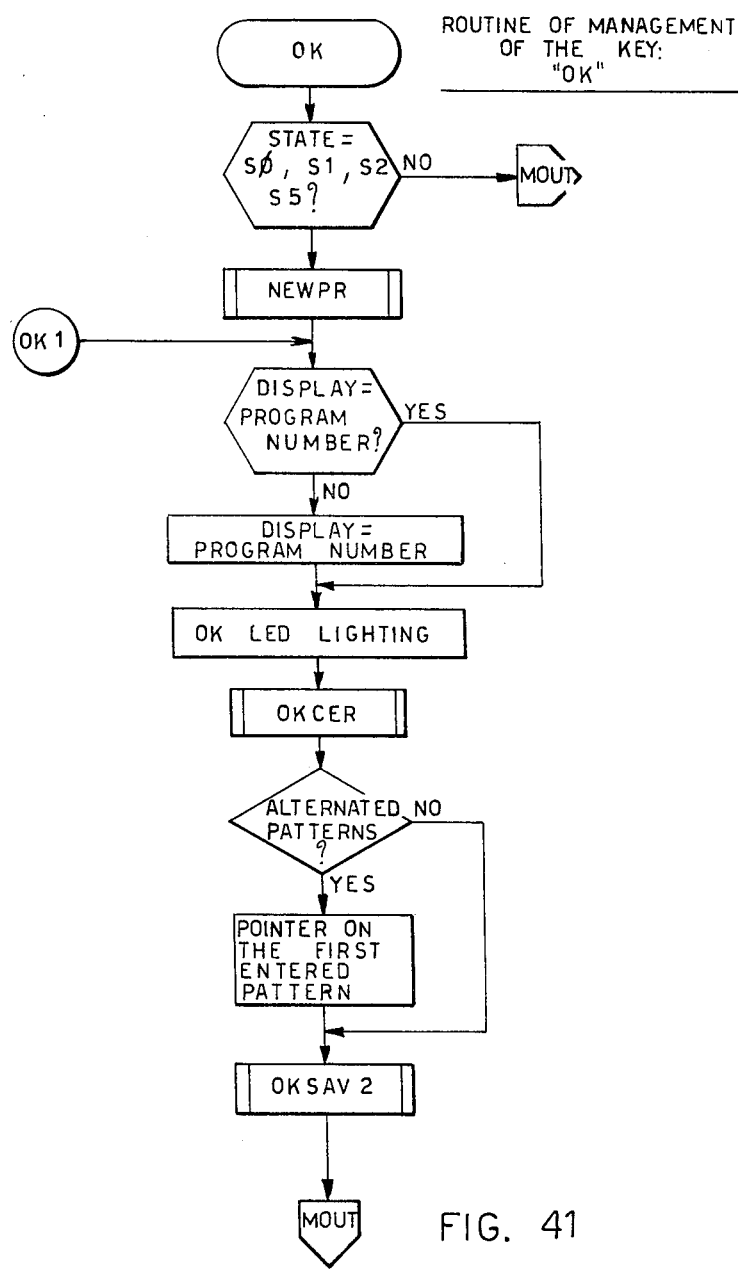
Figure 42:
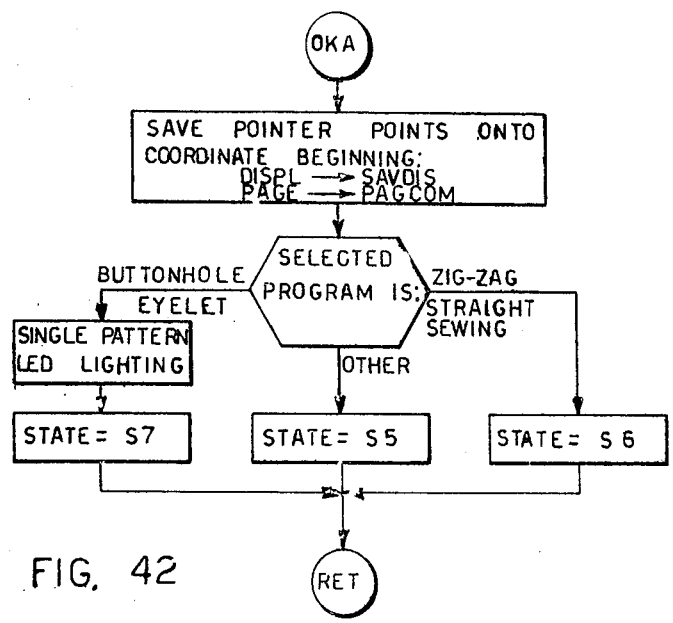
Figure 43:
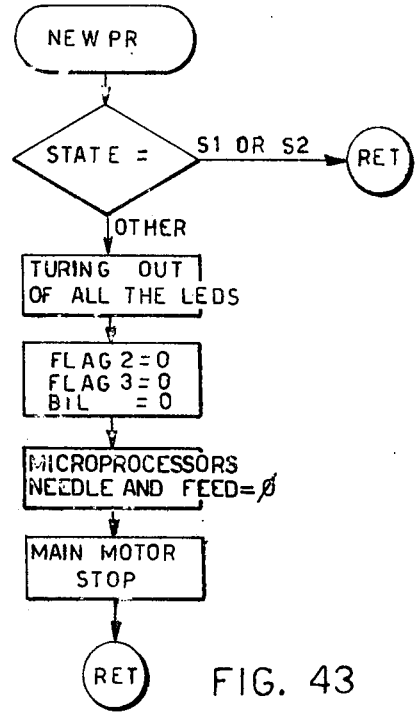
Figure 44:
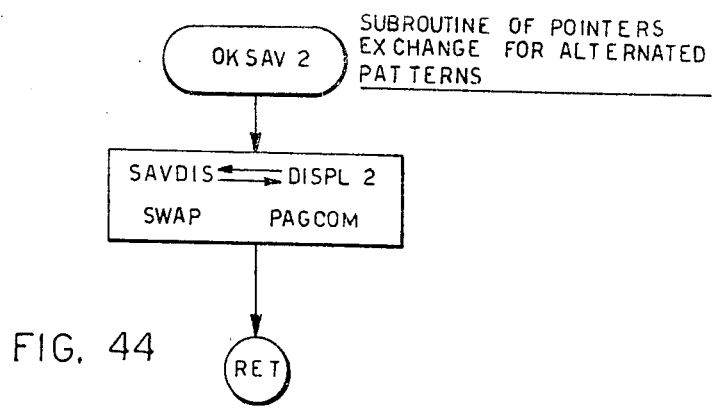
Figure 45:
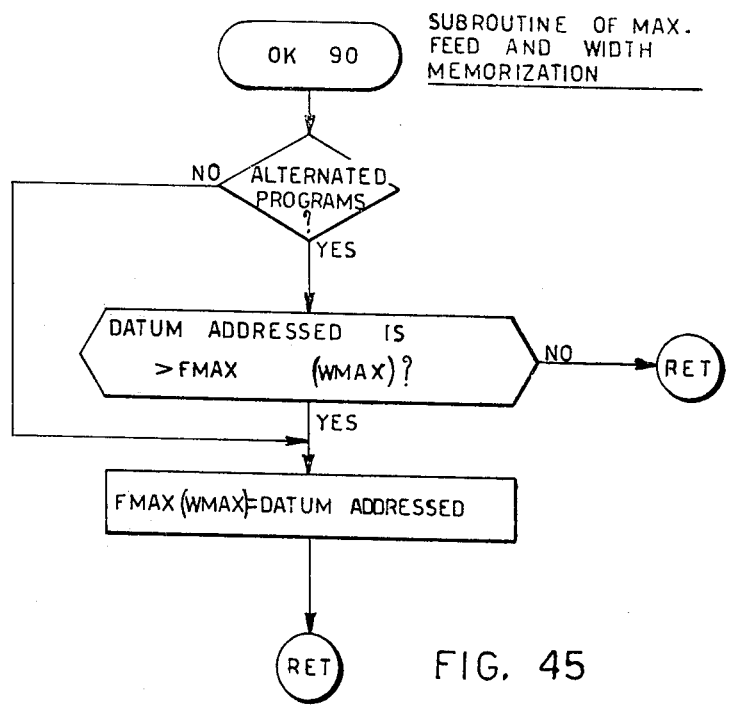
Figure 46:
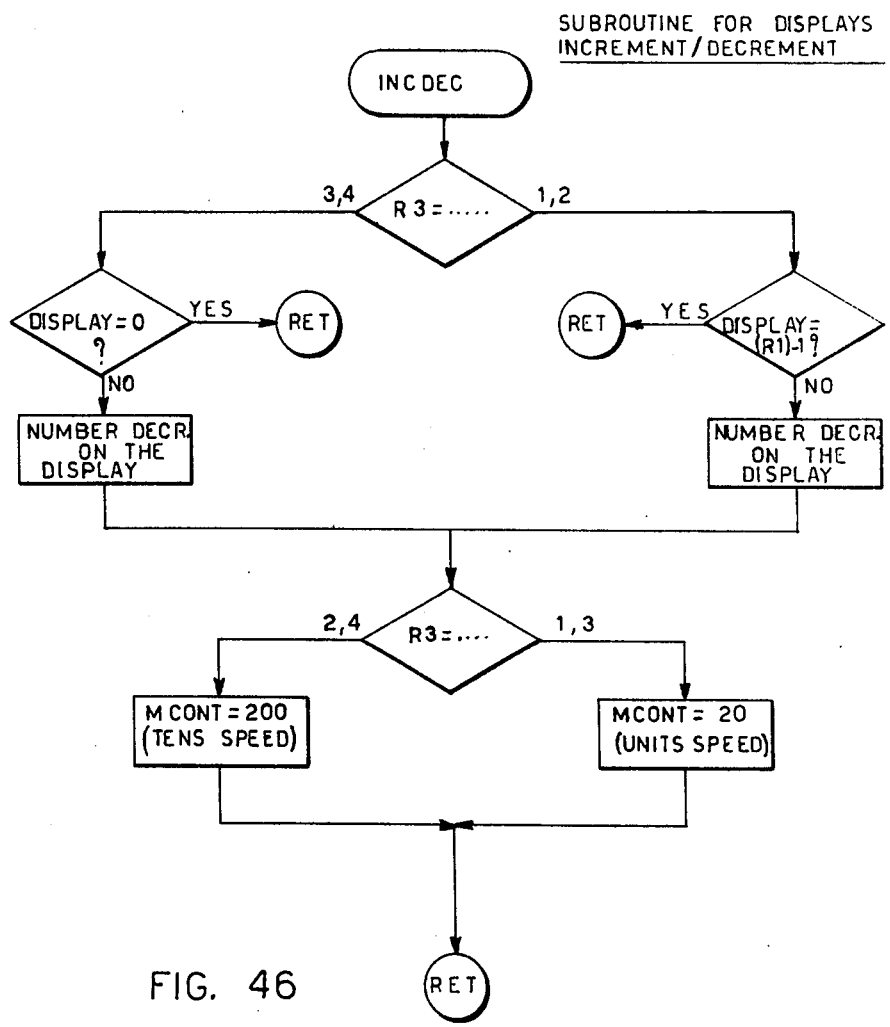

Suffice it to say that in the improved system of the present invention, and with reference to FIG. 18, as a function of the selections effected with keyboard 128, it is the signal termed ADEST in FIG. 18 which is sent as the digital signal to the eight terminals D0-7 of the slave microprocessor 610 relating to the position servo control of the bight actuator 124, as the desired needle amplitude or bight stitch position coordinate, and with reference to FIG. 17, it is the signal termed TDEST which is sent, in digital form, to the eight terminals D0-7 of the slave microprocessor 610′ relating to the position servo control of the feed actuator 130, as the desired transport or feed stitch position coordinate.

Now we shall specifically refer to the improved position control system of the present invention by referring to the functions carried out by the slave microprocessors 610 and 610′. However, before examining their operation in detail as illustrated in FIGS. 7A-7G, their operation will be summarized in general. Since slave microprocessor 610 is essentially identical in function and operation to slave microprocessor 610′ except for the parameter being controlled (bight vs. feed), only the operation of the slave microprocessor 610 will be described by way of example. Slave microprocessor 610, upon the turning on of the machine 100, preferably carries out a first operating sequence (illustratively represented in FIG. 7A) to bring the bight actuator 124 into an extreme limit position (for instance striking against the left side), and then carries out a second operating sequence (illustratively represented in FIG. 7B) to bring the actuator 124 into the zero reference position, verifying the correct operation of the actuator 124. This sequence of operations is then preferably followed by an operating sequence (illustratively represented) in FIG. 7C) which verifies the reaching of this zero reference position and, in the event that such position is not maintained, brings about resumption thereof (illustratively represented in FIG. 7D) through a first phase (illustratively represented in FIG. 7E) which selects the initial speed control value via the signal provided via path 611 so as to preferably have a maximum acceleration and therefore minimize the resumption time and, through a second phase (illustratively represented in FIG. 7F) which, during the approach to the zero reference position, preferably varies in decreasing steps the speed of the actuator 124. Upon the reaching of the zero reference position and the maintaining thereof (illustratively represented in FIG. 7C), the sending of the desired position control from the master microcomputer 110 is preferably enabled to the slave microprocessor 610 which, as illustratively represented in FIGS. 7E and 7F, preferably selects the initial velocity control value and, via the position servo control effected by the transducer 616, selects the variation in decreasing steps of the speed itself of the actuator 124 so that the actuator 124 preferably reaches the desired correct position within the minimum positioning time.

Referring now to the illustrative logic flow diagrams of FIGS. 7A through 7G in greater detail, the preferred operation of the slave microprocessor 610 shall now be described, bearing in mind that by the symbols STA, STB and STF there are indicated the previously referred to signals 630, 631 and 629, and that the upper representation and the lower representation of the relative position of the signals 630 and 631, previously referred to in FIG. 4F, refers to a rearward movement and a forward movement, respectively, of the bight actuator 124. Therefore, with reference to FIG. 7A, upon the turning on of the machine 100, the slave microprocessor 610 sends to the master microcomputer 110 over corresponding connections for the program control signals, signals corresponding to AMPEN=0; MTF=0, and ERR=0, as represented by box 220 in FIG. 7A, which indicate free actuator condition for the movement, and absence of conditions of error. There is then supplied the signal 611 which controls the movement of the actuator 124 with a predetermined speed (for example 15 as reference value on a prefixed scale supplied by the converter 612) and with a rearward movement to bring the actuator 124 into the limit position on the left side, as represented by box 221 in FIG. 7A. A timer 222 is then actuated which preferably has a duration of 170 mseconds, by way of example, which is sufficient time for assurance of maintenance of such lateral position and, as represented by box 224, the correspondence of STB to 0 is evaluated. With these two operations represented by boxes 223 and 224 there is, therefore, verified the successive variation in time of STB between 0 and 1, due to the movement of the actuator 124 and, therefore, of the corresponding incremental optical encoder 622, when such a position transducer is employed, until constancy of the value reached by STB in this side position. This operation together with the operations represented by boxes 225 or 226 which verify the exhausting of the time of the timer 222, determine the activation of a command represented by box 227 (FIG. 7B) which, with the signal 611, controls the movement of the actuator 124 with a predetermined speed (for instance 7) and with forward movement to bring the actuator 124 into the zero reference position. The presence of this movement is verified by the operation represented by boxes 228 and 229 (FIG. 7B); otherwise, an interruption signal is not disabled by the operation represented by box 234 after having been enabled by the operation represented by box 235 and the correct direction of the movement is then verified by the combination of the operations represented by boxes 229 and 239. If positive, this operation is represented by box 230 (FIG. 7C) while if negative, this operation is represented by box 231, illustrating the provision to the master microcomputer 110 of information signals equivalent to AMPEN=1 (actuator blocked) and ERR=1 (abnormal situation in which position zeroing controls are sent by the master microcomputer 110 to the slave microprocessor 610).

The reaching of the zero reference position is verified, as represented by box 230 (FIG. 7C), and when verified, a zero velocity code for the signal 611 is provided as represented by box 231. A timer 232, after a convenient time of a few milliseconds, preferably commands a new verification of the retention of such zero reference position, as represented by box 233, and if verified in the affirmative, there is sent to the master microcomputer 110 a signal MTF=1, as represented by box 240, which indicates the condition of motor stopped and, therefore, the possibility of sending the position command signals to the slave microprocessor 610. After such command signals have arrived, and have been ascertained, as represented by box 241, such signals are considered in the form of the number of steps by which the optical encoder 622 (if the optical encoder is employed) must be shifted, and therefore the amount of movement of the actuator 124 from the zero reference position to reach the desired position. Referring now to FIGS. 7E and 7G, whether this number of steps is greater than a predetermined maximum number (for example 255) is evaluated, as represented bo box 242, and if so then the command signal 611 is sent which commands the movement of the actuator 124 in the desired direction and with a predetermined maximum speed (for instance 26), as represented by box 243. It therefore arrives at a probing operation of the signal STB, represented by box 244 (FIG. 7F), the particular operation of which is described with reference to FIG. 7G. The subsequent sequence of operations in FIG. 7F is represented by boxes 245, 246, 247, 248, 249, 250, 251, 252, 253, 254, 255 wherein the slave microprocessor 610 takes account of the desired direction of the movement and if such movement takes place correctly, a similar configuration is there reached which again verifies this condition and then noting the variation of STA, for the displacement of one step of the actuator 124, it decreases by one unit the number of steps relative to the position to be reached and preferably verifies whether this number of steps is greater than 175. Until such condition is verified, the cycle described is repeated, as represented by boxes 244 and 254, and when such number of steps becomes equal to 175 it then commands the movement of the actuator 124 with a lower speed (for instance 25), as represented by box 256. Thereupon the cycle is repeated which leads to a new decrement in the number of steps and so on as already described, in which upon a progressive decrease of such number of steps there is a reduction to predetermined, lower values of the speed commanded by the signal provided via path 611. Preferably, there is finally reached a point, which upon verification of the condition of the number of steps being equal to zero, causes a zero velocity code for the signal provided via path 611. This is represented by boxes 260 and 261. There is then again actuation for the reaching of a new position for the actuator 124, in accordance with what has already been described, as represented by boxes 240 and 241. In the event that such new position (as difference in steps with respect to the preceding position) is the same, then as represented by box 262 (FIG. 7E), there is immediately reached the operations represented by boxes 240 and 241; otherwise, as a function of the number of steps by which the actuator must be displaced, there is reached a different one of the operations represented by boxes 242 or 262 or 263, etc. up to box 264 for the selection of a suitable initial value of speed, as previously described, and for the insertion at a corresponding point of the logic program of FIG. 7F, which is traversed as previously described, up to the operation represented by box 261.

Figure 7D:
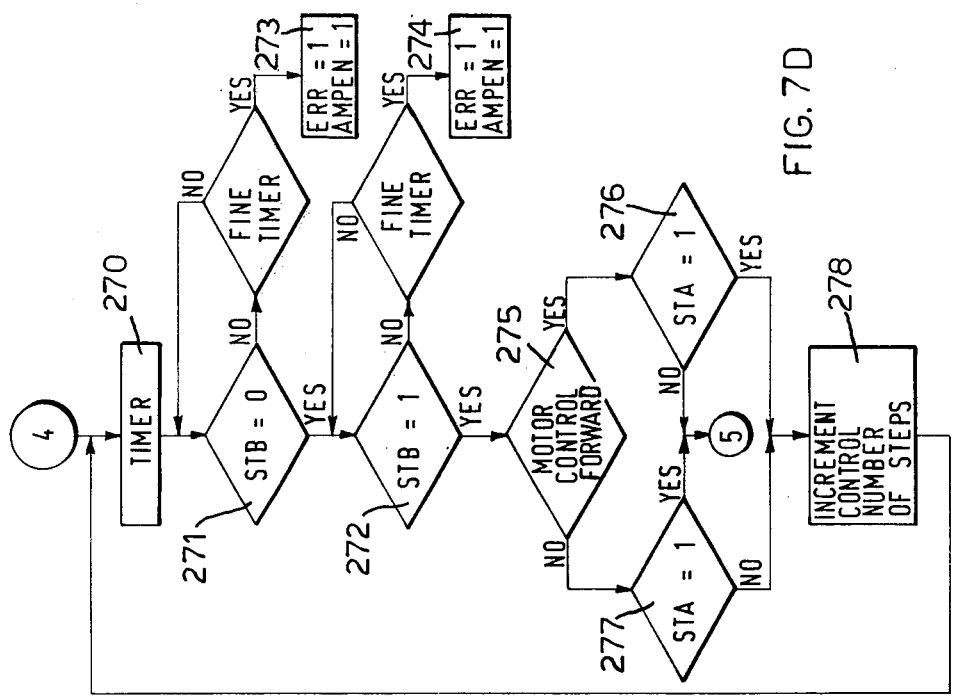
Figure 7C:
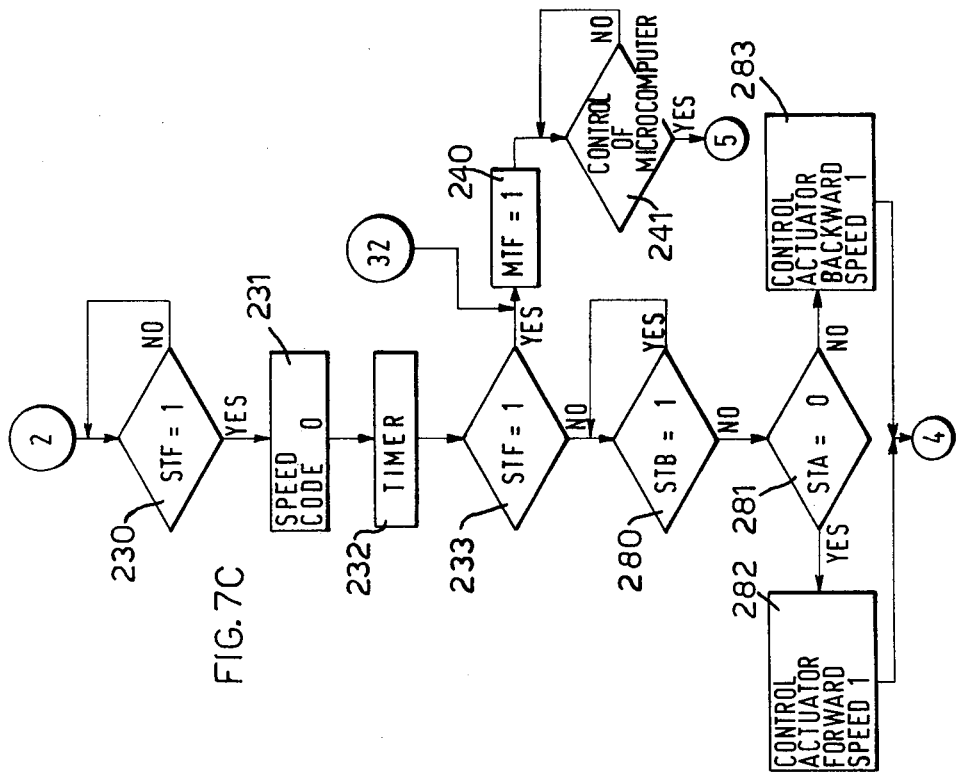
Figure 7G:
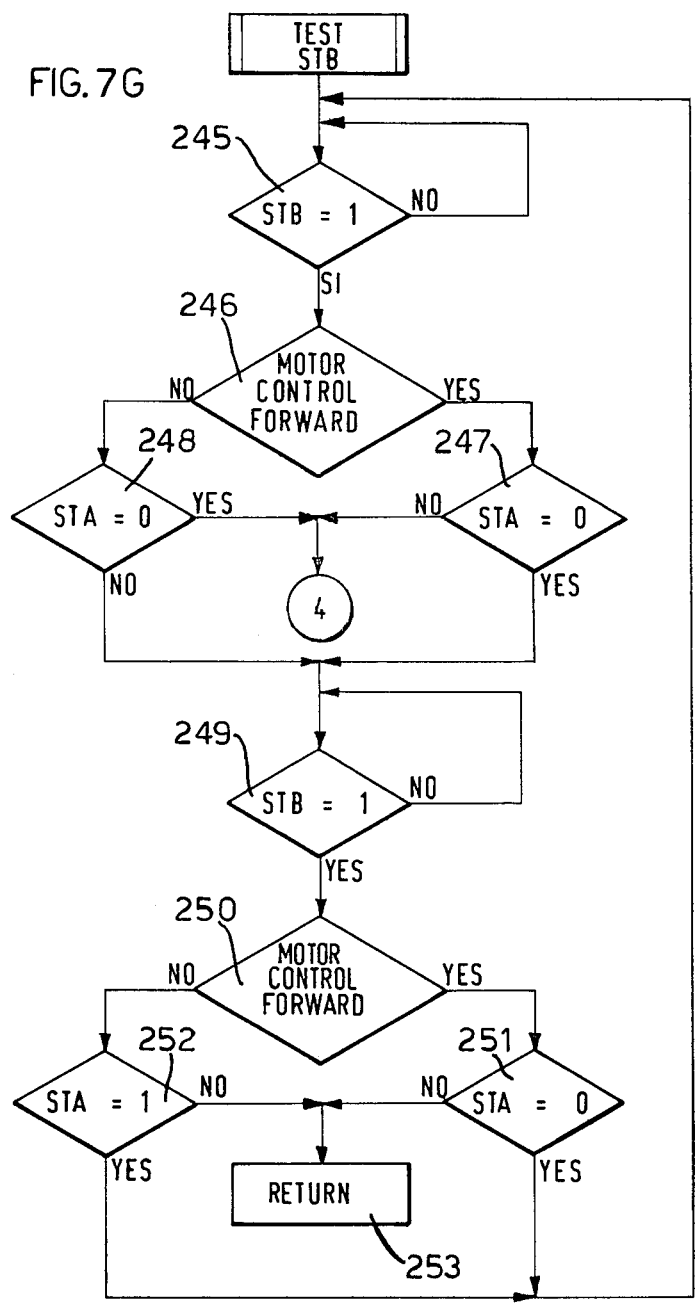
Figure 8A:
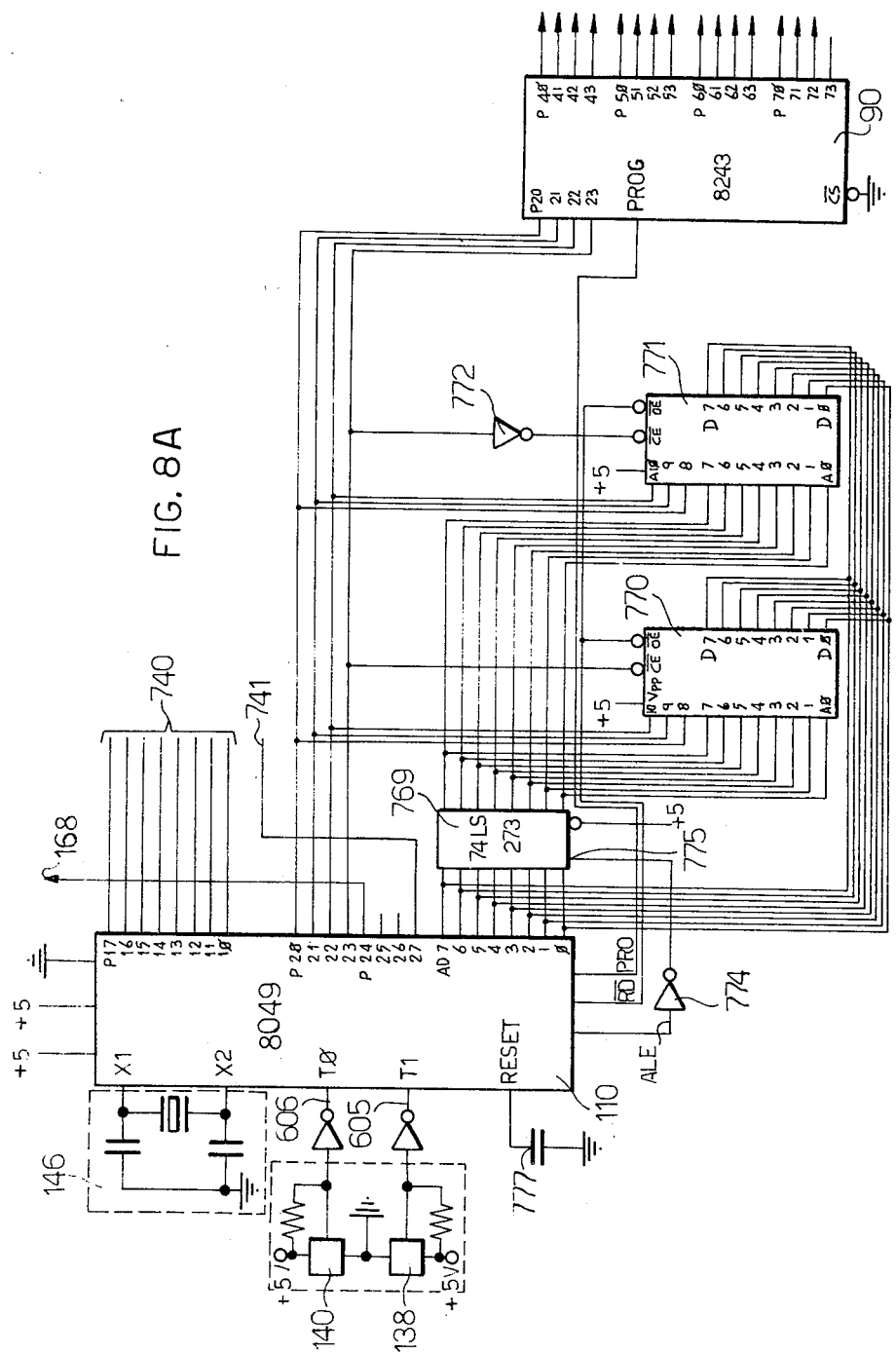
FIGS. 8A and 8B represent a circuit diagram, partially in block, of the presently most preferred embodiment of the improved electronic sewing machine master/slave microprocessor control system of the present invention.
Figure 8B:
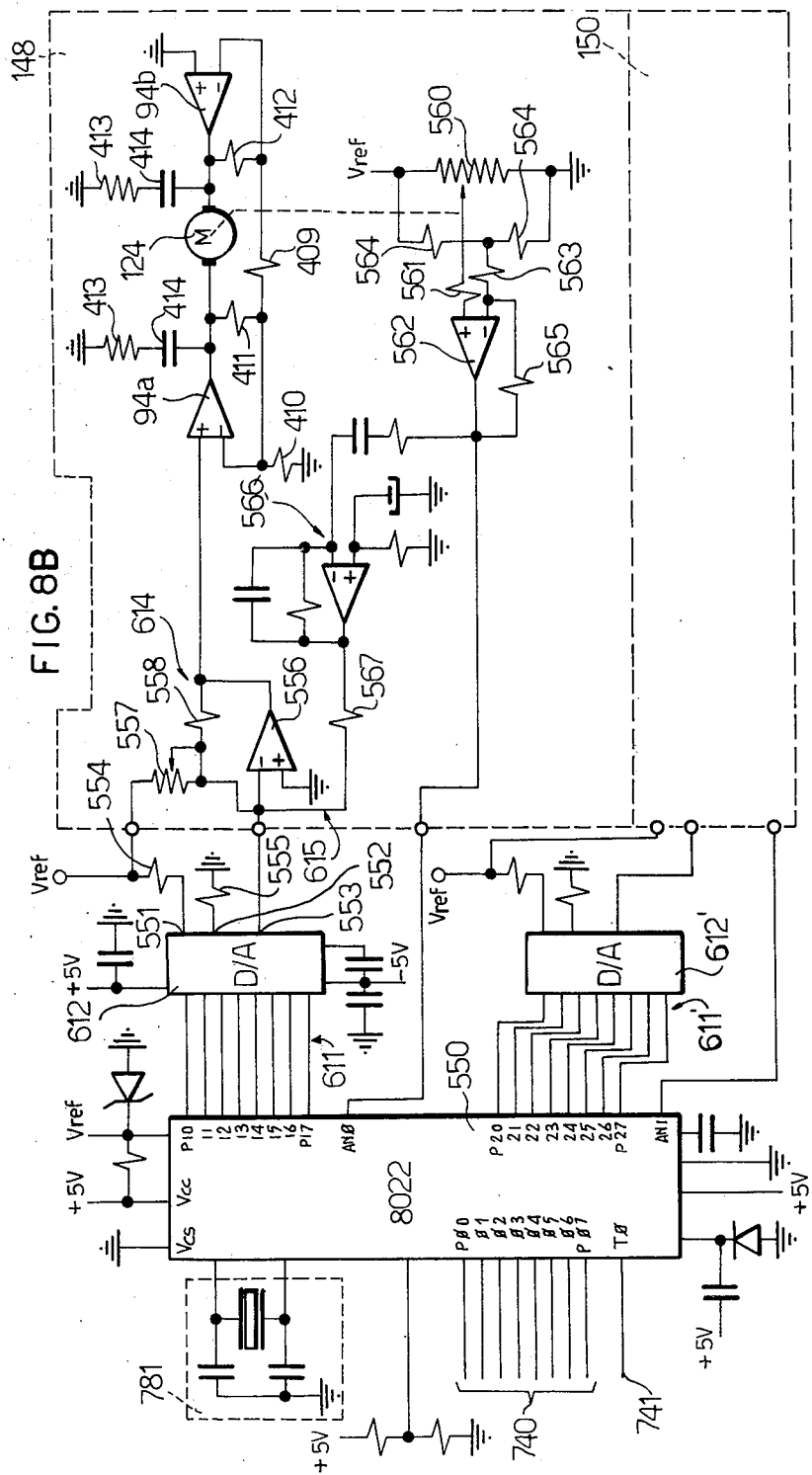

With reference to FIG. 7G, in the event that the movement for the actuator 124 does not take place in the correct direction, as represented by boxes 247 or 248, there is reached a timer 270 (FIG. 7D) and microprocessor 610 verfies, after a certain time as represented by boxes 247 or 248, whether there exists an abnormal condition of blocking for the actuator 124 itself (which is represented by boxes 273 or 274) and as a function of the examination of the correct or incorrect direction of movement effected, as represented by boxes 275, 276 and 277, if such correct position has already been verified, then there is obtained the manner of operation already described with reference to the logic flow diagram (FIG. 7E). If the correct position has not been verified, as represented by box 278, the total number of steps of the new position to be reached is increased as a function of each front of the signal STB and the cycle described with reference to the logic flow diagram of FIG. 7D is repeated until the correct condition of movement is reached, after which a new initial speed value is selected, as previously described with reference to FIG. 7E.

An addition to what has been described is illustrated in FIG. 7C by the functional boxes 233, 280, 281, 282 and 283 wherein the zero reference position is not maintained, slave microprocessor 610 evaluates the direction in which the actuator 124 must be moved in order to recover this position with a minimum speed (for example 1). Consequently, with the functional operations already described with reference to the logic flow diagram of FIG. 7D, it is then evaluated whether the correct direction of the recovery movement has been established and therefore if the operations and conditions illustrated in the logic flow diagram of FIG. 7E have been obtained, or whether it is still necessary to take into account an increment of error steps until the condition of the correct direction of movement is reached, as represented by box 278. Thus, FIGS. 7A-7G represent the logic flow diagrams for operation of the slave microprocessor 610 or 610'. A detailed program listing corresponding thereto will not be provided as it is well within the knowledge of one of ordinary skill in the art to generate such a program listing given these flow diagrams and the available information for the INTEL 8041.

Referring now to FIGS. 8A and 8B and 9A and 9B, the presently most preferred embodiment of the control system 126 of the present invention is shown. This arrangement is presently most preferred for a household type sewing machine and substantially differs from the embodiments shown in FIGS. 5A and 5B since it comprises a single common slave microprocessor 550, such as an INTEL 8022, which is used for both the position servo control circuits 148 and 150, rather than the separate slave microprocessors 610 and 610'. The position transducer in this presently most preferred embodiment which is coupled to the corresponding actuator is an analog type and supplies an analog signal to the slave microprocessor 550 which, internally, preferably alternatively taking such analog signals from the two analog position transducers relative to the two position servo control circuits for the two actuators 124 and 130, preferably converts these analog signals into corresponding digital signals to close the position servo loops and effect the comparison in digital values with the desired position digital signals coming from the master microcomputer 110. The digital signals resulting from such comparison and suitably processed and command the respective actuators 124 or 130 as already described, in order to bring the actuators 124 or 130 into the desired correct position. In particular, the presently most preferred circuit of FIGS. 8A and 8B differs from that of FIG. 5A by the fact that the terminals AD 0-7 of the master microcomputer 110 are preferably connected only to a register 769 and to the two components 770 and 771, and no longer to the previously described microprocessors of the position servo control circuits. Consequently, the connection between master microcomputer 110 and slave microprocessor 550 for the sending of the data of the desired positions for the actuators 124 and 130 is preferably effected with a connecting line 740 between eight terminals P10-17 of the master microcomputer 110 and eight terminals P07-P00 of the slave microprocessor 550, for the indication of each coordinate of the stitch, and with a connection 741 between a terminal P27 of the master microcomputer 110 and a terminal TO of the slave microprocessor 550 to indicate whether the coordinate relates to the bight actuator 124 or the feed actuator 130, such indication being given by the two logic levels of the signal sent, called the TO signal. This signal is naturally created via the control program of the master microcomputer 110, modified in an obvious manner which need not be described in greater detail. The connection to the terminals $\overline{OE}$ of the components 770 and 771 is, therefore, effected directly by the terminal $\overline{RD}$ of the master microcomputer 110.

The common slave microprocessor 550 therefore preferably has a first group of eight terminals P10-P17 which supply the aforementioned digital signal via path 611 (FIG. 4) to the digital-to-analog converter 612, developed, for instance, with a 1408 component, which has three connecting points 551, 552 and 553, of which the first is connected, via a resistor 554, to a reference potential Vref, the second is connected to ground via a resistor 555, and the third is connected to the inverting input of a differential amplifier 556 whose non-inverting input is connected to ground and which forms a part of comparator 614. The inverting input of this differential amplifier 556 is also preferably connected to the reference potential Vref via a variable resistor 557 and to its output via a resistor 558. This differential amplifier 556 therefore supplies at its output a signal of a voltage proportional to the difference of the current signal sent to its inverting input and functions of the desired velocity and of the actual velocity of the actuator 124. This voltage signal at the output of the differential amplifier 556 is then preferably sent to the differential power amplifiers 94a and 94b which pilot the actuator 124, as previously described with reference to FIG. 5B.

The actuator 124 is, in its turn, preferably connected to the slide of a potentiometer 560, forming the presently most preferred analog position transducer 616. This slide, via a resistor 561, is preferably connected to the non-inverting input of another differential amplifier 562 which forms a conventional translator stage whose inverting input is preferably connected, via a resistor 563, to the common junction point between two resistors 564, the series connection of which is connected in parallel to the aforementioned potentiometer 560. The output of this differential amplifier 562, which is connected to its inverting input via a resistor 565, is preferably connected to an input terminal AN O for the analog position signal of the common slave microprocessor 550 and via a conventional differentiator stage 566 and a resistor 567 preferably supplies the signal via path 615 which is proportional to the actual speed of the actuator 124, which is sent to the inverting input of the differential amplifier 556.

The circuit development of the position servo control circuit of the feed actuator 130 is not described or illustrated herein since it is preferably identical to that already described for the bight actuator 124, with the correspondence of the terminals P10-P17 to the terminals P20-27 and of the terminal AN O to the terminal AN 1.

Analogously, the connections to the terminals P40-43, P50-53, P60-63 and P70-72 of the interface 90 are not described or illustrated, since they are preferably identical to those previously described with reference to FIGS. 5A and 5C.

Figure 9B:
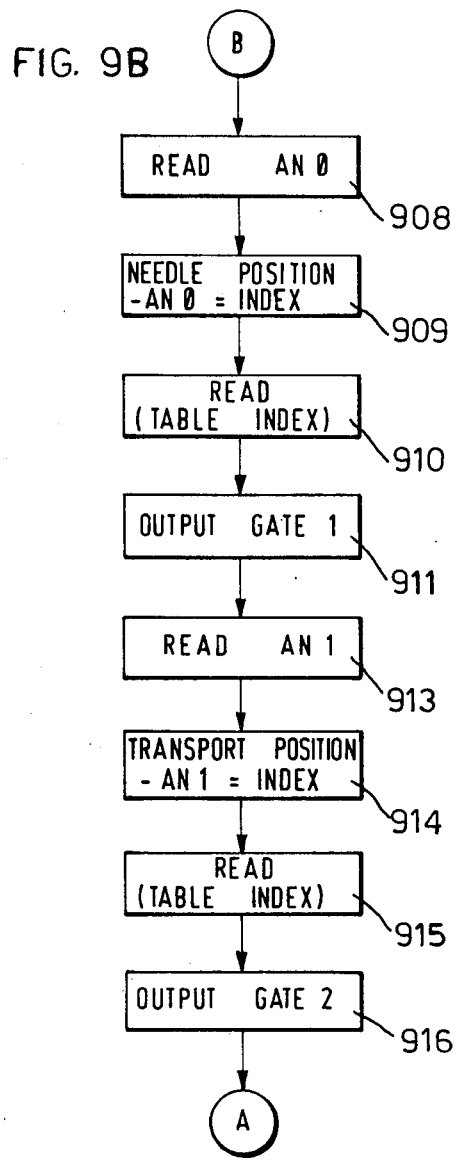
Figure 11:
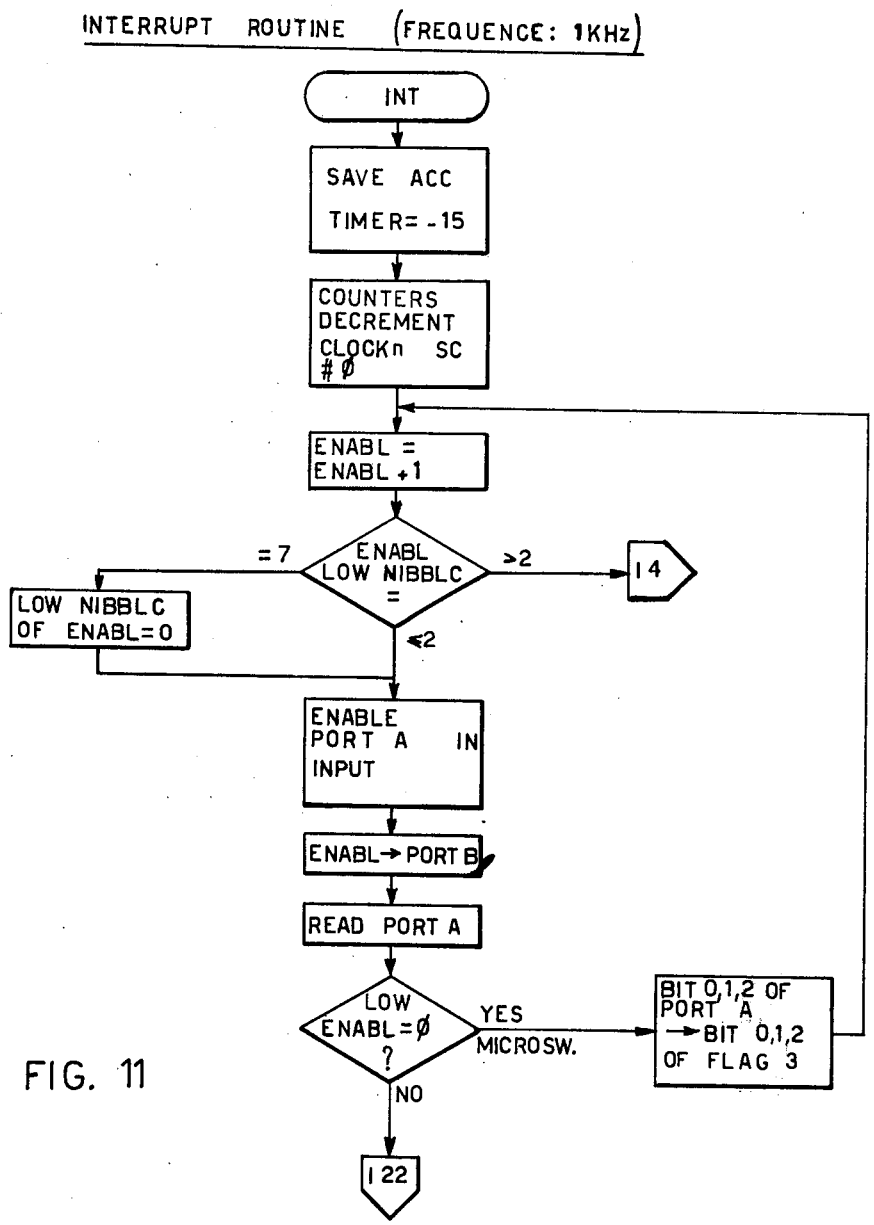
FIGS. 11–46 represent logic operation diagrams, similar to those disclosed in commonly owned U.S. patent application Ser. No. 973,386, filed Dec. 26, 1978, relating to the master microprocessor which processes the stitch pattern bight and feed data in accordance with the improved electronic sewing machine of the present invention, the master microprocessor of the present invention being similar in operation to the microprocessor disclosed in said commonly owned U.S. patent application.
Figure 12:
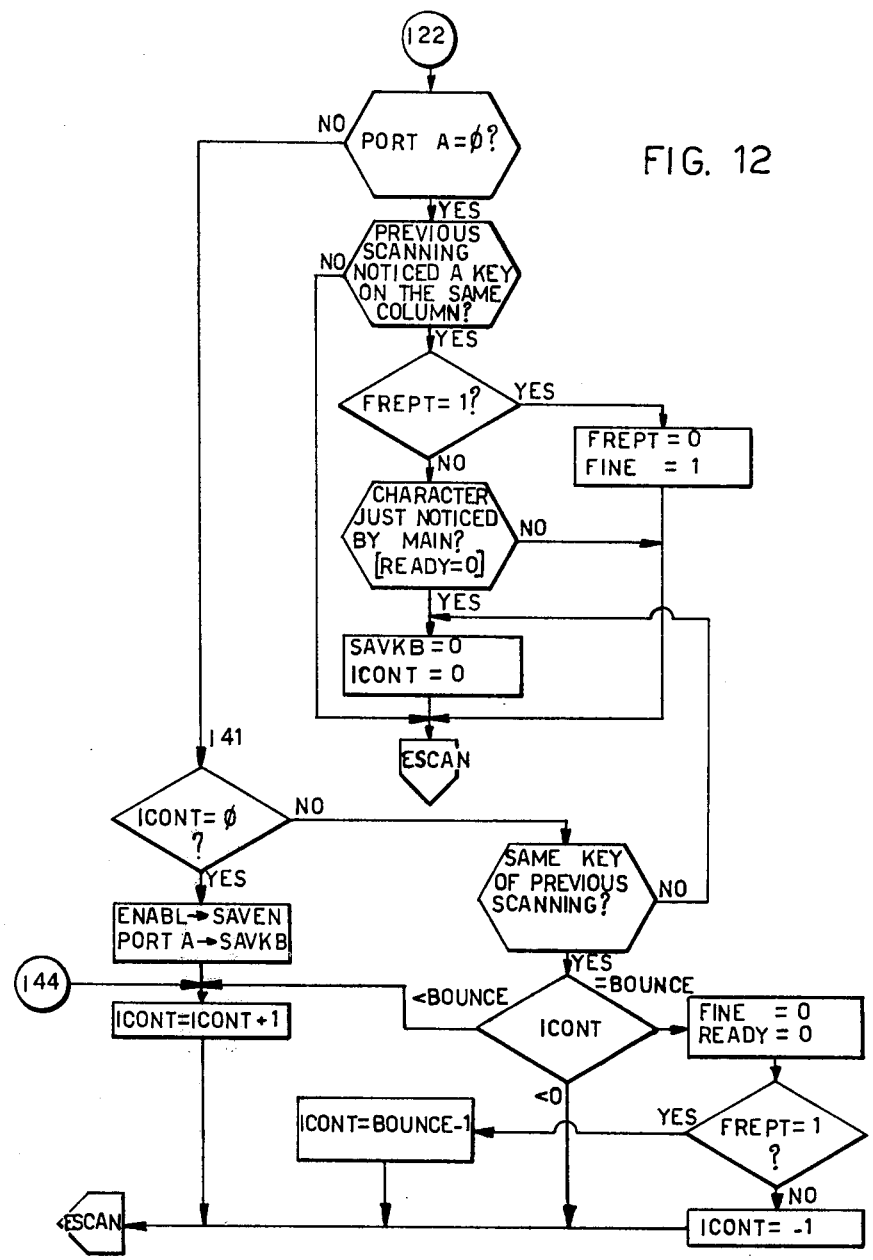
Figure 13:
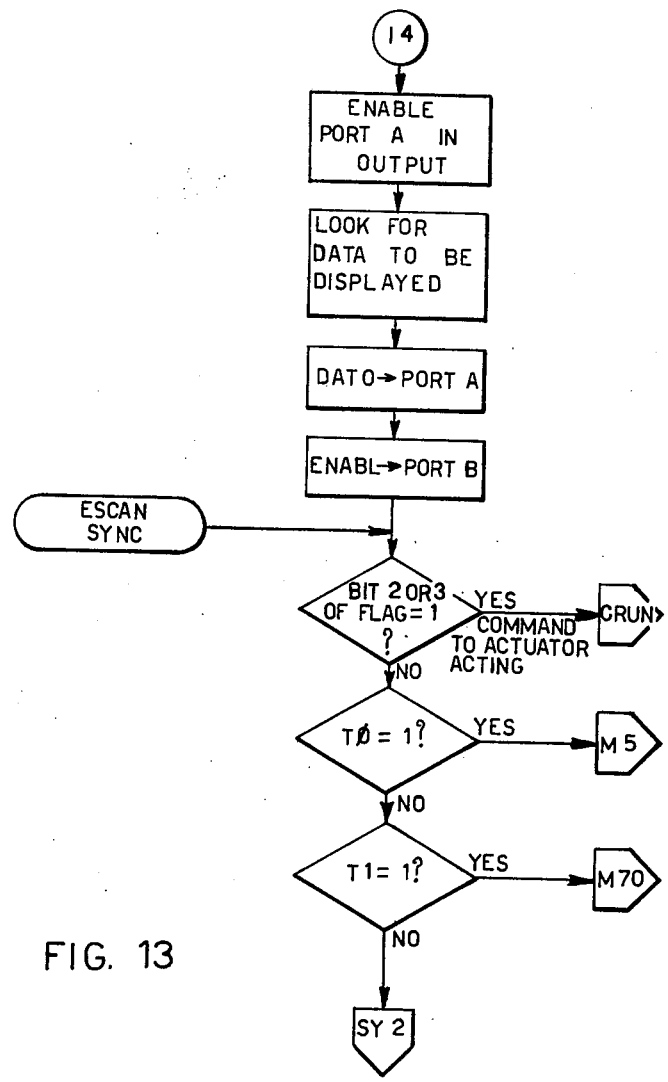
Figure 14:
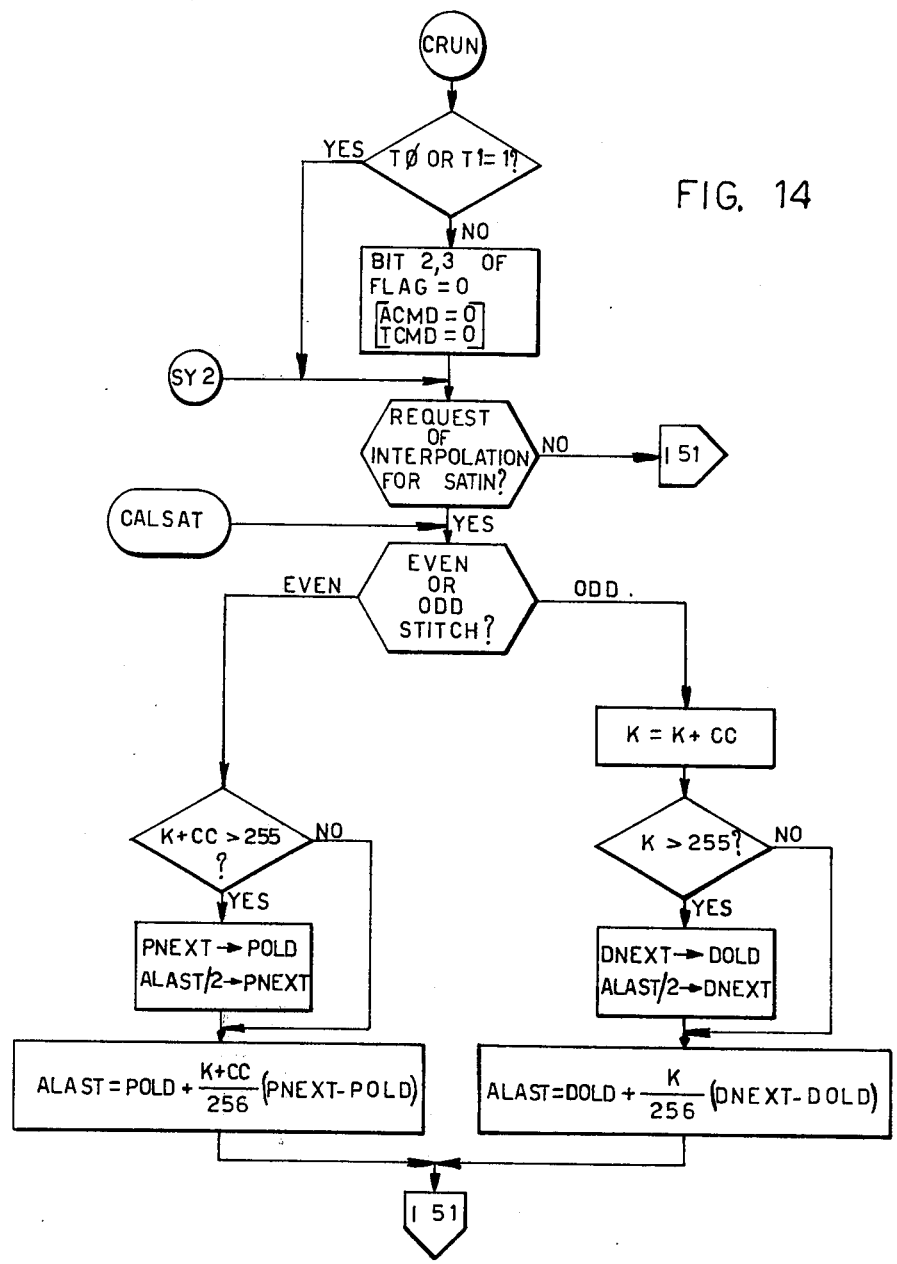
Figure 15:
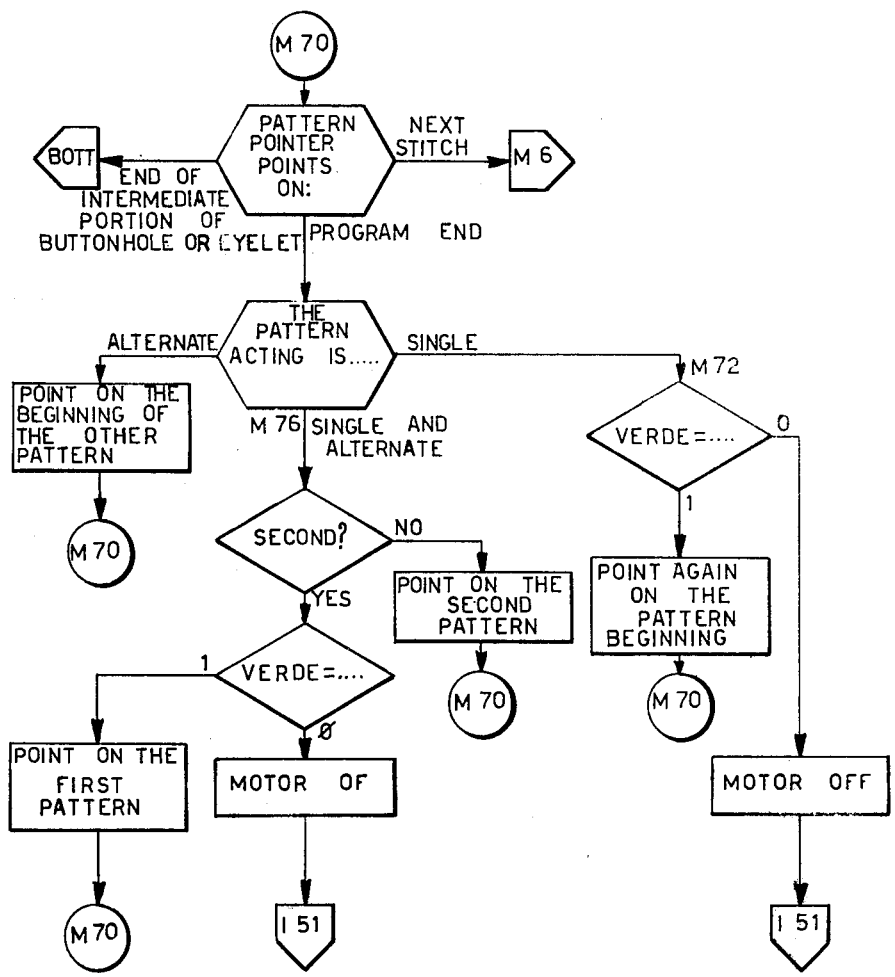

By way of example, the carrying out of a control program effected by the presently most preferred common slave microprocessor 550 will now be illustrated with reference to the logic flow diagrams of FIGS. 9A and 9B. Again, a detailed program listing will not be provided as it is within the knowledge of one of ordinary skill in the art familiar with the INTEL 8022.

After the machine has been turned on, and operated in accordance with the functions previously described with reference to FIGS. 7A-7G for producing the zeroing conditions for the position, servo control circuits 148 and 150 relative both to the needle and to the feed, as represented by boxes 901 and 902, there are gradually analyzed the various digital signals corresponding to the different coordinates of stitches which arrive from the master microcomputer 110 at the common slave microprocessor 550.

Initially, the logic value of the signal TO is analyzed as represented by box 903; if it is not equal to 1 (namely is zero) then the valve of the indicator F1 is determined, as represented by box 904. If the latter is not equal to 1 (namely is zero) and this means, as will be seen better later on, that the data sent by the master microcomputer 110 relates to new needle amplitude coordinates for the actuator 124, then the value F1 is set equal to 1 and the value of F2 is set equal to 0, as represented by box 905. The reading of the digital signal is then commanded, as represented by box 906 at the terminals P00–P07 and then this read digital signal is memorized as the desired position value for the needle, as represented by box 907. The value at the terminal AN O, which is a function of the actual position of the actuator 124, is then read and converted into a digital value, as represented by box 908, the desired position value is then digitally compared with the actual position value, as represented by box 909, and an index signal is provided which, as a function of a given predetermined table, determines a speed control signal for the actuator 124 sufficient to cancel out the difference between the actual and desired position values, as represented by box 910. Such speed control signal is then supplied to the terminals P10–17 of the common slave microprocessor 550, as represented by box 911, which therefore, via the presently most preferred circuit described in FIGS. 8A and 8B, commands the movement of the bight actuator 124. Preferably, the value at the terminal AN O, which is a function of the actual position of the feed actuator 130, is then read, as represented by box 913, and converted into a digital value. The desired position value is then digitally compared with the actual position value for the feed actuator 130, as represented by box 914, an index signal is provided which, as a function of a given predetermined table, determines a speed command signal for the feed actuator 130, as represented by box 915. This speed command signal is then preferably supplied to the terminals P20–27 of the common slave microprocessor 550 to command the feed actuator 130 and reach the desired correct position, as represented by box 903 and, if there has been no variation of TO, returns to the operation of box 904 but now, the value F1 having been previously brought to 1 by the operation of box 905, it suddenly arrives at the operation of box 908, as is proper since no new values of needle amplitude coordinates have been sent by the master microcomputer 110. In such an instance there only takes place the scanning of the operations of boxes 908 to 916 which determine the closed loop position servo control for the bight and feed actuators 124 and 130, respectively, in order to bring them to and maintain them in the desired correct position.

If a variation of TO then takes place, for example, the master microcomputer 110 sends new digital position signals relative to the feed, the, TO becoming equal to 1, the value of F2 is evaluated, as represented by box 920, which will be equal to zero for the preceding operation represented by box 905, and then the subsequent operation represented by boxes 921, 922 and 923 occur which bring F1 to 0 and F2 to 1, control the reading of the digital signal at the terminals P00–P07, and then memorize this read digital signal as the desired position signal for the actuator relative to the feed. The cycle of operations represented by boxes 908 to 916 is then again effected and then the repetition of the various phases depending upon the occurrence of the different conditions already described. The operations represented by boxes 909 and 910 and similarly 914 and 915 have not been described in greater detail since they can preferably take place in principle in accordance with what has already been described with reference to FIGS. 7A to 7G for the manner of operation of the slave microprocessors 610 and 610'.

Summarizing the improved system of the present invention, a digital type closed loop position servo control system for electronic sewing machines such as that developed in accordance with the present invention has various advantages, including but not limited to the following. The serious problems of calibration of the transducer which are present in an analog servo control loop do not exist, since in the digital type position servo control loop of the present invention the machine can be developed without the need of calibration; as a matter of fact, both in the case of a digital-type transducer and in the case of an analog-type transducer the position reference is calculated digitally in a microprocessor and, therefore, is not subject either to offset variations or to gain variations. As has already been pointed out above, the digital-type servo control loop of the present invention is intrinsically more precise than an analog-type servo control loop. It is not subject to variation of the parameters as a function of the feed voltages, of the environmental conditions, etc. With regard then to the precision of the transducers, it can be said that, in general, the digital transducer is more precise than the analog transducer, but has a poorer resolution. In fact, while the analog transducer permits practically infinite resolution, the digital transducer has its resolution limited by the number of bits with which it is desired to present the value. In terms of practical embodiment, in the incremental optical encoder this limitation of the resolution results in a limitation in the number of pulses for each unit angular displacement which the transducer is able to generate. On the other hand, as this incremental optical encoder is able to carry out more revolutions and, therefore, to transduce a practically unlimited position value, the ability increase the strokes to be transduced is facilitated. The characteristics of the potentiometer, however, are opposite. It can, therefore, be stated that, within the scope of the presently preferred digital type solution for the position servo control loops of an electronic sewing machine, the transducer employing an incremental encoder is preferably better suited for long strokes (for example, 100 mm) and limited resolutions (for example, 0.1 mm), such as for use on industrial type sewing machines, while the transducer employing a potentiometer is preferably better suited for short strokes (for example, 8 mm) and higher resolutions (for example, 0.05 mm), such as for use in household type sewing machines. In addition, the digital type position servo control loop of the present invention is intrinsically more stable than an analog type position servo control loop. Its gain and dynamic response characteristics do not depend, except negligibly, on variations in time or functions of the environmental conditions of the values of the parameters. Furthermore, the preferred digital type servo control loop (whether a hybrid analog digital loop or a pure digital loop) can be made intrinsically adaptive and therefore able to adapt itself to variations in time or parameters. Furthermore, the preferred digital type control system of the present invention is able to verify, moment by moment, the proper operation of the electromechanical apparatus or actuators which it governs.

While, in the case of the analog type control described in copending U.S. patent application Ser. No. 973,386, the microcomputer governing the machine generates a digital signal corresponding to the desired position for the actuator, it is then unable to verify whether this position is reached and whether it is reached in the preestablished times. The preferred digital control of the present invention, however, is able to effect this verification continuously for the exchange of signals between the master microcomputer 110 and the slave microprocessors 610 and 610' or 550. This means that, in the present invention, it is possible to have emergency conditions which stop the machine in case of malfunctioning of any of its control members. It is needless to say that the presence of this possibility of self-diagnosis in the system of the present invention enormously facilitates the carrying out of the repair of damaged machines. In addition to the above, there is greater each with which the preferred digital system of the present invention can be inspected as compared with an analog system. In this regard, the inspection of the digital system of the present invention can disregard to a large extent the variability of the environmental conditions for the reasons already set forth. Moreover, in the digital system of the present invention, it is possible with great ease to simulate all possible modes of operation of the machine, they being discretable, and therefore to arrive with great ease at an exhaustive inspection of the apparatus. This type of inspection is much more problematical in a system of the analog type. In addition, since the control of the machine is already a digital control through the microcomputer, if an analog type control circuit is employed for the actuators, this makes it necessary to have an automatic inspection apparatus able to inspect both the digital part and the analog part resulting in an intrinsically more complicated and expensive apparatus than one capable of inspecting only a digital part.

It should also be noted that the digital control of the present invention makes it possible to obtain the same performance in terms of fineness of positioning as the analog system of copending U.S. patent application Ser. No. 973,386, and furthermore, permits optimization by the adaptive control of the positioning times insofar as there is calculated the correct moment of braking of the actuator, as well as its acceleration, which results in an improvement of the performance of the machine. Moreover, an improvement in the positioning times can result in a higher speed of sewing or in a larger size of the pattern which can be produced at constant speed, or else in a less powerful actuator for the same speed and amount of sewing. In addition, the ability to use less powerful actuators in accordance with the present invention, to accomplish the same type of results from the more powerful actuator required in an analog type control system, means an actuator of lower cost and with less problems of dissipation in the electronic sewing machine.

It should also be noted that in an analog type control system for an electronic sewing machine, there is the problem of varying the sewing parameters at the option of the operator. Such parameters are essentially the width of the sewing, the width of the seam, and the balance thereof. In an analog system, such variations are generally obtainable by a potentiometer suitably inserted by static switches into the analog servo loop described above. This type of variation of the parameters has various drawbacks from the standpoint both of ergonomy of the controls and complexity, and therefore cost, of the apparatus. In the digital type solution of the present invention however, which provides a control or slave microprocessor for each of the two movement axes of the machine, whether as a common microprocessor 550 or separate microprocessors 610, 610', these variations may readily be compensated for.

Finally, it is clear that changes and variations which do not go beyond the scope of the invention can be made in the sewing machine position command and control system without departing from the present invention. Thus, for example, the possibility of varying the system of sending the position control instructions to the position comparison microprocessor or microprocessors in the digitial type (hybrid or pure) position servo control loop, which system may also include only ROM memories without processing of the memorized pattern data; the possibility of using different types of actuators, namely, rotary, linear, etc.; the possibility of not having a separate speed control servo loop; or the possibility of varying the examples described of the logical operations carried out by the slave microprocessors 610 and 610' or 550, all may be accomplished without departing from the spirit and scope of the present invention in which the position servo control loop for at least one actuator in an electronic sewing machine is digitally closed by a microprocessor type device.

What is claimed is:

1. In an electronic type sewing machine having a bed, a standard rising from said bed, a horizontal arm overhanging said bed, said arm ending with a head, a needle bar means disposed in said head for enabling transverse oscillation thereof relative to the direction of fabric feed in said sewing machine, feed means for adjusting the length and direction of said fabric feed, actuator means for adjusting the transverse position of said needle bar means and the positional displacement of said feed means in response to control signals provided thereto for providing stitches at predetermined stitch position coordinates in a selected stitch pattern and first static memory means for retrievably storing a first plurality of different predetermined selectable stitch patterns each having associated retrievably stored bight and feed data corresponding to sets of predetermined desired stitch positional coordinates of said needle bar and feed means for defining said associated desired stitch position coordinates for the stitches comprising said selectable stitch patterns; the improvement comprising microcomputer integrated circuit means operatively connected to said static memory means and to said actuator means, and means operatively connected between said actuator means and said microcomputer means for providing a digital input signal to said microcomputer means representative of the actual position of said actuator means, said microcomputer means, said actuator means and said actual position signal providing means comprising means for selectively processing said stored stitch pattern data from said static memory means for a selected stitch pattern for providing a desired stitch position actuator control signal corresponding to a predetermined set of stitch position coordinates in said selected stitch pattern and for digitally comparing said actual position digital input signal with said selectively processed desired stitch position actuator control signal for said position servo control loop for providing a servo control output signal to said actuator means based on said digital comparison for controllably adjusting said actuator means for providing a stitch at a different set of desired stitch position coordinates in said selected stitch pattern from a previous stitch in said pattern as said sewing machine progresses through said pattern.

2. An electronic type sewing machine in accordance with claim 1 wherein said microcomputer means comprises means for closing said position servo control loop.

3. In an electronic type sewing machine having a bed, a standard rising from said bed, a horizontal arm overhanging said bed, said arm ending with a head, a needle bar means disposed in said head for enabling transverse oscillation thereof relative to the direction of fabric feed in said sewing machine, feed means for adjusting the length and direction of said fabric feed, actuator means for adjusting the transverse position of said needle bar means and the positional displacement of said feed means in response to control signals provided thereto and first static memory means for retrievably storing a first plurality of different predetermined stitch patterns each having associated retrievably stored bight and feed data corresponding to predetermined positional coordinates of said needle bar and feed means for defining associated stitch position coordinates for the stitches comprising said stitch patterns; the improvement comprising microcomputer integrated circuit means operatively connected to said static memory means and to said actuator means, and means operatively connected between said actuator means and said microcomputer means for providing a digital input signal to said microcomputer means representative of the actual position of said actuator means, said microcomputer means, said actuator means and said actual position signal providing means comprising a position servo control loop, said microcomputer means comprising a master/slave microcomputer configuration means for selectively processing said stored stitch pattern data from said static memory means and for digitally comparing said actual position digital input signal with said selectively processed stored stitch pattern data for said position servo control loop for providing an output control signal to said actuator means based on said selectively processed stitch pattern data for controllably adjusting at least the transverse position of said needle bar means, said slave microcomputer means comprising means for digitally comparing said actual position digital input signal with said selectively processed stored stitch pattern data and said master microcomputer means comprising means for selectively processing said stored stitch pattern data and providing said selectively processed stored stitch pattern data to said slave microcomputer means, said slave microcomputer means comprising means for closing said position servo control loop.

4. In an electronic type sewing machine having a bed, a standard rising from said bed, a horizontal arm overhanging said bed, said arm ending with a head, a needle bar means disposed in said head for enabling transverse oscillation thereof relative to the direction of fabric feed in said sewing machine, feed means for adjusting the length and direction of said fabric feed, actuator means for adjusting the transverse position of said needle bar means and the positional displacement of said feed means in response to control signals provided thereto and first static memory means for retrievably storing a first plurality of different predetermined stitch patterns each having associated retrievably stored bight and feed data corresponding to predetermined positional coordinates of said needle bar and feed means for defining associated stitch position coordinates for the stitches comprising said stitch patterns; the improvement comprising microcomputer integrated circuit means operatively connected to said static memory means and to said actuator means, and means operatively connected between said actuator means and said microcomputer means for providing a digital input signal to said microcomputer means representative of the actual position of said actuator means, said microcomputer means, said actuator means and said actual position signal providing means comprising a position servo control loop, said microcomputer means comprising a master/slave microcomputer configuration means for selectively processing said stored stitch pattern data from said static memory means and for digitally comparing said actual position digital input signal with said selectively processed stored stitch pattern data for said position servo control loop for providing an output control signal to said actuator means based on said selectively processed stitch pattern data for controllably adjusting at least the transverse position of said needle bar means, said slave microcomputer means comprising means for digitally comparing said actual position digital input signal with said selectively processed stored stitch pattern data and said master microcomputer means comprising means for selectively processing said stored stitch pattern data and providing said selectively processed stored stitch pattern data to said slave microcomputer means.

5. An electronic type sewing machine in accordance with claim 4 wherein said actual position signal providing means comprises a digital transducer means.

6. An electronic type sewing machine in accordance with claim 5 wherein said digital transducer means comprises an optical encoder means.

7. An electronic type sewing machine in accordance with claim 5 wherein said actuator means comprises an analog actuator means.

8. An electronic type sewing machine in accordance with claim 4 wherein said actual position signal providing means comprises an analog transducer means and an analog-to-digital converter means operatively connected to the output thereof, the output of said analog-to-digital converter means operatively connected to said microcomputer means for providing said digital input signal thereto.

9. An electronic type sewing machine in accordance with claim 8 wherein said analog transducer means comprises a potentiometer.

10. An electronic type sewing machine in accordance with claim 4 wherein said microcomputer means comprises a common means for said bight and feed data for providing positional control of both said needle bar and said feed means.

11. An electronic type sewing machine in accordance with claim 4 wherein said actuator means comprises an analog actuator means.

12. An electronic type sewing machine in accordance with claim 11 wherein said position servo control loop further comprises an analog speed servo control loop for providing said output control signal to said actuator means.

13. An electronic type sewing machine in accordance with claim 1 wherein said microcomputer means comprises means capable of selectively controllably functionally operating on said stored stitch pattern data in response to input control signals for controllably redefining said stored stitch pattern data for selectively creating output control signals for said actuator means different from the output control signals corresponding to any one of said stored stitch patterns whereby at least the transverse position of said needle bar means may be selectively varied to redefine a stitch pattern arrangement different from any one of said stored stitch patterns; and said sewing machine further comprises keyboard means operatively connected to said microcomputer means for providing said input control signals to said microcomputer processing means for initiating the selection of at least one stored stitch pattern and the functional operation to be performed on said associated selected stored stitch pattern data for controllably adjusting at least the transverse position of said needle bar means for selectively providing a final stitch pattern arrangement from said plurality of stored stitch patterns, whereby said sewing machine is capable of providing stitch pattern arrangements corresponding to said stored stitch patterns per se as well as to selectably creatable variations thereof.

14. An electronic type sewing machine in accordance with claim 13 wherein said keyboard means comprises a first plurality of keys common to a plurality of said selectable stored stitch patterns for providing input control signals for enabling selection of said stitch pattern data.

15. An electronic type sewing machine in accordance with claim 14 wherein said keyboard means further comprises a common display means for displaying information corresponding to the stored stitch pattern data selected by said first plurality of common keys.

16. An electronic type sewing machine in accordance with claim 15 wherein said keyboard means further comprises a second plurality of common keys for providing input control signals for enabling selection of at least one of a plurality of different ones of said functional operations to be performed on the stored stitch pattern data selected by said first plurality of common keys.

17. An electronic type sewing machine in accordance with claim 16 wherein said keyboard means further comprises means for enabling display by said common display means of information corresponding to the functional operation selected by said second plurality of common keys.

18. An electronic type sewing machine in accordance with claim 13 wherein said microcomputer means comprises means for selectively creating said different output control signals capable of enabling the bight of the stitches comprising said selected stitch pattern to be varied in response to said input control signals provided from said keyboard means.

19. An electronic type sewing machine in accordance with claim 13 wherein said static memory means comprises means for storing only said bight or feed data which varies for the stitches comprising each of said plurality of stored stitch patterns for enabling optimal retrieval of said stitch pattern data by said microcomputer means in response to said input control signals from said keyboard means.

20. An electronic type sewing machine in accordance with claim 4 wherein said first static memory means is removably connectable to said microcomputer means and is interchangeable with a second static memory means containing a second plurality of different predetermined stitch patterns each having associated retrievably stored bight and feed data corresponding to predetermined positional coordinates of said needle bar and feed means for defining associated stitch position coordinates for the stitches comprising said second plurality of stitch patterns, said interchangeable second static memory means being removably connectable to said microcomputer means in place of said first static memory means for retrievably providing said stored stitch pattern data thereto.

21. An electronic type sewing machine in accordance with claim 4 wherein said actuator means comprises separate electromechanical actuator means for said needle bar means and said feed means.

22. An electronic type sewing machine in accordance with claim 4 wherein said microcomputer integrated circuit means comprises a microprocessor means.

23. An electronic type sewing machine in accordance with claim 4 wherein said master and slave microcomputer means comprise microprocessor means.

24. An electronic type sewing machine in accordance with claim 1 wherein said servo control output signal is an optimized speed control signal, said microcomputer means optimizing the dynamic performance of said actuator means in accordance with said actual position signals during the acceleration and deceleration phases of said actuator means for providing said stitch at said different set of desired stitch position coordinates in a minimal positioning time.

25. An electronic type sewing machine in accordance with claim 1 wherein said microcomputer means comprises means for closing said position servo control loop.

26. An electronic type sewing machine in accordance with claim 25 wherein said microcomputer means comprises a master/slave microcomputer configuration with said slave microcomputer means comprising said means for digitally comparing said actual position digital input signal with said selectively processed desired stitch position actuator control signal and with said master microcomputer means comprising means for selectively processing said stored stitch pattern data for a selected stitch pattern and providing said desired stitch position actuator control signal to said slave microcomputer means, said slave microcomputer means comprising said means for closing said position servo control loop.

27. An electronic type sewing machine in accordance with claim 1 wherein said microcomputer means comprises a master/slave microcomputer configuration with said slave microcomputer means comprising said means for digitally comparing said actual position digital input signal with said selectively processed desired stitch position actuator control signal and with said master microcomputer means comprising means for selectively processing said stored stitch pattern data for a selected stitch pattern and providing said desired stitch position actuator control signal to said slave microcomputer means.

28. An electronic type sewing machine in accordance with claim 27 wherein said actuator means comprises a separate actuator for adjusting the transverse position of said needle bar means in accordance with said bight data and a separate actuator for adjusting the positional displacement of said feed means in accordance with said feed data, said slave microcomputer means comprising separate slave microprocessor means for each of said separate actuators for providing corresponding separate bight and feet stitch position actuator control signals to said separate bight and feed actuators.

29. An electronic type sewing machine in accordance with claim 28 wherein said master microcomputer means comprises a common means for said bight and feed data for providing positional control of both said needle bar and said feed means.

30. An electronic type sewing machine in accordance with claim 1 wherein said microcomputer means comprises a common means for said bight and feed data for providing positional control of both said needle bar and said feed means.

31. An electronic type sewing machine in accordance with claim 27 wherein said master and slave microcomputer means comprise microprocessor means.

32. An electronic type sewing machine in accordance with claim 3 wherein said microcomputer means comprises a common means for said bight and feed data for providing positional control of both said needle bar and said feed means.

33. An electronic type sewing machine in accordance with claim 4 wherein said microcomputer means comprises means capable of selectively controllably functionally operating on said stored stitch pattern data in response to input control signals for controllably redefining said stored stitch pattern data for selectively creating output control signals for said actuator means different from the output control signals corresponding to any one of said stored stitch patterns whereby at least the transverse position of said needle bar means may be selectively varied to redefine a stitch pattern arrangement different from any one of said stored stitch patterns; and said sewing machine further comprises keyboard means operatively connected to said microcomputer means for providing said input control signals to said microcomputer processing means for initiating the selection of at least one stored stitch pattern and the functional operation to be performed on said associated selected stored stitch pattern data for controllably adjusting at least the transverse position of said needle bar means for selectively providing a final stitch pattern arrangement from said plurality of stored stitch patterns, whereby said sewing machine is capable of providing stitch pattern arrangements corresponding to said stored stitch patterns per se as well as to selectably creatable variations thereof.

34. An electronic type sewing machine in accordance with claim 33 wherein said static memory means comprises means for storing only said bight or feed data which varies for the stitches comprising each of said plurality of stored stitch patterns for enabling optimal retrieval of said stitch pattern data by said microcomputer means in response to said input control signals from said keyboard means.

* * * * *